(12) United States Patent
Brumbelow et al.

(10) Patent No.: US 8,496,769 B2
(45) Date of Patent: Jul. 30, 2013

(54) CARPET, CARPET BACKINGS AND METHODS

(75) Inventors: Julie Brumbelow, Dalton, GA (US); Von Moody, Cartersville, GA (US); Wesley W. Mullinax, Cartersville, GA (US); John O. Bieser, Houston, TX (US); James D. Goins, Lake Jackson, TX (US); David C. Kelley, Angleton, TX (US); Lichih R. Peng, Fischer, IN (US); Robert R. Turley, Lake Jackson, TX (US)

(73) Assignee: Columbia Insurance Company, Omaha, NE (US)

( * ) Notice: Subject to any disclaimer, the term of this patent is extended or adjusted under 35 U.S.C. 154(b) by 1214 days.

(21) Appl. No.: 11/594,493

(22) Filed: Nov. 7, 2006

(65) Prior Publication Data

US 2007/0095453 A1    May 3, 2007

Related U.S. Application Data

(63) Continuation of application No. 10/838,426, filed on May 4, 2004, now Pat. No. 8,283,017, which is a continuation of application No. 10/601,141, filed on Jun. 19, 2003, now abandoned, which is a continuation of application No. 10/077,609, filed on Feb. 15, 2002, now abandoned, which is a continuation of application No. 09/032,410, filed on Feb. 27, 1998, now abandoned.

(60) Provisional application No. 60/039,217, filed on Feb. 28, 1997, provisional application No. 60/039,411, filed on Feb. 28, 1997, provisional application No. 60/039,412, filed on Feb. 28, 1997, provisional application No. 60/039,584, filed on Feb. 28, 1997, provisional application No. 60/039,587, filed on Feb. 28, 1997.

(51) Int. Cl.
*B32B 5/20* (2006.01)
*D05C 17/02* (2006.01)

(52) U.S. Cl.
USPC .................................. 156/72; 156/79; 428/95

(58) Field of Classification Search
USPC .... 428/95, 96, 308.4; 156/72, 78, 79; 525/63, 525/64, 69, 78; 521/79, 81, 134, 139, 144
See application file for complete search history.

(56) References Cited

U.S. PATENT DOCUMENTS

| | | | |
|---|---|---|---|
| 2,964,799 A * | 12/1960 | Roggi et al. ................. 264/46.3 |
| 3,203,921 A | 8/1965 | Rosenfelder |
| 3,264,167 A | 8/1966 | Sands |
| 3,309,259 A | 3/1967 | Schwartz |
| 3,390,035 A | 6/1968 | Sands |
| 3,491,073 A | 1/1970 | Marinak |
| 3,510,386 A | 5/1970 | Britt |
| 3,525,662 A | 8/1970 | Padgett |
| 3,537,946 A | 11/1970 | Truax |
| 3,551,231 A | 12/1970 | Smedberg |
| 3,554,824 A | 1/1971 | Callaban |
| 3,562,373 A | 2/1971 | Logrippo |
| 3,573,152 A | 3/1971 | Wiley |
| 3,583,936 A | 6/1971 | Stahl |
| 3,616,137 A | 10/1971 | Horton |
| 3,640,786 A | 2/1972 | Carpenter |
| 3,645,948 A | 2/1972 | Stahl |
| 3,645,949 A | 2/1972 | Crimi |
| 3,645,992 A | 2/1972 | Elston |
| 3,653,803 A | 4/1972 | Hammer |
| 3,676,280 A | 7/1972 | Sands |
| 3,684,600 A | 8/1972 | Smedberg |
| 3,730,822 A | 5/1973 | Lovell et al. |
| 3,745,054 A | 7/1973 | Smedberg |
| 3,770,558 A | 11/1973 | Stahl |
| 3,775,205 A | 11/1973 | Hermann et al. |
| 3,779,799 A | 12/1973 | Kennedy et al. |
| 3,799,799 A | 3/1974 | Woodhams |
| 3,806,558 A | 4/1974 | Fischer |
| 3,811,922 A | 5/1974 | Clark et al. |
| 3,821,065 A | 6/1974 | Copeland |
| 3,821,066 A | 6/1974 | Tillotson |
| 3,823,056 A | 7/1974 | Cooney |
| 3,847,719 A | 11/1974 | Crowley |
| 3,865,562 A | 2/1975 | Ayers et al. |
| 3,867,243 A | 2/1975 | Stoller |
| 3,873,643 A | 3/1975 | Wu et al. |

| | | | | | | |
|---|---|---|---|---|---|---|
| 3,874,965 A | 4/1975 | Greenwald et al. | | 4,663,103 A | 5/1987 | McCullough et al. |
| 3,877,737 A | 4/1975 | Chappell | | 4,663,370 A | 5/1987 | Marvel, Sr. et al. |
| 3,878,011 A | 4/1975 | Currell et al. | | 4,673,604 A | 6/1987 | Frain, III et al. |
| 3,882,194 A | 5/1975 | Krebaum et al. | | 4,689,256 A | 8/1987 | Slosberg et al. |
| 3,887,737 A | 6/1975 | Baxter et al. | | 4,705,706 A | 11/1987 | Avery |
| 3,887,738 A | 6/1975 | Taft et al. | | 4,721,641 A | 1/1988 | Bailey |
| 3,904,456 A | 9/1975 | Schwartz | | 4,734,328 A | 3/1988 | Kohyama et al. |
| 3,904,799 A | 9/1975 | Shorrock | | 4,737,221 A | 4/1988 | Bell et al. |
| 3,911,185 A | 10/1975 | Wright, Jr. | | 4,743,330 A | 5/1988 | Tillotson |
| 3,914,489 A | 10/1975 | Smedberg | | 4,748,206 A | 5/1988 | Nogiwa et al. |
| 3,922,454 A | 11/1975 | Roecker | | 4,752,634 A | 6/1988 | Goss |
| 3,928,281 A | 12/1975 | Uchigaki et al. | | 4,761,318 A | 8/1988 | Ott et al. |
| B501,415 I5 | 1/1976 | Taft et al. | | 4,762,890 A | 8/1988 | Strait et al. |
| 3,940,525 A | 2/1976 | Ballard | | 4,764,404 A | 8/1988 | Genske et al. |
| 3,963,802 A | 6/1976 | Shih | | 4,767,485 A | 8/1988 | Michiels |
| 3,975,224 A | 8/1976 | Ruzek et al. | | 4,794,145 A | 12/1988 | Lund et al. |
| 3,975,562 A | 8/1976 | Madebach et al. | | 4,798,081 A | 1/1989 | Hazlitt et al. |
| 3,976,820 A | 8/1976 | Giovanelli et al. | | 4,798,644 A | 1/1989 | Scott et al. |
| 3,982,051 A | 9/1976 | Taft et al. | | 4,808,459 A * | 2/1989 | Smith et al. .................. 428/95 |
| 3,984,610 A | 10/1976 | Elston | | 4,812,526 A | 3/1989 | Rifi |
| 4,010,302 A | 3/1977 | Anderson et al. | | 4,814,219 A | 3/1989 | Burgess et al. |
| 4,012,547 A | 3/1977 | Smedberg | | 4,822,669 A | 4/1989 | Roga |
| 4,014,645 A | 3/1977 | Chancler et al. | | 4,824,720 A | 4/1989 | Malone |
| 4,028,159 A | 6/1977 | Norris | | 4,829,125 A | 5/1989 | Yeo et al. |
| 4,035,533 A | 7/1977 | Chambley | | 4,837,076 A | 6/1989 | McCullough, Jr. et al. |
| 4,076,698 A | 2/1978 | Anderson et al. | | 4,843,129 A | 6/1989 | Spenadel et al. |
| 4,081,494 A | 3/1978 | Sakai et al. | | 4,844,765 A | 7/1989 | Reith |
| 4,086,381 A | 4/1978 | Cheshire et al. | | 4,847,317 A | 7/1989 | Dokurno et al. |
| 4,140,071 A | 2/1979 | Gee et al. | | 4,849,267 A | 7/1989 | Ward et al. |
| 4,153,749 A | 5/1979 | Klein | | 4,871,603 A | 10/1989 | Malone |
| 4,158,646 A | 6/1979 | Benkowski et al. | | 4,871,604 A | 10/1989 | Hackler |
| 4,172,166 A | 10/1979 | Hartmann et al. | | 4,872,930 A | 10/1989 | Kajikawa et al. |
| 4,190,565 A | 2/1980 | Cook et al. | | 4,875,954 A | 10/1989 | Griffiths et al. |
| 4,191,798 A | 3/1980 | Schumacher et al. | | 4,927,888 A | 5/1990 | Strait et al. |
| 4,205,021 A | 5/1980 | Morita et al. | | 4,937,299 A | 6/1990 | Ewen et al. |
| 4,230,830 A | 10/1980 | Tanny et al. | | 4,942,074 A | 7/1990 | Bell et al. |
| 4,234,366 A | 11/1980 | Brewer et al. | | 5,008,204 A | 4/1991 | Stehling |
| 4,242,395 A | 12/1980 | Zuckerman et al. | | 5,011,719 A | 4/1991 | Gehrke et al. |
| 4,263,196 A | 4/1981 | Schumacher et al. | | 5,011,891 A | 4/1991 | Spenadel et al. |
| 4,288,483 A | 9/1981 | Miska et al. | | 5,019,437 A | 5/1991 | Weiner |
| 4,323,528 A | 4/1982 | Collins | | 5,026,798 A | 6/1991 | Canich |
| 4,335,034 A | 6/1982 | Zuckerman et al. | | 5,030,506 A | 7/1991 | Yamawaki et al. |
| 4,336,286 A | 6/1982 | Tomarin | | 5,045,389 A | 9/1991 | Campagna |
| 4,338,228 A | 7/1982 | Inoue et al. | | 5,055,438 A | 10/1991 | Canich |
| 4,339,507 A | 7/1982 | Kurtz et al. | | 5,064,802 A | 11/1991 | Stevens et al. |
| 4,371,576 A | 2/1983 | Machell | | 5,071,686 A | 12/1991 | Genske et al. |
| 4,379,190 A | 4/1983 | Schenck | | 5,076,870 A | 12/1991 | Sanborn |
| 4,395,519 A | 7/1983 | Minami et al. | | 5,082,705 A | 1/1992 | Rose |
| 4,403,007 A | 9/1983 | Coughlin | | 5,082,889 A | 1/1992 | Koizumi et al. |
| 4,405,774 A | 9/1983 | Miwa et al. | | 5,084,503 A | 1/1992 | Iacoviello |
| RE31,518 E | 2/1984 | Fischer | | 5,104,712 A | 4/1992 | Walters |
| 4,430,468 A | 2/1984 | Schumacher | | 5,109,784 A | 5/1992 | Lepe-Cisneros |
| 4,434,261 A | 2/1984 | Brugel et al. | | 5,115,030 A | 5/1992 | Tanaka et al. |
| 4,438,228 A | 3/1984 | Schenck | | 5,118,753 A | 6/1992 | Hikasa et al. |
| 4,439,483 A | 3/1984 | Ellis | | 5,122,404 A | 6/1992 | Fowler |
| 4,443,575 A | 4/1984 | Iwai et al. | | 5,130,069 A | 7/1992 | Tietz et al. |
| 4,469,752 A | 9/1984 | Yoshimura et al. | | 5,171,619 A | 12/1992 | Reuben |
| 4,477,299 A | 10/1984 | Friedrich | | 5,204,155 A | 4/1993 | Bell et al. |
| 4,483,894 A | 11/1984 | Porter et al. | | 5,205,092 A | 4/1993 | Taylor |
| RE31,826 E | 2/1985 | Machell | | 5,206,075 A | 4/1993 | Hodgson, Jr. |
| 4,501,846 A | 2/1985 | Goss | | 5,213,866 A | 5/1993 | Swope et al. |
| 4,508,771 A | 4/1985 | Peoples, Jr. et al. | | 5,218,071 A | 6/1993 | Tsutsui et al. |
| 4,522,857 A | 6/1985 | Higgins | | 5,240,530 A | 8/1993 | Fink |
| 4,525,257 A | 6/1985 | Kurtz et al. | | 5,256,224 A | 10/1993 | Gillyns et al. |
| 4,525,405 A | 6/1985 | McKinney et al. | | 5,266,392 A | 11/1993 | Land et al. |
| RE32,028 E | 11/1985 | Fischer | | 5,268,220 A | 12/1993 | Tajima et al. |
| 4,552,794 A | 11/1985 | Goss | | 5,272,236 A * | 12/1993 | Lai et al. .................. 526/348.5 |
| 4,563,378 A | 1/1986 | Roth | | 5,278,272 A | 1/1994 | Lai et al. |
| 4,576,665 A | 3/1986 | Machell | | 5,283,097 A | 2/1994 | Gillyns et al. |
| 4,579,762 A | 4/1986 | Ucci | | 5,288,349 A | 2/1994 | Fink |
| 4,582,554 A | 4/1986 | Bell et al. | | 5,292,845 A | 3/1994 | Kawasaki et al. |
| 4,613,632 A | 9/1986 | Aliani et al. | | 5,317,070 A | 5/1994 | Brant et al. |
| 4,617,208 A | 10/1986 | Cadenhead, Sr. | | 5,324,562 A | 6/1994 | Mullinax et al. |
| 4,619,853 A | 10/1986 | Blyth et al. | | 5,328,734 A | 7/1994 | Morese-Seguela et al. |
| 4,624,878 A | 11/1986 | Evans et al. | | 5,332,773 A | 7/1994 | Baker |
| 4,634,740 A | 1/1987 | Fujita et al. | | 5,346,963 A * | 9/1994 | Hughes et al. ................. 525/285 |
| 4,643,930 A | 2/1987 | Ucci | | 5,348,785 A | 9/1994 | Vinod |
| 4,654,247 A | 3/1987 | Randall, III et al. | | 5,358,792 A | 10/1994 | Mehta et al. |
| 4,656,074 A | 4/1987 | Conley et al. | | 5,370,757 A | 12/1994 | Corbin et al. |

| | | |
|---|---|---|
| 5,376,439 A | 12/1994 | Hodgson et al. |
| 5,380,574 A | 1/1995 | Katoh et al. |
| 5,389,448 A | 2/1995 | Schirmer et al. |
| 5,391,618 A | 2/1995 | Yamamoto et al. |
| 5,395,471 A | 3/1995 | Obijeski et al. |
| 5,407,965 A | 4/1995 | Park et al. |
| 5,408,040 A | 4/1995 | Grotendorst et al. |
| RE34,951 E | 5/1995 | Slosberg et al. |
| 5,414,040 A | 5/1995 | McKay et al. |
| 5,416,148 A | 5/1995 | Farah et al. |
| 5,424,016 A | 6/1995 | Kolosowski |
| 5,445,860 A | 8/1995 | Bova |
| 5,468,440 A | 11/1995 | McAlpin et al. |
| 5,468,808 A | 11/1995 | Peacock |
| 5,472,763 A | 12/1995 | Schwarz et al. |
| 5,481,786 A | 1/1996 | Smith et al. |
| 5,484,838 A | 1/1996 | Helms et al. |
| 5,486,398 A | 1/1996 | Weber et al. |
| 5,494,723 A | 2/1996 | Erren et al. |
| 5,500,980 A | 3/1996 | Morrow et al. |
| 5,504,282 A | 4/1996 | Pizzirusso et al. |
| 5,518,188 A | 5/1996 | Sharer |
| 5,524,317 A | 6/1996 | Nagahama et al. |
| 5,531,849 A | 7/1996 | Collins et al. |
| 5,535,945 A | 7/1996 | Sferrazza et al. |
| 5,540,968 A | 7/1996 | Higgins |
| 5,545,276 A * | 8/1996 | Higgins ......................... 156/79 |
| 5,558,916 A | 9/1996 | Heim et al. |
| 5,571,864 A | 11/1996 | Bates et al. |
| 5,576,374 A | 11/1996 | Betso et al. |
| 5,578,357 A | 11/1996 | Fink |
| 5,582,923 A | 12/1996 | Kale et al. |
| 5,584,149 A | 12/1996 | Wilson |
| 5,585,185 A | 12/1996 | Smith et al. |
| 5,591,802 A | 1/1997 | David et al. |
| 5,604,009 A | 2/1997 | Long et al. |
| 5,612,113 A | 3/1997 | Irwin, Sr. |
| 5,626,939 A | 5/1997 | Kotlair et al. |
| 5,630,896 A | 5/1997 | Corbin et al. |
| 5,639,816 A | 6/1997 | Yamaguchi et al. |
| 5,639,829 A | 6/1997 | Yamaguchi et al. |
| 5,654,364 A | 8/1997 | Bates et al. |
| 5,667,800 A | 9/1997 | De Vringer |
| 5,688,842 A | 11/1997 | Pate, III et al. |
| 5,698,480 A | 12/1997 | Geiman et al. |
| 5,714,224 A | 2/1998 | Gerry |
| 5,728,444 A | 3/1998 | Fink |
| 5,741,594 A | 4/1998 | Jialanella |
| 5,762,735 A | 6/1998 | Collins et al. |
| 5,763,040 A | 6/1998 | Murphy et al. |
| 5,800,898 A | 9/1998 | Gerry |
| 5,817,705 A | 10/1998 | Wilkes et al. |
| 5,819,481 A | 10/1998 | Wilson |
| 5,834,104 A | 11/1998 | Cordani |
| 5,846,461 A | 12/1998 | Collins et al. |
| 5,849,389 A | 12/1998 | Lunsford |
| 5,863,665 A | 1/1999 | Kale et al. |
| 5,869,591 A | 2/1999 | McKay et al. |
| 5,882,623 A | 3/1999 | Zaluska et al. |
| 5,902,663 A | 5/1999 | Justesen et al. |
| 5,910,358 A | 6/1999 | Thoen et al. |
| 5,929,129 A | 7/1999 | Feichtinger |
| 5,945,472 A | 8/1999 | Duong et al. |
| 5,972,462 A | 10/1999 | Sutherland et al. |
| 5,977,271 A | 11/1999 | McKay et al. |
| 6,051,300 A | 4/2000 | Fink |
| 6,124,370 A | 9/2000 | Walton et al. |
| 6,187,424 B1 | 2/2001 | Kjellqvist et al. |
| 6,214,924 B1 | 4/2001 | Bieser et al. |
| 6,228,479 B1 | 5/2001 | Zegler et al. |
| 6,235,822 B1 | 5/2001 | Whetten et al. |
| 6,254,056 B1 | 7/2001 | Alfred |
| 6,254,956 B1 | 7/2001 | Kjellqvist et al. |
| 6,300,398 B1 | 10/2001 | Jialanella et al. |
| 6,337,126 B1 | 1/2002 | Simpson et al. |
| 6,344,515 B1 | 2/2002 | Parikh et al. |
| 6,472,042 B1 | 10/2002 | Dibbern et al. |
| 6,503,595 B1 | 1/2003 | Kim et al. |
| 6,720,363 B2 | 4/2004 | Subramonian et al. |
| 6,838,147 B2 | 1/2005 | Burns, Jr. et al. |
| 7,338,698 B1 | 3/2008 | Bieser et al. |
| 7,357,971 B2 | 4/2008 | Bieser et al. |
| 2001/0046581 A1 | 11/2001 | Brumbelow et al. |
| 2002/0034606 A1 | 3/2002 | Miller et al. |
| 2002/0119280 A1 | 8/2002 | Higgins |
| 2002/0134486 A1 | 9/2002 | Brumbelow et al. |
| 2003/0211280 A1 | 11/2003 | Brumbelow et al. |
| 2004/0022991 A1 | 2/2004 | Higgins et al. |
| 2004/0062903 A1 | 4/2004 | Evans et al. |
| 2004/0079467 A1 | 4/2004 | Brumbelow et al. |
| 2004/0086683 A1 | 5/2004 | Higgins et al. |
| 2004/0191469 A1 | 9/2004 | Brodeur et al. |
| 2004/0202817 A1 | 10/2004 | Brumbelow et al. |
| 2005/0048245 A1 | 3/2005 | Mullinax et al. |
| 2005/0112320 A1 | 5/2005 | Wright |
| 2005/0233206 A1 | 10/2005 | Puttaiah et al. |
| 2007/0087159 A1 | 4/2007 | Wright |
| 2007/0087160 A1 | 4/2007 | Wright |
| 2007/0095453 A1 | 5/2007 | Brumbelow et al. |
| 2008/0280093 A1 | 11/2008 | Bieser et al. |

FOREIGN PATENT DOCUMENTS

| | | |
|---|---|---|
| CA | 684471 A | 4/1964 |
| CA | 2032599 A1 | 6/1992 |
| CA | 2146401 A1 | 6/1996 |
| DE | 2329713 A1 | 3/1975 |
| DE | 89 09 952 U1 | 10/1989 |
| DE | 8909452 U1 | 3/1990 |
| DE | 9115657 U1 | 2/1992 |
| DE | 92 12 981 U1 | 12/1992 |
| DE | 41 40 580 A1 | 6/1993 |
| DE | 9421584 U1 | 4/1996 |
| EP | 0 009 993 A1 | 4/1980 |
| EP | 0 018 233 A1 | 10/1980 |
| EP | 0 171 201 A2 | 2/1986 |
| EP | 0 207 734 A2 | 1/1987 |
| EP | 0 230 113 A2 | 7/1987 |
| EP | 0 294 770 A2 | 12/1988 |
| EP | 0 361 758 A2 | 4/1990 |
| EP | 0 407 059 A2 | 1/1991 |
| EP | 0416815 A2 | 3/1991 |
| EP | 0 518 014 A1 | 12/1992 |
| EP | 0 590 422 A1 | 4/1994 |
| EP | 0 590189 A1 | 4/1994 |
| EP | 0 596 457 A2 | 5/1994 |
| EP | 0 624 681 A2 | 11/1994 |
| EP | 0688899 A2 | 12/1995 |
| EP | 0 696 654 A1 | 2/1996 |
| FR | 1359514 A | 4/1964 |
| GB | 942363 A | 11/1963 |
| GB | 971958 A | 10/1964 |
| GB | 1065568 A | 4/1967 |
| GB | 1420624 A | 1/1976 |
| GB | 2067135 A | 7/1981 |
| GB | 2072578 A | 10/1981 |
| GB | 2284152 A | 5/1995 |
| JP | 47-28438 | 1/1972 |
| JP | 52-109580 A | 9/1977 |
| JP | 54-030995 A | 3/1979 |
| JP | 54-143362 A | 11/1979 |
| JP | 59024735 A | 2/1984 |
| JP | 61-119780 A | 6/1986 |
| JP | 62-121709 A | 6/1987 |
| JP | 62-172041 A | 7/1987 |
| JP | 63-028980 A | 2/1988 |
| JP | 63242530 A | 10/1988 |
| JP | 64-016848 U | 1/1989 |
| JP | 1-19689 | 4/1989 |
| JP | 11-56585 A | 6/1989 |
| JP | 1-272878 A | 10/1989 |
| JP | 3-30877 | 2/1991 |
| JP | 3048176 A | 3/1991 |
| JP | 4-133829 A | 5/1992 |
| JP | 6-105737 A | 4/1994 |
| JP | 6-172579 A | 6/1994 |
| JP | 25-14802 B2 | 7/1996 |
| JP | 1997 0229611 | 8/1997 |
| JP | 1998 0106390 | 4/1998 |

| | | |
|---|---|---|
| JP | 10-314005 A | 12/1998 |
| JP | 11035747 A | 2/1999 |
| JP | 11-060781 A | 3/1999 |
| JP | 11-140037 A | 5/1999 |
| JP | 11-302430 A | 11/1999 |
| JP | 1999 0325674 | 11/1999 |
| JP | 2000-198869 A | 7/2000 |
| JP | 2000-325218 A | 11/2000 |
| JP | 2001-139713 A | 5/2001 |
| JP | 2002 0112223 | 4/2002 |
| JP | 2003-306568 A | 10/2003 |
| JP | 2003-319864 A | 11/2003 |
| WO | WO-91/01221 A1 | 2/1991 |
| WO | WO-92/11097 A1 | 7/1992 |
| WO | WO-93/08221 A2 | 4/1993 |
| WO | WO-93/10303 A1 | 5/1993 |
| WO | WO-93/12151 A1 | 6/1993 |
| WO | WO-93/12285 A1 | 6/1993 |
| WO | WO-93/13254 A1 | 7/1993 |
| WO | WO-93/15909 A1 | 8/1993 |
| WO | WO-94/06859 A1 | 3/1994 |
| WO | WO-94/16138 A1 | 7/1994 |
| WO | WO-94/25647 A1 | 11/1994 |
| WO | WO-95/06771 A1 | 3/1995 |
| WO | WO-95/30788 A1 | 11/1995 |
| WO | WO-96/04419 A1 | 2/1996 |
| WO | WO-96/06132 A1 | 2/1996 |
| WO | WO-96/29460 A1 | 9/1996 |
| WO | WO-96/41913 A1 | 12/1996 |
| WO | WO-97/07976 A1 | 3/1997 |
| WO | WO-97/22471 A1 | 6/1997 |
| WO | WO-98/27143 A1 | 6/1998 |
| WO | WO-98/38374 A2 | 9/1998 |
| WO | WO-98/38375 A2 | 9/1998 |
| WO | WO-98/38376 A1 | 9/1998 |
| WO | WO-2005/052246 A1 | 6/2005 |

OTHER PUBLICATIONS

Restriction Requirement issued on Oct. 5, 1999 for U.S. Appl. No. 09/032,409, filed Feb. 27, 1998 (Inventor—Bieser et al.).
Response to Restriction Requirement filed on Mar. 14, 2000 for U.S. Appl. No. 09/032,409, filed Feb. 27, 1998 (Inventor—Bieser et al.).
Non-Final Office Action issued on May 24, 2000 for U.S. Appl. No. 09/032,409, filed Feb. 27, 1998 (Inventor—Bieser et al.).
Notice of Abandonment issued on Feb. 7, 2001 for U.S. Appl. No. 09/032,409, filed Feb. 27, 1998 (Inventor—Bieser et al.).
Restriction Requirement issued on Sep. 30, 2002 for U.S. Appl. No. 09/715,500, filed Nov. 17, 2000 (Inventor—Bieser et al.).
Response to Restriction Requirement filed on Dec. 2, 2002 for U.S. Appl. No. 09/715,500, filed Nov. 17, 2000 (Inventor—Bieser et al.).
Non-Final Office Action issued on Jan. 2, 2003 for U.S. Appl. No. 09/715,500, filed Nov. 17, 2000 (Inventor—Bieser et al.).
Preliminary Amendment filed on Apr. 14, 2003 for U.S. Appl. No. 10/418,227, filed Apr. 14, 2003 (Inventor—Bieser et al.).
Preliminary Amendment filed on Jul. 14, 2003 for U.S. Appl. No. 10/418,227, filed Apr. 14, 2003 (Inventor—Bieser et al.).
Non-Final Office Action issued on May 5, 2005 for U.S. Appl. No. 10/418,227, filed Apr. 14, 1998 (Inventor—Bieser et al.).
Response to Non-Final Office Action filed on Aug. 1, 2005 for U.S. Appl. No. 10/418,227, filed Apr. 14, 2003 (Inventor—Bieser et al.).
Notice of Non-Compliant Amendment issued on Aug. 11, 2005 for U.S. Appl. No. 10/418,227, filed Apr. 14, 2003 (Inventor—Bieser et al.).
Response to Notice of Non-Compliant Amendment filed on Sep. 12, 2005 for U.S. Appl. No. 10/418,227, filed Apr. 14, 2003 (Inventor—Bieser et al.).
Amendment Filed on Sep. 30, 2005 for U.S. Appl. No. 10/418,227, filed Apr. 14, 2003 (Inventor—Bieser et al.).
Final Rejection issued on Dec. 5, 2005 for U.S. Appl. No. 10/418,227, filed Apr. 14, 2003 (Inventor—Bieser et al.).
Notice of Appeal filed on Jun. 5, 2006 for U.S. Appl. No. 10/418,227, filed Apr. 14, 2003 (Inventor—Bieser et al.).
RCE and Amendment Filed on Jan. 8, 2007 for U.S. Appl. No. 10/418,227, filed Apr. 14, 2003 (Inventor—Bieser et al.).

Non-Final Office Action issued on Feb. 23, 2007 for U.S. Appl. No. 10/418,227, filed Apr. 14, 2003 (Inventor—Bieser et al.).
Response to Non-Final Office Action filed on Aug. 23, 2007 for U.S. Appl. No. 10/418,227, filed Apr. 14, 2003 (Inventor—Bieser et al.).
Final Rejection issued on Oct. 30, 2007 for U.S. Appl. No. 10/418,227, filed Apr. 14, 2003 (Inventor—Bieser et al.).
Notice of Appeal filed on Mar. 3, 2008 for U.S. Appl. No. 10/418,227, filed Apr. 14, 2003 (Inventor—Bieser et al.).
Appeal Brief filed on Oct. 3, 2008 for U.S. Appl. No. 10/418,227, filed Apr. 14, 2003 (Inventor—Bieser et al.).
Notice of Incomplete Appeal Brief issued on Oct. 17, 2008 for U.S. Appl. No. 10/418,227, filed Apr. 14, 2003 (Inventor—Bieser et al.).
Appeal Brief filed on Mar. 16, 2009 for U.S. Appl. No. 10/418,227, filed Apr. 14, 2003 (Inventor—Bieser et al.).
Examiner's Answer to Appeal Brief issued on Jun. 9, 2009 for U.S. Appl. No. 10/418,227, filed Apr. 14, 2003 (Inventor—Bieser et al.).
Decision of Appeal Board issued on Sep. 28, 2010 for U.S. Appl. No. 10/418,227, filed Apr. 14, 2003 (Inventor—Bieser et al.).
Restriction Requirement issued on May 20, 2000 for U.S. Appl. No. 09/032,410, filed Feb. 27, 1998 (Inventor—Beiser et al.).
Restriction Requirement issued on Apr. 3, 2001 for U.S. Appl. No. 09/032,410, filed Feb. 27, 1998 (Inventor—Beiser et al.).
Response to Restriction Requirement filed on Jul. 31, 2001 for U.S. Appl. No. 09/032,410, filed Feb. 27, 1998 (Inventor—Beiser et al.).
Non-Final Office Action issued on Aug. 17, 2001 for U.S. Appl. No. 09/032,410, filed Feb. 27, 1998 (Inventor—Beiser et al.).
Notice of Abandonment issued on Mar. 28, 2002 for U.S. Appl. No. 09/032,410, filed Feb. 27, 1998 (Inventor—Beiser et al.).
Preliminary Amendment issued on Feb. 15, 2002 for for U.S. Appl. No. 10/077,609, filed Feb. 15, 2002 (Inventor—Beiser et al.).
Non-Final Office Action issued on Feb. 15, 2002 for U.S. Appl. No. 10/077,609, filed Feb. 15, 2002 (Inventor—Beiser et al.).
Preliminary Amendment filed on Jun. 19, 2003 for U.S. Appl. No. 10/601,141, filed Jun. 19, 2003 (Inventor—Beiser et al.).
Non-Final Office Action issued on Dec. 4, 2003 for U.S. Appl. No. 10/601,141, filed Jun. 19, 2003 (Inventor—Beiser et al.).
Preliminary Amendment Filed on Nov. 7, 2006 for U.S. Appl. No. 11/594,493, filed Nov. 7, 2006 (Inventor—Beiser et al.).
Non-Final Office Action issued on Jul. 29, 2008 for U.S. Appl. No. 11/594,493, filed Nov. 7, 2006 (Inventor—Beiser et al.).
Response to Non-Final Office Action filed on Jan. 29, 2009 for U.S. Appl. No. 11/594,493, filed Nov. 7, 2006 (Inventor—Beiser et al.).
Final Rejection issued on Apr. 3, 2009 for U.S. Appl. No. 11/594,493, filed Nov. 7, 2006 (Inventor—Beiser et al.).
Notice of Appeal filed on Oct. 1, 2009 for U.S. Appl. No. 11/594,493, filed Nov. 7, 2006 (Inventor—Beiser et al.).
Appeal Brief filed on Apr. 1, 2010 for U.S. Appl. No. 11/594,493, filed Nov. 7, 2006 (Inventor—Beiser et al.).
Notice of Non-Compliant Appeal Brief issued on May 17, 2010 for U.S. Appl. No. 11/594,493, filed Nov. 7, 2006 (Inventor—Beiser et al.).
Appeal Brief Filed on Sep. 16, 2010 for U.S. Appl. No. 11/594,493, filed Nov. 7, 2006 (Inventor—Beiser et al.).
Examiner's Answer to Appeal Brief issued on Oct. 27, 2010 for U.S. Appl. No. 11/594,493, filed Nov. 7, 2006 (Inventor—Beiser et al.).
Non-Final Office Action issued on Oct. 8, 1999 for U.S. Appl. No. 09/032,893, filed Feb. 27, 1998 (Inventor—Bieser et al.).
Response to Non-Final Office Action filed on Mar. 13, 2000 for U.S. Appl. No. 09/032,893, filed Feb. 27, 1998 (Inventor—Bieser et al.).
Final Rejection issued on May 23, 2000 for U.S. Appl. No. 09/032,893, filed Feb. 27, 1998 (Inventor—Bieser et al.).
CPA/Response to Final Rejection filed on Oct. 23, 2000 for U.S. Appl. No. 09/032,893, filed Feb. 27, 1998 (Inventor—Bieser et al.).
Non-Final Office Action issued on Nov. 30, 2000 for U.S. Appl. No. 09/032,893, filed Feb. 27, 1998 (Inventor—Bieser et al.).
Response to Non-Final Office Action filed on May 30, 2001 for U.S. Appl. No. 09/032,893, filed Feb. 27, 1998 (Inventor—Bieser et al.).
Amendment/Petition to Revive filed on Jul. 25, 2001 for U.S. Appl. No. 09/032,893, filed Feb. 27, 1998 (Inventor—Bieser et al.).
Amendment Filed on Aug. 16, 2001 for U.S. Appl. No. 09/032,893, filed Feb. 27, 1998 (Inventor—Bieser et al.).
Petition Decision issued on Nov. 5, 2001 for U.S. Appl. No. 09/032,893, filed Feb. 27, 1998 (Inventor—Bieser et al.).

Amendment Filed on Nov. 20, 2001 for U.S. Appl. No. 09/032,893, filed Feb. 27, 1998 (Inventor—Bieser et al.).
Non-Final Office Action issued on Feb. 26, 2002 for U.S. Appl. No. 09/032,893, filed Feb. 27, 1998 (Inventor—Bieser et al.).
Response to Non-Final Office Action issued on Jul. 31, 2002 for U.S. Appl. No. 09/032,893, filed Feb. 27, 1998 (Inventor—Bieser et al.).
Non-Final Office Action issued on Aug. 28, 2002 for U.S. Appl. No. 09/032,893, filed Feb. 27, 1998 (Inventor—Bieser et al.).
Response to Non-Final Office Action filed on Oct. 28, 2002 for U.S. Appl. No. 09/032,893, filed Feb. 27, 1998 (Inventor—Bieser et al.).
Final Rejection issued on Jan. 15, 2003 for U.S. Appl. No. 09/032,893, filed Feb. 27, 1998 (Inventor—Bieser et al.).
RCE and Amendment filed on Apr. 15, 2003 for U.S. Appl. No. 09/032,893, filed Feb. 27, 1998 (Inventor—Bieser et al.).
Non-Final Office Action issued on Jul. 15, 2003 for U.S. Appl. No. 09/032,893, filed Feb. 27, 1998 (Inventor—Bieser et al.).
Non-Final Office Action issued on Aug. 7, 2003 for U.S. Appl. No. 09/032,893, filed Feb. 27, 1998 (Inventor—Bieser et al.).
Examiner Interview Summary Record issued on Sep. 5, 2003 for U.S. Appl. No. 09/032,893, filed Feb. 27, 1998 (Inventor—Bieser et al.).
Response to Non-Final Office Action filed on Nov. 7, 2003 for U.S. Appl. No. 09/032,893, filed Feb. 27, 1998 (Inventor—Bieser et al.).
Final Rejection issued on Feb. 17, 2004 for U.S. Appl. No. 09/032,893, filed Feb. 27, 1998 (Inventor—Bieser et al.).
Notice of Appeal filed on May 17, 2004 for U.S. Appl. No. 09/032,893, filed Feb. 27, 1998 (Inventor—Bieser et al.).
Appeal Brief filed on Sep. 10, 2004 for U.S. Appl. No. 09/032,893, filed Feb. 27, 1998 (Inventor—Bieser et al.).
Non-Final Office Action issued on Dec. 16, 2004 for U.S. Appl. No. 09/032,893, filed Feb. 27, 1998 (Inventor—Bieser et al.).
Notice of Appeal filed on Mar. 11, 2005 for U.S. Appl. No. 09/032,893, filed Feb. 27, 1998 (Inventor—Bieser et al.).
Appeal Brief filed on May 13, 2005 for U.S. Appl. No. 09/032,893, filed Feb. 27, 1998 (Inventor—Bieser et al.).
RCE/Amendment Filed Oct. 26, 2005 for U.S. Appl. No. 09/032,893, filed Feb. 27, 1998 (Inventor—Bieser et al.).
Non-Final Office Action issued on Jan. 20, 2006 for U.S. Appl. No. 09/032,893, filed Feb. 27, 1998 (Inventor—Bieser et al.).
Response to Non-Final Office Action filed on Jul. 24, 2006 for U.S. Appl. No. 09/032,893, filed Feb. 27, 1998 (Inventor—Bieser et al.).
Non-Final Office Action issued on Nov. 2, 2006 for U.S. Appl. No. 09/032,893, filed Feb. 27, 1998 (Inventor—Bieser et al.).
Response to Non-Final Office Action filed on Apr. 5, 2007 for U.S. Appl. No. 09/032,893, filed Feb. 27, 1998 (Inventor—Bieser et al.).
Final Rejection issued on May 3, 2007 for U.S. Appl. No. 09/032,893, filed Feb. 27, 1998 (Inventor—Bieser et al.).
Response to Final Rejection filed on Sep. 7, 2007 for U.S. Appl. No. 09/032,893, filed Feb. 27, 1998 (Inventor—Bieser et al.).
Notice of Allowance issued on Oct. 2, 2007 for U.S. Appl. No. 09/032,893, filed Feb. 27, 1998 (Inventor—Bieser et al.).
Non-Final Office Action issued on Aug. 7, 2006 for U.S. Appl. No. 11/193,277, filed Jul. 29, 2005 (Inventor—Bieser et al.).
Response to Non-Final Office Action filed on Feb. 12, 2007 for U.S. Appl. No. 11/193,277, filed Jul. 29, 2005 (Inventor—Bieser et al.).
Final Rejection issued on May 3, 2007 for U.S. Appl. No. 11/193,277, filed Jul. 29, 2005 (Inventor—Bieser et al.).
Response to Final Rejection filed on Sep. 7, 2007 for U.S. Appl. No. 11/193,277, filed Jul. 29, 2005 (Inventor—Bieser et al.).
Notice of Allowance issued on Sep. 18, 2007 for U.S. Appl. No. 11/193,277, filed Jul. 29, 2005 (Inventor—Bieser et al.).
Amendment after Allowance Filed on Dec. 17, 2007 for U.S. Appl. No. 11/193,277, filed Jul. 29, 2005 (Inventor—Bieser et al.).
Restriction Requirement issued on Sep. 16, 2005 for U.S. Appl. No. 10/719,389, filed Nov. 20, 2003 (Inventor—Wright).
Response to Restriction Requirement filed on Oct. 17, 2005 for U.S. Appl. No. 10/719,389, filed Nov. 20, 2003 (Inventor—Wright).
Non-Final Office Action issued on Dec. 23, 2005 for U.S. Appl. No. 10/719,389, filed Nov. 20, 2003 (Inventor—Wright).
Response to Non-Final Office Action filed on Jun. 27, 2006 for U.S. Appl. No. 10/719,389, filed Nov. 20, 2003 (Inventor—Wright).
Final Rejection issued on Sep. 22, 2006 for U.S. Appl. No. 10/719,389, filed Nov. 20, 2003 (Inventor—Wright).
Notice of Appeal filed on Feb. 27, 2007 for U.S. Appl. No. 10/719,389, filed Nov. 20, 2003 (Inventor—Wright).
RCE/Amendment Filed on Sep. 24, 2007 for U.S. Appl. No. 10/719,389, filed Nov. 20, 2003 (Inventor—Wright).
Non-Final Office Action issued on Dec. 12, 2007 for U.S. Appl. No. 10/719,389, filed Nov. 20, 2003 (Inventor—Wright).
Response to Non-Final Office Action filed on Jun. 12, 2008 for U.S. Appl. No. 10/719,389, filed Nov. 20, 2003 (Inventor—Wright).
Final Rejection issued on Jul. 18, 2008 for U.S. Appl. No. 10/719,389, filed Nov. 20, 2003 (Inventor—Wright).
Notice of Appeal filed on Jan. 21, 2009 for U.S. Appl. No. 10/719,389, filed Nov. 20, 2003 (Inventor—Wright).
RCE and Amendment Filed on Aug. 21, 2009 for U.S. Appl. No. 10/719,389, filed Nov. 20, 2003 (Inventor—Wright).
Non-Final Office Action issued on Sep. 29, 2009 for U.S. Appl. No. 10/719,389, filed Nov. 20, 2003 (Inventor—Wright).
Response to Non-Final Office Action issued on Mar. 1, 2010 for U.S. Appl. No. 10/719,389, filed Nov. 20, 2003 (Inventor—Wright).
Non-Final Office Action issued on May 11, 2010 for U.S. Appl. No. 10/719,389, filed Nov. 20, 2003 (Inventor—Wright).
Notice of Appeal filed on Nov. 12, 2010 for U.S. Appl. No. 10/719,389, filed Nov. 20, 2003 (Inventor—Wright).
Appeal Brief filed on Jun. 13, 2011 for U.S. Appl. No. 10/719,389, filed Nov. 20, 2003 (Inventor—Wright).
Examiner's Answer to Appeal Brief issued on Jul. 25, 2011 for U.S. Appl. No. 10/719,389, filed Nov. 20, 2003 (Inventor—Wright).
Preliminary Amendment filed on Nov. 26, 2006 for U.S. Appl. No. 11/564,771, filed Nov. 29, 2006 (Inventor—Wright).
Non-Final Office Action issued on Sep. 18, 2008 for U.S. Appl. No. 11/564,771, filed Nov. 29, 2006 (Inventor—Wright).
Response to Non-Final Office Action Mar. 18, 2009 for U.S. Appl. No. 11/564,771, filed Nov. 29, 2006 (Inventor—Wright).
Final Office Action issued on Jul. 20, 2009 for U.S. Appl. No. 11/564,771, filed Nov. 29, 2006 (Inventor—Wright).
Notice of Appeal filed on Jan. 20, 2010 for U.S. Appl. No. 11/564,771, filed Nov. 29, 2006 (Inventor—Wright).
Appeal Brief filed on Apr. 20, 2010 for U.S. Appl. No. 11/564,771, filed Nov. 29, 2006 (Inventor—Wright).
Notice of Non-Compliant Appeal Brief issued on May 6, 2010 for U.S. Appl. No. 11/564,771, filed Nov. 29, 2006 (Inventor—Wright).
Appeal Brief filed on Jun. 7, 2010 for U.S. Appl. No. 11/564,771, filed Nov. 29, 2006 (Inventor—Wright).
Non-Final Office Action issued on Aug. 19, 2010 for U.S. Appl. No. 11/564,771, filed Nov. 29, 2006 (Inventor—Wright).
Response to Non-Final Office Action filed on Feb. 22, 2011 for U.S. Appl. No. 11/564,771, filed Nov. 29, 2006 (Inventor—Wright).
Final Office Action issued on Mar. 2, 2011 for U.S. Appl. No. 11/564,771, filed Nov. 29, 2006 (Inventor—Wright).
Notice of Appeal filed on Sep. 02, 2011 for U.S. Appl. No. 11/564,771, filed Nov. 29, 2006 (Inventor—Wright).
Appeal Brief filed on Apr. 02, 2012 for U.S. Appl. No. 11/564,771, filed Nov. 29, 2006 (Inventor—Wright).
Examiner's Answer to Appeal Brief issued on May 2, 2012 for U.S. Appl. No. 11/564,771, filed Nov. 29, 2006 (Inventor—Wright).
Preliminary Amendment filed on Nov. 29, 2006 for U.S. Appl. No. 11/564,771, filed Nov. 29, 2006 (Inventor—Wright).
Non-Final Office Action issued on Sep. 10, 2008 for U.S. Appl. No. 11/564,771, filed Nov. 29, 2006 (Inventor—Wright).
Response to Non-Final Office Action filed on Mar. 10, 2009 for U.S. Appl. No. 11/564,771, filed Nov. 29, 2006 (Inventor—Wright).
Non-Final Office Action issued on May 21, 2009 for U.S. Appl. No. 11/564,771, filed Nov. 29, 2006 (Inventor—Wright).
Response to Non-Final Office Action Nov. 23, 2009 for U.S. Appl. No. 11/564,771, filed Nov. 29, 2006 (Inventor—Wright).
Final Office Action issued on Mar. 3, 2010 for U.S. Appl. No. 11/564,771, filed Nov. 29, 2006 (Inventor—Wright).
Notice of Appeal filed on Jul. 6, 2010 for U.S. Appl. No. 11/564,771, filed Nov. 29, 2006 (Inventor—Wright).
RCE/Amendment filed on Feb. 7, 2011 for U.S. Appl. No. 11/564,771, filed Nov. 29, 2006 (Inventor—Wright).
Non Final Office Action issued on Feb. 24, 2011 for U.S. Appl. No. 11/564,771, filed Nov. 29, 2006 (Inventor—Wright).

Notice of Appeal filed on Aug. 24, 2011 for U.S. Appl. No. 11/564,771, filed Nov. 29, 2006 (Inventor—Wright).
Appeal Brief filed on Mar. 26, 2012 for U.S. Appl. No. 11/564,771, filed Nov. 29, 2006 (Inventor—Wright).
Non Final Office Action issued on Feb. 28, 2011 for U.S. Appl. No. 11/564,771, filed Nov. 29, 2006 (Inventor—Wright).
Response to Office Action filed on Aug. 29, 2011 for U.S. Appl. No. 11/564,771, filed Nov. 29, 2006 (Inventor—Wright).
Final Office Action issued on Nov. 2, 2011 for U.S. Appl. No. 11/564,771, filed Nov. 29, 2006 (Inventor—Wright).
Office Action issued on Oct. 23, 2000 for AU Pat. App. No. 63440/98, national phase of Intl. App. No. PCT/US1998/03993 filed Feb. 27, 1998 (Inventor—Bieser et al.).
Examination Report issued on May 15, 2003 for CA Pat. App. No. 2,282,314, national phase of Intl. App. No. PCT/US1998/03993 filed Feb. 27, 1998 (Inventor—Bieser et al.).
Response to Examination Report filed on Oct. 29, 2003 for CA Pat. App. No. 2,282,314, national phase of Intl. App. No. PCT/US1998/03993 filed Feb. 27, 1998 (Inventor—Bieser et al.).
Notice of Allowance issued on Dec. 18, 2009 for CA Pat. App. No. 2,282,314, national phase of Intl. App. No. PCT/US1998/03993 filed Feb. 27, 1998 (Inventor—Bieser et al.).
Examination Report issued on Jul. 13, 2009 for MX Pat. App. No. PA/a/1999/008016, national phase of Intl. App. No. PCT/US1998/03993 filed Feb. 27, 1998 (Inventor—Bieser et al.).
International Search Report issued on Jul. 2, 1998 for Intl. App. No. PCT/US1998/03993 filed Feb. 27, 1998 (Inventor—Bieser et al.).
Written Opinion issued on Mar. 5, 1999 Intl. App. No. PCT/US1998/03993 filed Feb. 27, 1998 (Inventor—Bieser et al.).
International Preliminary Examination Report issued on Jul. 29, 1999 Intl. App. No. PCT/US1998/03993 filed Feb. 27, 1998 (Inventor—Beiser et al.).
Examination Report issued on 10-23-200 for AU Pat App No. 66763/98, national phase of PCT/US1998/03992, filed on Feb. 27, 1998 (Inventor—Beiser et al.).
Examination Report issued on Sep. 25, 2001 for CA Pat App No. 2,282,351, national phase of PCT/US1998/03992, filed on Feb. 27, 1998 (Inventor—Beiser et al.).
Examination Report issued on Aug. 17, 2009 for MX Pat App No. PA/a/1999/008017, national phase of PCT/US1998/03992, filed on Feb. 27, 1998 (Inventor—Beiser et al.).
International Search Report issued on Dec. 3, 1998 for Intl. App. No. PCT/US1998/03992, filed on Feb. 27, 1998 (Inventor—Beiser et al.).
International Preliminary Report on Patentability for Intl. App. No. PCT/US1998/03992, filed on Feb. 27, 1998 (Inventor—Beiser et al.).
Examination Report issued on Apr. 10, 2006 for CA Pat App No. 2,281,928, national phase of Intl. App No. PCT/US1998/03886 filed on Feb. 27, 1998 (Inventor—Bieser et al.).
Response to Examination Report filed on Oct. 10, 2006 for CA Pat App No. 2,281,928, national phase of Intl. App No. PCT/US1998/03886 filed on Feb. 27, 1998 (Inventor—Bieser et al.).
Notice of Allowance issued on Sep. 6, 2007 for CA Pat App No. 2,281,928, national phase of Intl. App No. PCT/US1998/03886 filed on Feb. 27, 1998 (Inventor—Bieser et al.).
Office Action issued on Feb. 13, 2004 for CN Pat App No. ZL98803677.0, national phase of Intl. App No. PCT/US1998/03886 filed on Feb. 27, 1998 (Inventor—Bieser et al.).
Claims from Chinese Patent issued on Dec. 29, 2004 for CN Pat App No. ZL98803677.0, national phase of Intl. App No. PCT/US1998/03886 filed on Feb. 27, 1998 (Inventor—Bieser et al.).
Office Action issued on Jan. 20, 2006 for CN Pat App No. 2004-10069613.7, national phase of Intl. App No. PCT/US1998/03886 filed on Feb. 27, 1998 (Inventor—Bieser et al.).
Claims from Chinese Patent issued on Apr. 4, 2007 for CN Pat App No. 2004-10069613.7, national phase of Intl. App No. PCT/US1998/03886 filed on Feb. 27, 1998 (Inventor—Bieser et al.).
Communication from European Patent Office issued on Jun. 21, 2001 for EP Pat App No. 98908770.5, national phase of Intl. App. No. PCT/US1998/03886 filed on Feb. 27, 1998 (Inventor—Bieser et al.).
Response to Communication filed on Oct. 24, 2001 EP Pat App No. 98908770.5, national phase of Intl. App No. PCT/US1998/03886 filed on Feb. 27, 1998 (Inventor—Bieser et al.).
Response to Communication filed on May 2, 2002 EP Pat App No. 98908770.5, national phase of Intl. App No. PCT/US1998/03886 filed on Feb. 27, 1998 (Inventor—Bieser et al.).
Response to Communication filed on Oct. 21, 2002 EP Pat App No. 98908770.5, national phase of Intl. App No. PCT/US1998/03886 filed on Feb. 27, 1998 (Inventor—Bieser et al.).
Intent to Grant issued on Dec. 12, 2002 EP Pat App No. 98908770.5, national phase of Intl. App. No. PCT/US1998/03886 filed on Feb. 27, 1998 (Inventor—Bieser et al.).
Decision to Grant European Patent issued on May 22, 2003 Ep Pat App No. 98908770.5, national phase of Intl. App. No. PCT/US1998/03886 filed on Feb. 27, 1998 (Inventor—Bieser et al.).
Certificate of Grant issued on Nov. 9, 2007 for HK Pat App No. 5107916.1, national phase of Intl. App No. PCT/US1998/03886 filed on Feb. 27, 1998 (Inventor—Bieser et al.).
Office Action issued on Oct. 3, 2006 for JP Pat App No. 537905/1998, national phase of Intl. App. No. PCT/US1998/03886 filed on Feb. 27, 1998 (Inventor—Bieser et al.).
Decision to Grant issued on May 22, 2007 JP Pat App No. 537905/1998, national phase of Intl. App. No. PCT/US1998/03886 filed on Feb. 27, 1998 (Inventor—Bieser et al.).
Office Action issued on Dec. 4, 2001 NO Pat App No. 1998-4182, national phase of Intl. App. No. PCT/US1998/03886 filed on Feb. 27, 1998 (Inventor—Bieser et al.).
International Search Report issued on Oct. 15, 1998 for Intl. App No. PCT/US1998/03886 filed on Feb. 27, 1998 (Inventor—Bieser et al.).
Written Opinion issued on Dec. 10, 1998 for Intl. App No. PCT/US1998/03886 filed on Feb. 27, 1998 (Inventor—Bieser et al.).
Response to Written Opinion filed on Mar. 16, 1999 for Intl. App No. PCT/US1998/03886 filed on Feb. 27, 1998 (Inventor—Bieser et al.).
International Preliminary Examination Report issued on Jun. 2, 1999 for Intl. App No. PCT/US1998/03886 filed on Feb. 27, 1998 (Inventor—Bieser et al.).
Office Action issued on Jan. 22, 2001 for RU Pat App No. 99120686, national phase of Intl. App. No. PCT/US1998/03886 filed on Feb. 27, 1998 (Inventor—Bieser et al.).
Office Action issued on Jul. 17, 2001 for RU Pat App No. 99120686, national phase of Intl. App No. PCT/US1998/03886 filed Feb. 27, 1998 (Inventor—Bieser et al.).
Russian Patent issued on Aug. 27, 2002 for RU Pat App No. 99120686, national phase of Intl. App No. PCT/US1998/03886 filed Feb. 27, 1998 (Inventor—Bieser et al.).
Examination Report issued on Feb. 10, 2009 for AU Pat App No. 2004293827, national phase of PCT/US2004/39070, filing date Nov. 19, 2004 (Applicant—Shaw Industries Group, Inc.; Inventor—Wright).
Response to Examination Report filed on Sep. 30, 2010 for AU Pat App No. 2004293827, national phase of PCT/US2004/39070, filing date Nov. 19, 2004 (Applicant—Shaw Industries Group, Inc.; Inventor—Wright).
Notice of Acceptance issued on Oct. 29, 2010 for AU Pat App No. 2004293827, national phase of PCT/US2004/39070, filing date Nov. 19, 2004 (Applicant—Shaw Industries Group, Inc.; Inventor—Wright).
Examination Report issued on Mar. 12, 2012 for CA Patent App No. 2,546,806, national phase of PCT/US2004/39070, filing date Nov. 19, 2004 (Applicant—Shaw Industries Group, Inc.; Inventor—Wright).
First Office Action issued on Jul. 25, 2008 for CN Pat App No. 200480040653.7, national phase of PCT/US2004/39070, filing date Nov. 19, 2004 (Applicant—Shaw Industries Group, Inc.; Inventor—Wright).
Second Office Action issued on Sep. 18, 2009 for CN Pat App No. 200480040653.7, national phase of PCT/US2004/39070, filing date Nov. 19, 2004 (Applicant—Shaw Industries Group, Inc.; Inventor—Wright).
Response filed on Feb. 3, 2010 for CN Pat App No. 200480040653.7, national phase of PCT/US2004/39070, filing date Nov. 19, 2004 (Applicant—Shaw Industries Group, Inc.; Inventor—Wright).
Decision of Rejection issued on Oct. 21, 2010 for CN Pat App No. 200480040653.7, national phase of PCT/US2004/39070, filing date Nov. 19, 2004 (Applicant—Shaw Industries Group, Inc.; Inventor—Wright).

Request for Reexamination filed on Feb. 9, 2011 for CN Pat App No. 200480040653.7, national phase of PCT/US2004/39070, filing date Nov. 19, 2004 (Applicant—Shaw Industries Group, Inc.; Inventor—Wright).
Decision of Reexamination issued on Dec. 22, 2011 for CN Pat App No. 200480040653.7, national phase of PCT/US2004/39070, filing date Nov. 19, 2004 (Applicant—Shaw Industries Group, Inc.; Inventor—Wright).
Notification of Grant issued on Jan. 20, 2012 for CN Pat App No. 200480040653.7, national phase of PCT/US2004/39070, filing date Nov. 19, 2004 (Applicant—Shaw Industries Group, Inc.; Inventor—Wright).
Preliminary Amendment filed on Dec. 21, 2006 for EP Pat App No. 04811734.5, national phase of PCT/US2004/39070, filing date Nov. 19, 2004 (Applicant—Shaw Industries Group, Inc.; Inventor—Wright).
Official Communication issued on Nov. 2, 2010 for EP Pat App No. 04811734.5, national phase of PCT/US2004/39070, filing date Nov. 19, 2004 (Applicant—Shaw Industries Group, Inc.; Inventor—Wright).
Reply to Communication filed on May 12, 2011 for EP Pat App No. 04811734.5, national phase of PCT/US2004/39070, filing date Nov. 19, 2004 (Applicant—Shaw Industries Group, Inc.; Inventor—Wright).
Official Communication issued on May 23, 2011 for EP Pat App No. 04811734.5, national phase of PCT/US2004/39070, filing date Nov. 19, 2004 (Applicant—Shaw Industries Group, Inc.; Inventor—Wright).
Reply to Communication filed on Sep. 28, 2011 for EP Pat App No. 04811734.5, national phase of PCT/US2004/39070, filing date Nov. 19, 2004 (Applicant—Shaw Industries Group, Inc.; Inventor—Wright).
Official Communication issued on Oct. 11, 2011 for EP Pat App No. 04811734.5, national phase of PCT/US2004/39070, filing date Nov. 19, 2004 (Applicant—Shaw Industries Group, Inc.; Inventor—Wright).
Official Action issued on Aug. 18, 2010 for JP Pat App No. 2006-541587, national phase of PCT/US2004/39070, filing date Nov. 19, 2004 (Applicant—Shaw Industries Group, Inc.; Inventor—Wright).
Response filed on Feb. 17, 2011 for JP Pat App No. 2006-541587, national phase of PCT/US2004/39070, filing date Nov. 19, 2004 (Applicant—Shaw Industries Group, Inc.; Inventor—Wright).
Final Office Action issued on May 31, 2011 for JP Pat App No. 2006-541587, national phase of PCT/US2004/39070, filing date Nov. 19, 2004 (Applicant—Shaw Industries Group, Inc.; Inventor—Wright).
Notice of Appeal/Amendment filed on Sep. 28, 2011 for JP Pat App No. 2006-541587, national phase of PCT/US2004/39070, filing date Nov. 19, 2004 (Applicant—Shaw Industries Group, Inc.; Inventor—Wright).
Official Action issued on Mar. 8, 2012 for JP Pat App No. 2006-541587, national phase of PCT/US2004/39070, filing date Nov. 19, 2004 (Applicant—Shaw Industries Group, Inc.; Inventor—Wright).
Written Opinion issued on Mar. 17, 2005 for Intl Pat App No. PCT/US2004/39070, filing date Nov. 19, 2004 (Applicant—Shaw Industries Group, Inc.; Inventor—Wright).
International Search Report issued on Mar. 21, 2005 for Intl Pat App No. PCT/US2004/39070, filing date Nov. 19, 2004 (Applicant—Shaw Industries Group, Inc.; Inventor—Wright).
International Preliminary Report on Patentability issued on May 22, 2006 for Intl Pat App No. PCT/US2004/39070, filing date Nov. 19, 2004 (Applicant—Shaw Industries Group, Inc.; Inventor—Wright).
First Office Action issued on Jun. 4, 2010 for CN Pat App No. 200680027014.6, national phase of Intl Pat App No. PCT/US2006/007282, Mar. 1, 2006 filing date (Applicant—Shaw Industries Group, Inc.; Inventor—Wright).
Second Office Action issued on Sep. 5, 2011 for CN Pat App No. 200680027014.6, national phase of Intl Pat App No. PCT/US2006/007282, Mar. 1, 2006 filing date (Applicant—Shaw Industries Group, Inc.; Inventor—Wright).
Response to Office Action filed on Jan. 19, 2012 for CN Pat App No. 200680027014.6, national phase of Intl Pat App No. PCT/US2006/007282, Mar. 1, 2006 filing date (Applicant—Shaw Industries Group, Inc.; Inventor—Wright).
Office Action issued on Nov. 9, 2010 for EP Pat App No. 06736576.7, national phase of Intl Pat App No. PCT/US2006/007282, filing date Mar. 1, 2006 (Applicant—Shaw Industries Group, Inc.; Inventor—Wright).
International Search Report with Written Opinion issued on Jul. 6, 2006 for Intl Pat App No. PCT/US2006/007282, filed Mar. 1, 2006 (Applicant—Shaw Industries Group, Inc.; Inventor—Wright).
International Preliminary Report on Patentability issued on Dec. 13, 2007 for Intl Pat App No. PCT/US2006/007282, filing date Mar. 1, 2006 (Applicant—Shaw Industries Group, Inc.; Inventor—Wright).
Preliminary Amendment filed on Apr. 14, 2003 for U.S. Appl. No. 12/952,709, filed Nov. 23, 2010 (Inventor—Bieser et al.).
Non-Final Office Action issued on Mar. 28, 2012 for U.S. Appl. No. 12/952,709, filed Nov. 23, 2010 (Inventor—Bieser et al.).
Non-Final Office Action issued on Feb. 19, 2009 for U.S. Appl. No. 11/963,263, filed Dec. 21, 2007 (Inventor—Bieser et al.).
Response to Non-Final Office Action filed on Aug. 19, 2009 for U.S. Appl. No. 11/963,263, filed Dec. 21, 2007 (Inventor—Bieser et al.).
Final Office Action issued on Dec. 8, 2009 for U.S. Appl. No. 11/963,263, filed Dec. 21, 2007 (Inventor—Bieser et al.).
Notice of Appeal filed on Mar. 17, 2010 for U.S. Appl. No. 11/963,263, filed Dec. 21, 2007 (Inventor—Bieser et al.).
Appeal Brief filed on May 17, 2010 for U.S. Appl. No. 11/963,263, filed Dec. 21, 2007 (Inventor—Bieser et al.).
Notice of Allowance issued on Jul. 13, 2010 for U.S. Appl. No. 11/963,263, filed Dec. 21, 2007 (Inventor—Bieser et al.).
Notice of Allowance issued on Oct. 27, 2010 for U.S. Appl. No. 11/963,263, filed Dec. 21, 2007 (Inventor—Bieser et al.).
Abstract No. 73-67789U/45: Abstract (Basic) of DE 2319431 A (1974).
Abstract No. 78-39024A/22: Abstract (Basic) of JP 53042235 A 1978).
Abstract No. 68-98358P/00: Abstract (Basic) of NL 6709750 A (1968).
Abstract No. 68-94017P/00: Abstract (Basic) of BE 695574 A (1968).
Abstract No. 68-93997P/00: Abstract (Basic) of BE 694890 A (1968).
Abstract No. 68-87922P/00: Abstract (Basic) of BE 692652 A (1968).
C. P. Rader, "Elastomeric alloy TPEs", Modern Plastics Encyclopedia, pp. 112, (1989).
C. D. Shedd, "Introduction to TPE's", Modern Plastics Encyclopedia, pp. 110, (1989).
T. W. Sheridan, "Engineering TPEs", Modern Plastics Encyclopedia, pp. 112, (1989).
C. S. Speed, "Structure/Property Relationships in Exxpol.TM. Polymers", Polyolefins VII International Conference, Feb. 24-27, 1991.
M. Jeffries, "The Marketing Challenge Created by Single Site Catalysts in Polyolefins", Proceedings of the First International Business Forum on Specialty Polyolefins SPO '91, Sep. 24-26, 1991.
M. Henewerk, et al., "New Specialty Linear Polymers (SLP) for Power Cables", Proceedings of the 1991 IEEE Power Engineering Society, Sep. 22-27, 1991.
D. Van der Sanden, "A new family of linear ethylene polymers provides enhanced sealing performance", Tappi Journal, pp. 99, Feb. 1992.
M. R. Rifi, et al., "Flexomer.TM. Polyolefins: A Bridge between Polyethylene and Rubbers", pp. 1-7. (1990).
H. Tenner, "Extrusion recycling of plastics waste", Chapter 21, Plastics Extrusion Technology (no date).
A.L. Griff, Plastics Application Series, pp. 182,183 and 186,187,Plastics Extrusion Technology (1976).
Dow Plastics, "Dowlex 3010 Polyethylene Resin" (no date).
Dow Plastics, "Dow Low Density Polyethylene Resins" (no date).
Dow Plastics, "Dow LDPE Low Density Polyethylene Resins for Injection Molding Applications" (no date).
Dow Plastics, "Troubleshooting Extrusion Coating" (no date).

Caratsch AG, "Hot Melt Coating in the '90s and Beyond," Canadian Textile Journal (Sep. 1992).
Welding Engineers, Inc., "Extruders You Don't Have to Shut Down to Clean Up."
Petrochemical Consultants International, "Polyolefin Plastics" Monthly Report No. 43 (Jan. 28, 1993).
Infosource, "Commercial carpet news for the professional commercial carpet salesperson, architect, specifier, designer and facilities manager", Commercial Carpet Digest, vol. XIII—Issue 5 (May '92).
ENSCO—Environmental Systems Company—Hazardous Waste Handbook "—Featuring Household Safety Tips" (1991).
R. Orr, "Goals & Measurements", Quality Performance—The Dow Chemical Company (1989).
The Dow Chemical Co. "U.S. Area President's Award for a Quality Performance" (1989).
T. Maugh II, "Dow Develops Non-Stick, Non-Polluting Coatings", Los Angeles Times (Apr. 1992).
Dow Corning, "Silicones add a high-tech twist to textile", Materials News, pp. 8-9—Dow Corning Corporation (May/Apr. 1992).
Dow Corning, "A Guide to Dow Corning Silane Coupling Agents", pp. 1-32, Dow Corning Corporation (1990).
J. Herlihy, "Is Carpet Hazardous to Our Health?" Carpet & Rug Industry (Oct. 1990).
J. J. Bell and W.J. Robertson, "Hot Melt Bonding with High-Strength Thermoplastic Rubber Polymers", Society of Automotive Engineers, Automotive Engineering Congress, Detroit, Michigan (Feb. 25-Mar. 1, 1974).
"Stereoregular Linear Polymers", Encyclopedia of Polymer Science and Engineering, vol. 15, pp. 632 & 633, John Wiley & Sons (1989).
"Crystallinity Determination", Encyclopedia of Polymer Science and Engineering, vol. 4, pp. 482, 483, 487 & Fig. 1, John Wiley & Sons (1986).
G.G. Hawley, Glossary of Chemical Terms, The Condensed Chemical Dictionary, pp. 79, 701, 832, Litton Educational Publishing, Inc. (1977).
J. Florian, "Practical Thermoforming—Principles and Applications", pp. 16, Marcel Dekker, Inc. (1987).
R. Baum, "Elastomeric Polypropylene—Oscillating catalyst controls microstructure", News of the Week—C&EN (Jan. 6, 1995).
D. Rotman, "Patent Disputes Heat Up in Polyolefins and Fibers", Chemical Week (Jan. 25, 1995).
D. Green, "Sweeping Troubles Under the Rug", Financial Times (Apr. 29, 1992).
"BASF Files Patent to Reclaim Nylon From Used Carpet", Floor Covering Weekly (no date).
"Custom Coating & Laminating—Innovative Fabric Solutions", Twitchell Corporation (no date).
"Ultrathene® High Ethylene, Vinyl Acetate Copolymers—Resins, Key Properties and Applications", Quantum, Quantum Chemical Corporation (1992).
"Petrothene® Low Density, Polyethylene for Inection and Blow Molding—Resins, Key Properties and Applications", Quantum, Quantum Chemical Corporation (1991).
"Ultrathene® UE 612-04—Ethylene Vinyl Acetate Copolymer—Equivalent Melt Index 150 VA Incorporated 18%", Quantum, Quantum Chemical Corporation (1993).
"Ultrathene® UE 639-67—Ethylene Vinyl Acetate Copolymer—Equivalent Melt Index 150 VA Incorporated 28%", Quantum, Quantum Chemical Corporation (1993).
R.N. Stephens et al., "Cariflex in Carpet Tile Backing", Shell Chemical Co. (no date).
Zimm et al., "The Dimensions of Chain Molecules Containing Branches and Rings," J. Chem. Phys., 17(12), pp. 1301-1314 (Dec. 1949).
Black Clawson/H.P. Smith "Coating line is a cooperative effort", Converting Magazine, Delta Publication (Jannuary 1992).
Dipiemme SrL, "High output carpet coating line cuts labor, energy costs", Plastiscope, Modern Plastics International, pp. 6 & 8 (Dec. 1988).
"Resins & Compounds", Modern Plastics, pp. 64-66, 79, 80, 82, 84, 85 (Mid-Oct. 1991).

B. Bernacki, Dow Launches AFFINITY Polyolefin Plastomers Globally—First Commercial Products from INSITE Technology, Dow Plastics (1993).
B. Bernacki, "AFFINITY Polyolefin Plastomers—Fact Sheet"—Dow Plastics (1993).
B. Bernacki, "INSITE Technology—Fact Sheet"—Dow Plastics (1993).
Dow Plastics, "INSITE Technology—Break Through to a Whole New Era of Polymer Technology" (1993).
K.C. Smeltz, "Why Do White Fabrics and Garments Turn Yellow During Storage in Polyethylene Bags and Wrappings?" Textile Chemist and Colorist, vol. 15, No. 4, pp. 52/17-56.21 (Apr. 1993).
Information about Black Clawson Research & Technical Center (no date).
Black Clawson—Description of Co-Extrusion Laboratory (no date).
Black Clawson—Description of Universal Coating Pilot Line for Aqueous, Solvent, or 100% solids (no date).
Black Clawson—Description of Aqueous Pilot Coating Line (no date).
Black Clawson—Description of Continuous Unwinding and Rewinding Pilot Line (no date).
Black Clawson—Description of Underwater Pelletizing and Plastics Compounding Laboratory (no date).
"Dow Plastics Wins Composition Patent on Linear Polymers"—article from unidentified source (no date).
Elf Atochem Price List and General Information (Jan. 1993).
Dow Plastics "Chem TV" Description of an advertisement for TV Program (no date).
S. Urbiha, information re Dow Chemical's Quat 188, an aqueous solution of N-(3-chloro-2-hydroxypropyl) trimethyl ammonium chloride (no date).
Masland Industries, information re EcoPlus Plastic (1995).
Flame Retardance as achieved in various polymeric compositions by Sumitomo Bakelite, Fujikura Cable Works, Ltd., U.S. Borax Research Corp. General Electric, Borg Warner (no date).
"Look what they're saying about Catalloy Process Technology Resins . . . ", Miscellaneous clippings provided by HIMONT re Catalloy Process Technology Resins from Plastics World (Jun. 1993), Modern Plastics (Jun. 1993), Plastics Technology (Jun. 1993), Thermoplastics Marketing Newsletter (May 1993), Techpack (May 1993), Plastics News (May 1993), Plastics Focus (May 1993).
"Users Assess Process and Cost Benefits of Catalloy Grades". Polyolefins—Modern Plastics (Jun. 1993).
"Novel Olefin Copolymers Emerge", Technology News—Polyolefins, Plastics Technology (Jun. 1993).
"Making Top-Flight Plastics on the Cheap", Developments to Watch, Business Week (Sep. 1993).
"Extrusion Coating Line for Car Carpets", reprint of translated article from Chemiefasern/Textilindustrie (Jul./Aug. 1985).
J. Herlihy, "Carpet Recycling Update", Carpet & Rug Industry (1994).
Eastman, "Amorphous Polyolefins" (Oct. 1988).
Charnas, "Himont unveils Catalloy-process resins", pp. 5 Plastics News (May 1993).
"New Catalloy line offers expanded productivity"—reprint of article on pp. 12 Plastics World (Jun. 1993).
J.E. Cheetham, "Materials for Crpet Tile Backing", pp. 80-99, Carpet Substrates, The Textile Trade Press (1973).
D.L. Valentine and B.L. Lotts, "Flammability Characteristics of PVC Systems Used for Carpet Backings" —pp. 36-38 & 41, 42, Modern Textiles, Annual Carpet Review (Apr. 1971).
Addedo et al., AA Polypropylene Sandwich for Car Floors,@ Chemiefasern/Textillindustrie, 41:1235-1336 (1991) (Translation).
Dealy, "Rheometers for Molten Plastics," pp. 97-99 (1982).
DeGroot et al.,"Characterization of High-Molecular-Mass Polyethylenes by Gel Permeation Chromatography-Low-Angle Laser-Light Scattering," Journal of Chromatography, 648, pp. 33-39 (1993).
Ramamurthy, "Wall Slip in Viscous Fluids and Influence of Materials of Construction," Journal of Rheology, 30(2), pp. 337-357 (1986).
Randall, "A Review of High Resolution Liquid Carbon Nuclear Magnetic Resonance Characterizations of Ethylene-Based Polymers," Journal of Macromolecular Science—Reviews in Macromolecular Chemistry and Physics, C292(2 and 3), pp. 201-317 (1989).

Rudin, "Measurement of Long-Chain Branch Frequency in Synthetic Polymers," *Modern Methods of Polymer Characterization*, pp. 103-112 (1991).

Shida et al., "Correlation of Low Density of Polyethylene Rheological Measurements with Optical and Processing Properties," *Polymer Engineering and Science*, 17(11) pp. 770-774 (1977).

Strauss, "Handbook for Chemical Technicans," McGraw Hill Book Company, Sections 1-4 and 2-1 (1976).

Thoen, J. et al., "Novel Polyolefins Made with Insite Technology in Flooring Applications," *The Polymer Processing Society European Meeting 1995*, Stuttgart, Germany Sep. 26-28, 1995.

Wild et al., "Determination of Branching Distributions in Polyethylene and Ethylene Copolymers," *Journal of Polymer Science, Poly. Phys. Ed.*, 20, p. 441 (1982).

Williams et al., "The Construction of a Polyethylene Calibration Curve for Gel Permeation Chromatography Using Polystrene Fractions," *Journal of Polymer Science, Polymer Letters*, 6, p. 621 (1968).

Preliminary Amendment filed on May 4, 2004 for U.S. Appl. No. 10/838,426, filed May 4, 2004 (Inventor—Beiser et al.; pp. 1-17).

Restriction Requirement issued on Sep. 19, 2005 for U.S. Appl. No. 10/838,426, filed May 4, 2004 (Inventor—Beiser et al.; pp. 1-5).

Response to Restriction Requirement filed on Oct. 17, 2005 for U.S. Appl. No. 10/838,426, filed May 4, 2004 (Inventor—Beiser et al.; pp. 1-4).

Non-Final Office Action issued on Dec. 2, 2005 for U.S. Appl. No. 10/838,426, filed May 4, 2004 (Inventor—Beiser et al.; pp. 1-6).

Examiner initiated Interview issued on May 20, 2005 for U.S. Appl. No. 10/838,426, filed May 4, 2004 (Inventor—Beiser et al.; pp. 1-3).

Response to Non-Final Office Action filed on Jun. 5, 2006 for U.S. Appl. No. 10/838,426, filed May 4, 2004 (Inventor—Beiser et al.; pp. 1-13).

Notice of Non-Compliant Amendment issued on Jun. 16, 2006 for U.S. Appl. No. 10/838,426, filed May 4, 2004 (Inventor—Beiser et al.; pp. 1-2).

Response to Notice of Non-Compliant Amendment filed on Jul. 14, 2006 for U.S. Appl. No. 10/838,426, filed May 4, 2004 (Inventor—Beiser et al.; pp. 1-9).

Notice of Allowance/Examiner Initiated Interview issued on Jul. 31, 2006 for U.S. Appl. No. 10/838,426, filed May 4, 2004 (Inventor—Beiser et al.; pp. 1-15).

Notice of Allowance issued on Sep. 29, 2006 for U.S. Appl. No. 10/838,426, filed May 4, 2004 (Inventor—Beiser et al.; pp. 1-2).

RCE/Petition to Withdraw from Issue filed on Dec. 11, 2006 for U.S. Appl. No. 10/838,426, filed May 4, 2004 (Inventor—Beiser et al.; pp. 1-3).

Non-Final Office Action issued on Jan. 30, 2007 for U.S. Appl. No. 10/838,426, filed May 4, 2004 (Inventor—Beiser et al.; pp. 1-8).

Response to Non-Final Office Action filed on Aug. 2, 2007 for U.S. Appl. No. 10/838,426, filed May 4, 2004 (Inventor—Beiser et al.; pp. 1-13).

Non-Final Office Action issued on Oct. 2, 2007 for U.S. Appl. No. 10/838,426, filed May 4, 2004 (Inventor—Beiser et al.; pp. 1-8).

Response to Non-Final Office Action filed on Apr. 2, 2008 for U.S. Appl. No. 10/838,426, filed May 4, 2004 (Inventor—Beiser et al.; pp. 1-11).

Final Rejection issued on Jul. 30, 2008 for U.S. Appl. No. 10/838,426, filed May 4, 2004 (Inventor—Beiser et al.; pp. 1-5).

Notice of Appeal filed on Jan. 29, 2009 for U.S. Appl. No. 10/838,426, filed May 4, 2004 (Inventor—Beiser et al.; pp. 1-2).

Appeal Brief filed on Aug. 31, 2009 for U.S. Appl. No. 10/838,426, filed May 4, 2004 (Inventor—Beiser et al.; pp. 1-16).

Notice of Non-Compliant Appeal Brief issued on Sep. 29, 2009 for U.S. Appl. No. 10/838,426, filed May 4, 2004 (Inventor—Beiser et al.; pp. 1-2).

Amended Appeal Brief filed on Oct. 29, 2009 for U.S. Appl. No. 10/838,426, filed May 4, 2004 (Inventor—Beiser et al.; pp. 1-17).

Examiner's Answer to Appeal Brief issued on Dec. 16, 2009 for U.S. Appl. No. 10/838,426, filed May 4, 2004 (Inventor—Beiser et al.; pp. 1-11).

BPAI Decision issued on Jan. 31, 2012 for U.S. Appl. No. 10/838,426, filed May 4, 2004 (Inventor—Beiser et al.; pp. 1-6).

Notice of Allowance issued on Feb. 13, 2012 for U.S. Appl. No. 10/838,426, filed May 4, 2004 (Inventor—Beiser et al.; pp. 1-11).

RCE filed on May 14, 2012 for U.S. Appl. No. 10/418,227, filed Apr. 14, 2003 (Inventor—Bieser et al.; pp. 1-6).

Notice of Allowance issued on May 23, 2012 for U.S. Appl. No. 10/838,426, filed May 4, 2004 (Inventor—Beiser et al.; pp. 1-7).

Response to Non-Final Office Action filed on Sep. 28, 2012 for U.S. Appl. No. 12/952,709, filed Nov. 23, 2010 (Inventor—Bieser et al.; pp. 1-10).

Final Office Action issued on Dec. 6, 2012 for U.S. Appl. No. 12/952,709, filed Nov. 23, 2010 (Inventor—Bieser et al.; pp. 1-10).

Examiner's Answer to Appeal Brief issued on May 7, 2012 for U.S. Appl. No. 11/564,786, filed Nov. 29, 2006 (Inventor—Wright; pp. 1-11).

RCE/Response to Office Action filed on Dec. 3, 2012 for U.S. Appl. No. 11/915,553, filed Nov. 29, 2006 (Inventor—Wright; pp. 1-11).

Non-Final Office Action issued on Feb. 5, 2013 for U.S. Appl. No. 11/915,553, filed Nov. 29, 2006 (Inventor—Wright; pp. 1-8).

Response to Office Action filed on Sep. 12, 2012 for CA Patent App No. 2,546,806, national phase of PCT/US2004/39070, filing date Nov. 19, 2004 (Applicant—Shaw Industries Group, Inc.; Inventor—Wright; pp. 1-37).

Examination Report issued on Jan. 21, 2013 for CA Patent App No. 2,546,806, national phase of PCT/US2004/39070, filing date Nov. 19, 2004 (Applicant—Shaw Industries Group, Inc.; Inventor—Wright; pp. 1-4).

Response to Office Action filed on Sep. 10, 2012 for JP Pat App No. 2006-541587, national phase of PCT/US2004/39070, filing date Nov. 19, 2004 (Shaw Industries Group, Inc.; Inventor—Wright; pp. 1-26).

Decision of Rejection issued on Nov. 26, 2012 for JP Pat App No. 2006-541587, national phase of PCT/US2004/39070, filing date Nov. 19, 2004 (Applicant—Shaw Industries Group, Inc.; Inventor—Wright; pp. 1-11).

Reply to Communication filed on Jan. 23, 2013 for EP Pat App No. 04811734.5, national phase of PCT/US2004/39070, filing date Nov. 19, 2004 (Applicant—Shaw Industries Group, Inc.; Inventor—Wright; pp. 1-7).

Amendment filed on Aug. 15, 2012 for EP Pat App No. 04811734.5, national phase of PCT/US2004/39070, filing date Nov. 19, 2004 (Applicant—Shaw Industries Group, Inc.; Inventor—Wright; pp. 1-56).

Office Action issued on Jun. 6, 2012 for CA Pat App No. 2,609,889, national phase of Intl Pat App No. PCT/US2006/007282, Mar. 1, 2006 filing date (Applicant—Shaw Industries Group, Inc.; Inventor—Wright; pp. 1-3).

Response to Office Action filed on Dec. 6, 2012 for CA Pat App No. 2,609,889, national phase of Intl Pat App No. PCT/US2006/007282, Mar. 1, 2006 filing date (Applicant—Shaw Industries Group, Inc.; Inventor—Wright; pp. 1-21).

Decision of Rejection issued on Aug. 2, 2012 for CN Pat App No. 200680027014.6, national phase of Intl Pat App No. PCT/US2006/007282, Mar. 1, 2006 filing date (Shaw Industries Group, Inc.; Inventor—Wright; pp. 1-5).

Request for Reexamination filed on Nov. 16, 2012 for CN Pat App No. 200680027014.6, national phase of Intl Pat App No. PCT/US2006/007282, Mar. 1, 2006 filing date (Shaw Industries Group, Inc.; Inventor—Wright; pp. 1-7).

European Search Report and Opinion issued on Apr. 4, 2013 for EP Pat App No. 12192188.6, national phase of PCT/US2004/39070, filing date Nov. 19, 2004 (Shaw Industries Group, Inc.; Inventor—Wright; pp. 1-14)

Official Action issued on Apr. 3, 2013 for JP Pat App No. 2011-213508, (Divisional Application of Japanese Patent App. No. 2006-541587) national phase of PCT/US2004/39070, filing date Nov. 19, 2004 (Shaw Industries Group, Inc.; Inventor—Wright; pp. 1-3)

Third Office Action issued on Mar. 25, 2013 for CN Pat App No. 200680027014.6, national phase of Intl Pat App No. PCT/US2006/007282, Mar. 1, 2006 filing date (Shaw Industries Group, Inc.; Inventor—Wright; pp. 1-17).

* cited by examiner

*Primary Examiner* — Michael Tolin

(74) *Attorney, Agent, or Firm* — Ballard Spahr LLP

(57) ABSTRACT

The present invention pertains to carpet and method of making it. In one aspect, the carpet includes (a) a primary backing which has a face and a back surface, (b) a plurality of fibers attached to the primary backing and extending from the face of the primary backing and exposed at the back surface of the primary backing, (c) an adhesive backing, (d) an optional secondary backing adjacent to the adhesive backing, and (e) at least one homogeneously branched linear ethylene polymer. The method includes extrusion coating at least one homogeneously branched linear ethylene polymer onto the back surface of a primary backing to provide an adhesive backing. The method can include additional steps or procedures, either separately or in various combinations. Additional steps and procedures include preheating the primary backing prior the extrusion step, multilayer adhesive backings, washing or scouring the primary backing prior the extrusion step, and utilizing adhesive polymeric additives, high heat content fillers, blowing agents and/or implosion agents. The constructions and methods described herein are particularly suited for making carpet tile.

12 Claims, 9 Drawing Sheets

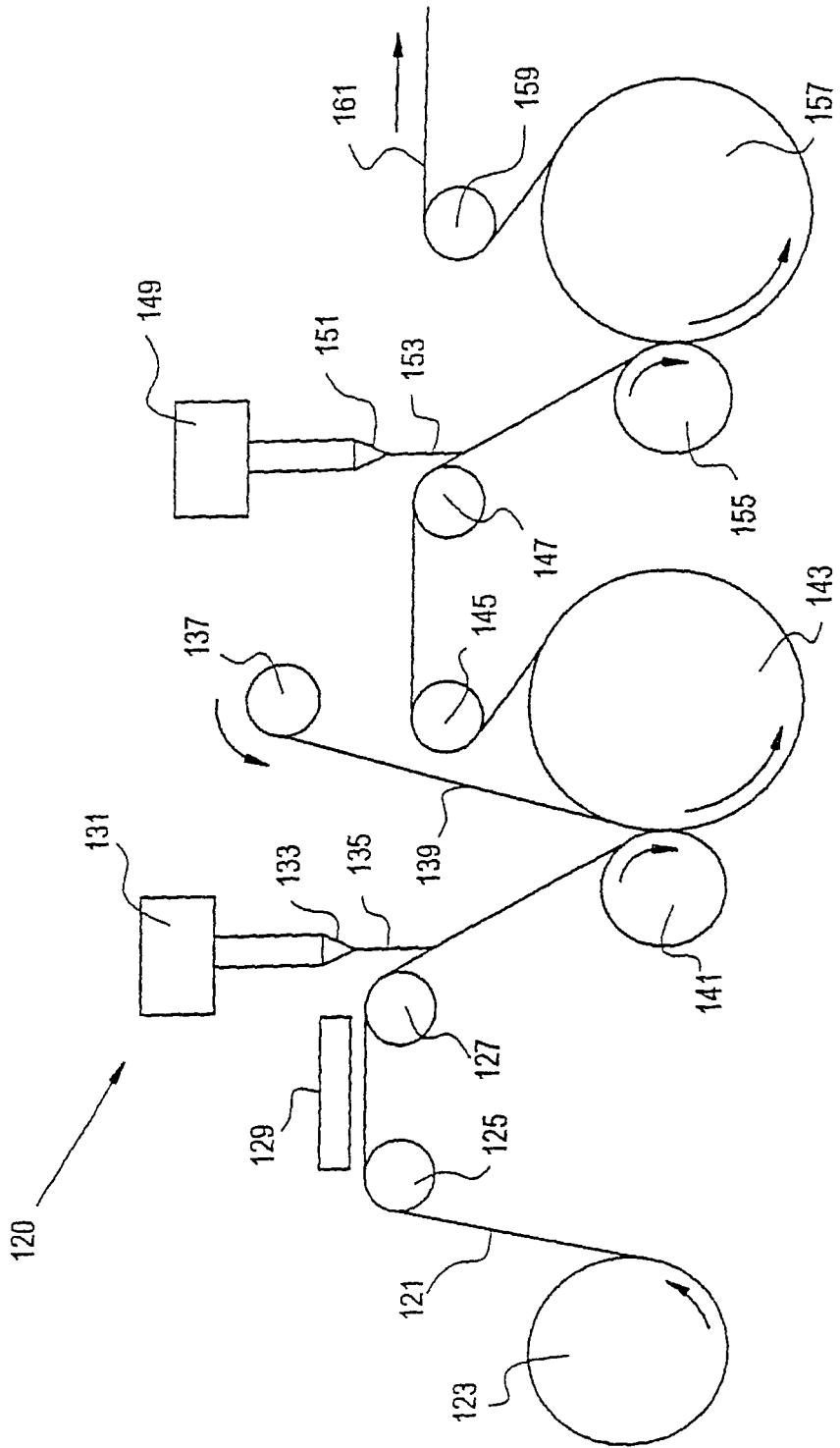

CARPET, CARPET BACKINGS AND METHODS

CROSS-REFERENCE TO RELATED APPLICATIONS

This application is a continuation of U.S. application Ser. No. 10/838,426 filed May 4, 2004, now U.S. Pat. No. 8,283,017 which is a continuation of U.S. application Ser. No. 10/601,141 filed Jun. 19, 2003 (now abandoned) which is a continuation of U.S. application Ser. No. 10/077,609 filed Feb. 15, 2002 (now abandoned), which is a continuation of U.S. application Ser. No. 09/032,410, filed Feb. 27, 1998 (now abandoned), which claims priority benefit of Provisional Application Nos. 60/039,217; 60/039,411; 60/039,412; 60/039,584; and 60/039,587, all filed Feb. 28, 1997. The aforementioned applications are hereby incorporated herein by reference in their entireties.

FIELD OF THE INVENTION

This invention relates to carpets and methods of making carpets, wherein, for each, the carpets comprise at least one flexible ethylene polymer backing material. In a particular instance, the invention relates to a carpet and a method of making a carpet by an extrusion coating technique, wherein for each the carpet comprises a backing material comprised of at least one homogeneously branched linear ethylene polymer.

BACKGROUND OF THE INVENTION

The present invention pertains to any carpet constructed with a primary backing material and includes tufted carpet and non-tufted carpet such as needle punched carpet. Although specific embodiments are amenable to tufted and non-tufted carpet, tufted carpet is preferred.

As illustrated in FIG. 1, tufted carpets are composite structures which include yarn (which is also known as a fiber bundle), a primary backing material having a face surface and a back surface an adhesive backing material and, optionally, a secondary backing material. To form the face surface of tufted carpet, yarn is tufted through the primary backing material such that the longer length of each stitch extends through the face surface of the primary backing material. Typically, the primary backing material is made of a woven or non-woven material such as a thermoplastic polymer, most commonly polypropylene.

The face of a tufted carpet can generally be made in three ways. First, for loop pile carpet, the yarn loops formed in the tufting process are left intact. Second, for cut pile carpet, the yarn loops are cut, either during tufting or after, to produce a pile of single yarn ends instead of loops. Third, some carpet styles include both loop and cut pile. One variety of this hybrid is referred to as tip-sheared carpet where loops of differing lengths are tufted followed by shearing the carpet at a height so as to produce a mix at uncut, partially cut, and completely cut loops. Alternatively, the tufting machine can be configured so as to cut only some of the loops, thereby leaving a pattern of cut and uncut loops. Whether loop, cut, or a hybrid, the yarn on the back side of the primary backing material comprises tight, unextended loops.

The combination of tufted yarn and a primary backing material without the application of an adhesive backing material or secondary backing material is referred to in the carpet industry as raw tufted carpet or greige goods. Greige goods become finished tufted carpet with the application of an adhesive backing material and an optional secondary backing material to the back side of the primary backing material. Finished tufted carpet can be prepared as broad-loomed carpet in rolls typically 6 or 12 feet wide. Alternatively, carpet can be prepared as carpet tiles, typically 18 inches square in the United States and 50 cm. square elsewhere.

The adhesive backing material is applied to the back face of the primary backing material to affix the yarn to the primary backing material. Typically, the adhesive backing material is applied by a pan applicator using a roller, a roll over a roller or a bed, or a knife (also called a doctor blade) over a roller bed. Properly applied adhesive backing materials do not substantially pass through the primary backing material.

Most frequently, the adhesive backing material is applied as a single coating or layer. The extent or tenacity to which the yarn is affixed is referred to as tuft lock or tuft bind strength. Carpets with sufficient tuft bind strength exhibit good wear resistance and, as such, have long service lives. Also, the adhesive backing material should substantially penetrate the yarn (fiber bundle) exposed on the backside of the primary backing material and should substantially consolidate individual fibers within the yarn. Good penetration of the yarn and consolidation of fibers yields good abrasion resistance. Moreover, in addition to good tuft bind strength and abrasion resistance, the adhesive material should also impart or allow good flexibility to the carpet in order to facilitate easy installation of the carpet.

The secondary backing material is typically a lightweight scrim made of woven or non-woven material such as a thermoplastic polymer, most commonly polypropylene. The secondary backing material is optionally applied to the backside of the carpet onto the adhesive backing material, primarily to provide enhanced dimensional stability to the carpet structure as well as to provide more surface area for the application of direct glue-down adhesives.

Alternative backing materials may also be applied to the backside of the adhesive backing material and/or to the backside of the secondary backing material, if present. Alternative backing materials may include foam cushioning (e.g. foamed polyurethane) and pressure sensitive floor adhesives. Alternative backing materials may also be applied, for example, as webbing with enhanced surface area, to facilitate direct glue-down adhesive installations (e.g., in contract commercial carpeting, automobile carpet and airplane carpet where the need for cushioning is ofttimes minimal). Alternative backing materials can also be optionally applied to enhance barrier protection respecting moisture, insects, and foodstuffs as well as to provide or enhance fire suppression, thermal insulation, and sound dampening properties of the carpet.

Known adhesive backing materials include curable latex, urethane or vinyl systems, with latex systems being most common. Conventional latex systems are low viscosity, aqueous compositions that are applied at high carpet production rates and offer good fiber-to-backing adhesion, tuft bind strength and adequate flexibility. Generally, excess water is driven off and the latex is cured by passing through a drying oven. Styrene butadiene rubbers (SBR) are the most common polymers used for latex adhesive backing materials. Typically, the latex backing system is heavily filled with an inorganic filler such as calcium carbonate or Aluminum Trihydrate and includes other ingredients such as antioxidants, antimicrobials, flame retardants, smoke suppressants, wetting agents, and froth aids.

Conventional latex adhesive backing systems can have certain drawbacks. As one important drawback, typical latex adhesive backing systems do not provide a moisture barrier. Another possible drawback, particularly with a carpet having polypropylene yarn and polypropylene primary and secondary backing materials, is the dissimilar polymer of latex systems along with the inorganic filler can reduce the recyclability of the carpet.

In view of these drawbacks, some in the carpet industry have begun seeking suitable replacements for conventional latex adhesive backing systems. One alternative is the use of urethane adhesive backing systems. In addition to providing adequate adhesion to consolidate the carpet, urethane backings generally exhibit good flexibility and barrier properties and, when foamed, can eliminate the need for separate underlayment padding (i.e., can constitute a direct glue-down unitary backing system). However, urethane backing systems also have important drawbacks, including their relatively high cost and demanding curing requirements which necessitate application at slow carpet production rates relative to latex systems.

Thermoplastic polyolefins such as ethylene vinyl acetate (EVA) copolymers and low density polyethylene (LDPE) have also been suggested as adhesive backing materials due in part to their low cost, good moisture stability and no-cure requirements. Various methods are available for applying polyolefin backing materials, including powder coating, hot melt application and extruded film or sheet lamination. However, using polyolefins to replace latex adhesive backings can also present difficulties. For example, U.S. Pat. No. 5,240,530, Table A at Col. 10, indicates that ordinary polyolefin resins possess inadequate adhesion for use in carpet construction. Additionally, relative to latex and other cured systems, ordinary polyolefins have relatively high application viscosities and relatively high thermal requirements. That is, ordinary thermoplastic polyolefins are characterized by relatively high melt viscosities and high recrystallization or solidification temperatures relative to the typical aqueous viscosities and cure temperature requirements characteristic of latex and other cured (thermosetting) systems.

Even ordinary elastomeric polyolefins, i.e. polyolefins having low crystallinities, generally have relatively high viscosities and relatively high recrystallization temperatures. High recrystallization temperatures result in relatively short molten times during processing and, combined with high melt viscosities can make it difficult to achieve adequate penetration of the yarn, especially at conventional adhesive backing application rates.

One method for overcoming the viscosity and recrystallization deficiencies of ordinary polyolefins is to formulate the polyolefin resin as a hot melt adhesive which usually involves formulating low molecular weight polyolefins with waxes, tackifiers, various flow modifiers and/or other elastomeric materials. Ethylene/vinyl acetate (EVA) copolymers, for example, have been used in formulated hot melt adhesive backing compositions and other polyolefins compositions have also been proposed as hot melt backing compositions. For example, in U.S. Pat. No. 3,982,051, Taft et al. disclose that a composition comprising an ethylene/vinyl acetate copolymer, atactic polypropylene and vulcanized rubber is useful as a hot melt carpet backing adhesive.

Unfortunately, hot melt adhesive systems are generally considered not completely suitable replacements for conventional latex adhesive backings. Typical hot melt systems based on EVA and other copolymers of ethylene and unsaturated comonomers can require considerable formulating and yet often yield inadequate tuft bind strengths. However, the most significant deficiency of typical hot melt system is their melt strengths which are generally too low to permit application by a direct extrusion coating technique. As such, polyolefin hot melt systems are typically applied to primary backings by relatively slow, less efficient techniques such as by the use of heated doctor blades or rotating melt transfer rollers.

While unformulated high pressure low density polyethylene (LDPE) can be applied by a conventional extrusion coating technique, LDPE resins typically have poor flexibility which can result in excessive carpet stiffness. Conversely, those ordinary polyolefins that have improved flexibility, such as ultra low density polyethylene (ULDPE) and ethylene/propylene interpolymers, still do not possess sufficient flexibility, have excessively low melt strengths and/or tend to draw resonate during extrusion coating. To overcome extrusion coating difficulties, ordinary polyolefins with sufficient flexibility can be applied by lamination techniques to insure adequate yarn-to-backing adhesion; however, lamination techniques are typically expensive and can result in extended production rates relative to direct extrusion coating techniques.

Known examples of flexible polyolefin backing materials are disclosed in U.S. Pat. Nos. 3,390,035; 3,583,936; 3,745,054; and 3,914,489. In general, these disclosures describe hot melt adhesive backing compositions based on an ethylene copolymer, such as, ethylene/vinyl acetate (EVA), and waxes. Known techniques for enhancing the penetration of hot melt adhesive backing compositions through the yarn include applying pressure while the greige good is in contact with rotating melt transfer rollers as described, for example, in U.S. Pat. No. 3,551,231.

Another known technique for enhancing the effectiveness of hot melt systems involve using pre-coat systems. For example, U.S. Pat. Nos. 3,684,600; 3,583,936; and 3,745,054, describe the application of low viscosity aqueous pre-coats to the back surface of the primary backing material prior the application of a hot melt adhesive composition. The hot melt adhesive backing systems disclosed in these patents are derived from multi-component formulations based on functional ethylene polymers such as, for example, ethylene/ethyl acrylate (EEA) and ethylene/vinyl acetate (EVA) copolymers.

Although there are various systems known in the art of carpet backings, there remains a need for a thermoplastic polyolefin carpet backing system which provides adequate tuft bind strength, good abrasion resistance and good flexibility to replace cured latex backing systems. A need also remains for an application method which permits high carpet production rates while achieving the desired characteristics of good tuft bind strength, abrasion resistance, barrier properties and flexibility. Finally, there is also a need to provide a carpet structure having fibers and backing materials that are easily recyclable without the necessity of extensive handling and segregation of carpet component materials.

SUMMARY OF THE INVENTION

In accordance with one aspect of the present invention, a carpet comprises a plurality of fibers, a primary backing material having a face and a back side, an adhesive backing material and an optional secondary backing material, the plurality of fibers attached to the primary backing material and protruding from the face of the primary backing material and exposed on the back side of the primary backing material, the adhesive backing material disposed on the back side of the primary backing material and the optional secondary backing material adjacent to the adhesive backing material, wherein at least one of the plurality of fibers, the primary backing material, the adhesive backing material or the optional secondary backing material is comprised of at least one homogeneously branched ethylene polymer characterized as having a short chain branching distribution index (SCBDI) of greater than or equal to 50 percent.

Another aspect of the present invention is a method of making a carpet, the carpet including a plurality of fibers, a primary backing material having a face and a back side, an adhesive backing material and an optional secondary backing material, the plurality of fibers attached to the primary backing material and protruding from the face of the primary backing material and exposed on the back side of the primary backing material, the method comprising the step of extrusion coating the adhesive backing material or the optional secondary backing material onto the back side of the primary backing material, wherein the extrusion coated adhesive backing material or optional secondary backing material is comprised of at least one homogeneously branched ethylene polymer characterized as having a short chain branching distribution index (SCBDI) of greater than or equal to 50 percent.

A third aspect of the present invention is a method of making a carpet, the carpet comprising (i) a greige good having a face surface comprised of a plurality of fibers attached to a primary backing material having a face and a back side and (ii) an adhesive backing material which comprises at least one homogeneously branched ethylene polymer characterized as having a short chain branching distribution index (SCBDI) of greater than or equal to 50 percent and which is in intimate contact with the back side of the primary backing material and has substantially penetrated and substantially consolidated the fibers, the method comprising extrusion coating the adhesive backing material onto the back side of the primary backing material and at least one additional step selected from the group consisting of
  (a) preheating the greige good prior to the application of the adhesive backing material,
  (b) during the extrusion coating of the adhesive backing material, while at a temperature greater than or equal to the softening point of the adhesive backing material, subjecting the adhesive backing material to a vacuum to draw the adhesive backing material onto the back side of the primary backing material,
  (c) during the extrusion coating of the adhesive backing material, while at a temperature greater than or equal to the softening point of the adhesive backing material, subjecting the adhesive backing material to a positive air pressure device in addition to nip roll pressure to force the adhesive backing material onto the back side of the primary backing material, and
  (d) heat soaking the carpet after application of the adhesive backing material onto the back side of the primary backing material.

A fourth aspect of the present invention is a carpet comprising a primary backing material having a face and a back side, yarn attached to the primary backing material, an adhesive backing material and an optional secondary backing material, wherein the adhesive backing material comprises at least one homogeneously branched ethylene polymer characterized as having a short chain branching distribution index (SCBDI) of greater than or equal to 50 percent and is in intimate contact with the back side of the primary backing material and has substantially penetrated the yarn, and wherein the adhesive backing material or optional secondary backing material is comprised of an effective amount of at least one additive selected from the group consisting of a blowing agent and high heat content filler with the proviso that where the blowing agent is selected, the adhesive backing material or the optional secondary backing material is further characterized as having a substantially foamed, frothed or expanded non-collapsed matrix.

A fifth aspect of the present invention is a method of making a carpet, the carpet comprising yarn attached to a primary backing material and an adhesive backing material, the adhesive backing material comprises at least one homogeneously branched ethylene polymer characterized as having a short chain branching distribution index (SCBDI) of greater than or equal to 50 percent, and wherein the adhesive backing material is in intimate contact with the primary backing material and has substantially penetrated and substantially consolidated the yarn, the method comprising the step of adding an effective amount of a high heat content filler to the adhesive backing material to substantially extend the semi-molten or molten time of the adhesive backing material and enhance the penetration of the adhesive backing material into the yarn.

A sixth aspect of the invention is a method of making a carpet, the carpet comprising yarn attached to a primary backing material having a face and a back side and an adhesive backing material comprised of at least one first and at least one second ethylene polymer layers, wherein the at least one first ethylene polymer layer is in intimate contact with the back surface of the primary backing material and the at least one first ethylene polymer layer has substantially penetrated and substantially consolidated the yarn, the at least one first ethylene polymer layer having a higher melt index than the at least one second ethylene polymer layer and one of the at least first or at least second ethylene polymer layer comprising at least one homogeneously branched ethylene polymer characterized as having a short chain branching distribution index (SCBDI) of greater than or equal to 50 percent, the method comprising the steps of applying the at least one first ethylene polymer layer directly onto the back surface of the primary backing material and simultaneously or sequentially applying the at least one second ethylene polymer layer onto the at least one first ethylene polymer layer.

A seventh aspect of the present invention is a method of making a carpet, the carpet having a foamed, frothed or expanded adhesive backing material matrix and comprising yarn attached to a primary backing material, the adhesive backing material comprising at least one ethylene polymer and is in intimate contact with the primary backing material and has substantially penetrated and substantially consolidated the yarn, the method comprising the step of adding an effective amount of at least one blowing agent to the adhesive backing material and thereafter activating the blowing agent to foam, froth or expand the adhesive backing material.

An eighth aspect of the present invention is a method of making a carpet, the carpet having a collapsed, non-expanded adhesive backing material matrix and comprising yarn attached to a primary backing material, the adhesive backing material comprising at least one ethylene polymer and is in intimate contact with the primary backing material and has substantially penetrated and substantially consolidated the yarn, the method comprising the step of adding an effective amount or at least one implosion agent to the adhesive backing material and thereafter activating the implosion agent during an extrusion coating step such that molten or semi-molten polymer is forced into the free space of yarn exposed on the backside of the primary backing material.

A ninth aspect of the present invention is a method of making a carpet, the carpet having a face surface and comprising yarn, a primary backing material, an adhesive backing material and an optional secondary backing material, wherein the primary backing material has a back surface opposite the face surface of the carpet, the yarn is attached to the primary backing material, the adhesive backing material is applied to the back surface of the primary backing material and the optional secondary backing material is applied onto the adhesive backing material, the method comprising the step of scouring or washing the back surface of the primary backing material prior to the application of the adhesive backing material to substantially remove or displace processing materials.

A tenth aspect of the present invention is a carpet comprising a primary backing material having a face and a back side, yarn attached to the primary backing material, an adhesive backing material and an optional secondary backing material, wherein the adhesive backing material comprises at least one homogeneously branched ethylene polymer characterized as having a short chain branching distribution index (SCBDI) of greater than or equal to 50 percent, at least one adhesive polymeric additive and is in intimate contact with the back side of the primary backing material and has substantially penetrated the yarn.

An eleventh aspect of the present invention is a method of making a carpet, and the carpet so made, which includes the steps of providing a primary backing material having a face and a back side, tufting a yarn into the primary backing material to produce a carpet pile on the face side of the primary backing material and loops of the yarn on the back side of the primary backing material, providing an aqueous dispersion of polyolefin particles, applying the dispersion to the back side of the primary backing material, and then applying heat to the dispersion to dry the dispersion and to at least partially melt the polyolefin particles and thereby fix the loops of yarn to the primary backing material.

A twelfth aspect of the invention is a method of making a carpet, and the carpet so made, which method includes the steps of providing a primary backing material having a face and a back side, tufting a yarn into the primary backing material to produce a carpet pile on the face side of the primary backing material and loops of the yarn on the back side of the primary backing material, extruding a first sheet of a first thermoplastic material to the back side of the primary backing, and extruding a second sheet of a second thermoplastic material adjacent the first sheet. In this twelfth aspect, the melt viscosity of the thermoplastic material in the first sheet is lower than the melt viscosity of the thermoplastic material in the second sheet so as to provide for enhanced penetration of the thermoplastic material in the first sheet into at least one of the primary backing material or the loops of yarn on the back side of the primary backing material.

A thirteenth aspect of the present invention is a method of making a carpet with an extruded sheet as part of its backing wherein prior to the extruding step, at least the back side of the primary backing and loops of the yarn on the back side of the primary backing are treated to remove undesirable chemicals from the surface and thereby enhance the adhesion of the extruded sheet.

A fourteenth aspect of the present invention is a carpet tile with an extruded backing. Preferably, the carpet tile is made with a first and second extruded sheet and a reinforcing material embedded between the two sheets.

BRIEF DESCRIPTION OF THE DRAWINGS

FIG. 7 is a schematic representation of an extrusion coating line for making carpet tile according to the present invention.

DETAILED DESCRIPTION OF THE PREFERRED EMBODIMENTS

Figure 1:
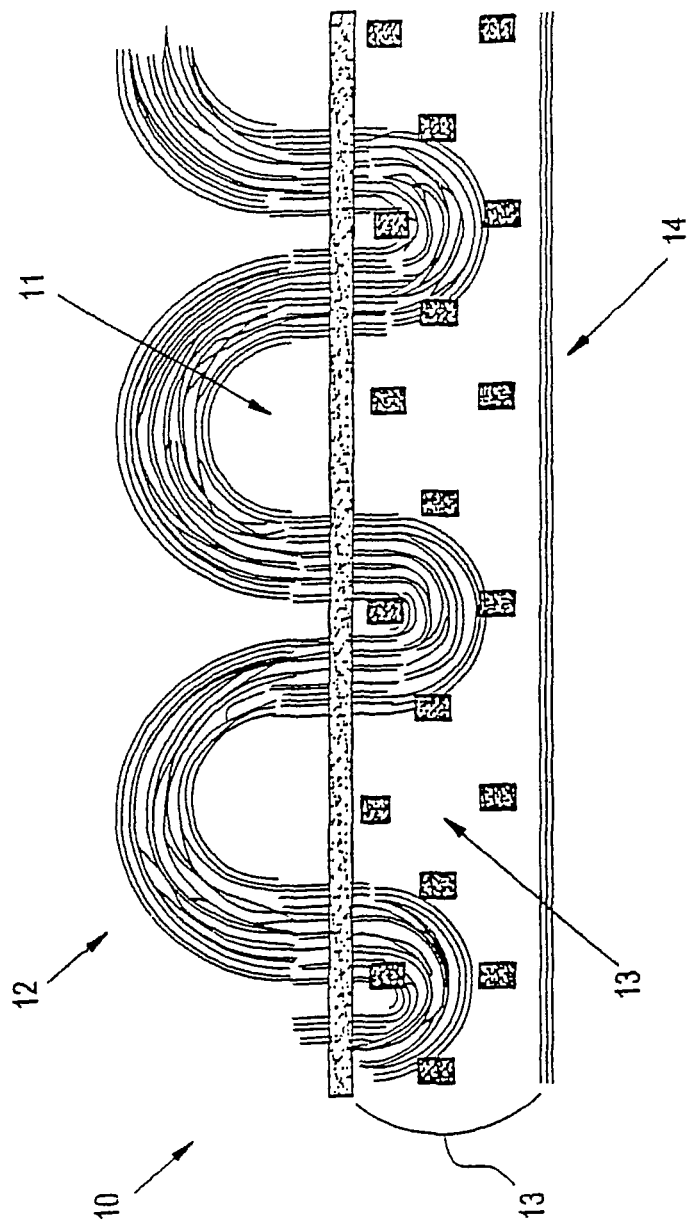
FIG. 1 is an illustration of a tufted carpet 10.

The terms "intimate contact," "substantial encapsulation," and/or "substantial consolidation" are used herein to refer to mechanical adhesion or mechanical interactions (as opposed to chemical bonding) between dissimilar carpet components, irrespective of whether or not one or more carpet component is capable of chemically interacting with another carpet component. With respect to the mechanical adhesion or interactions of the present invention, there may be some effective amount of intermixing or inter-melting of polymeric materials; however, there is no continuous or integral fusing of various components as determined from visual inspection of photomicrographs (at 20× magnification) of the various carpet interfaces. Within this meaning, fusion of yarn or fiber bundles or of individual fibers to one another within a fiber bundle is not considered integral fusion in itself since fibers are referred to herein as one carpet component.

The term "intimate contact" refers to the mechanical interaction between the back surface of the primary backing material and the adhesive backing material. The term "substantial encapsulation" refers to the adhesive backing material significantly surrounding the yarn or fiber bundles at or in immediate proximity to the interface between the back surface of the primary backing material and the adhesive backing material. The term "substantial consolidation" refers to the overall integrity and dimensional stability of the carpet that is achieved by substantially encapsulating the yarn or fiber bundles and intimately contacting the back surface of the primary backing material with the adhesive backing material. A substantially consolidated carpet possesses good component cohesiveness and good delamination resistance with respect to the various carpet components.

The term "integral fusing" is used herein in the same sense as known in the art and refers to heat bonding of carpet components using a temperature above the melting point of the adhesive backing material. Integral fusing occurs when the adhesive backing material comprises the same polymer as either the fibers or primary backing material or both. However, integral fusing does not occur when the adhesive backing material comprises a different polymer than the fibers and primary backing material. By the term "same polymer," it is meant that the monomer units of the polymers are of the same chemistry, although their molecular or morphological attributes may differ. Conversely, by the term "different polymer," it is meant that, irrespective of any molecular or morphological differences, the monomer units of the polymers are of different chemistries. Thus, in accordance with the various definitions of the present invention, a polypropylene primary backing material and a polyethylene adhesive backing material would not integrally fuse because these carpet components are of different chemistries.

The term "carpet component" is used herein to refer separately to carpet fiber bundles, the primary backing material, the adhesive backing material and the optional secondary backing material.

Figure 2:
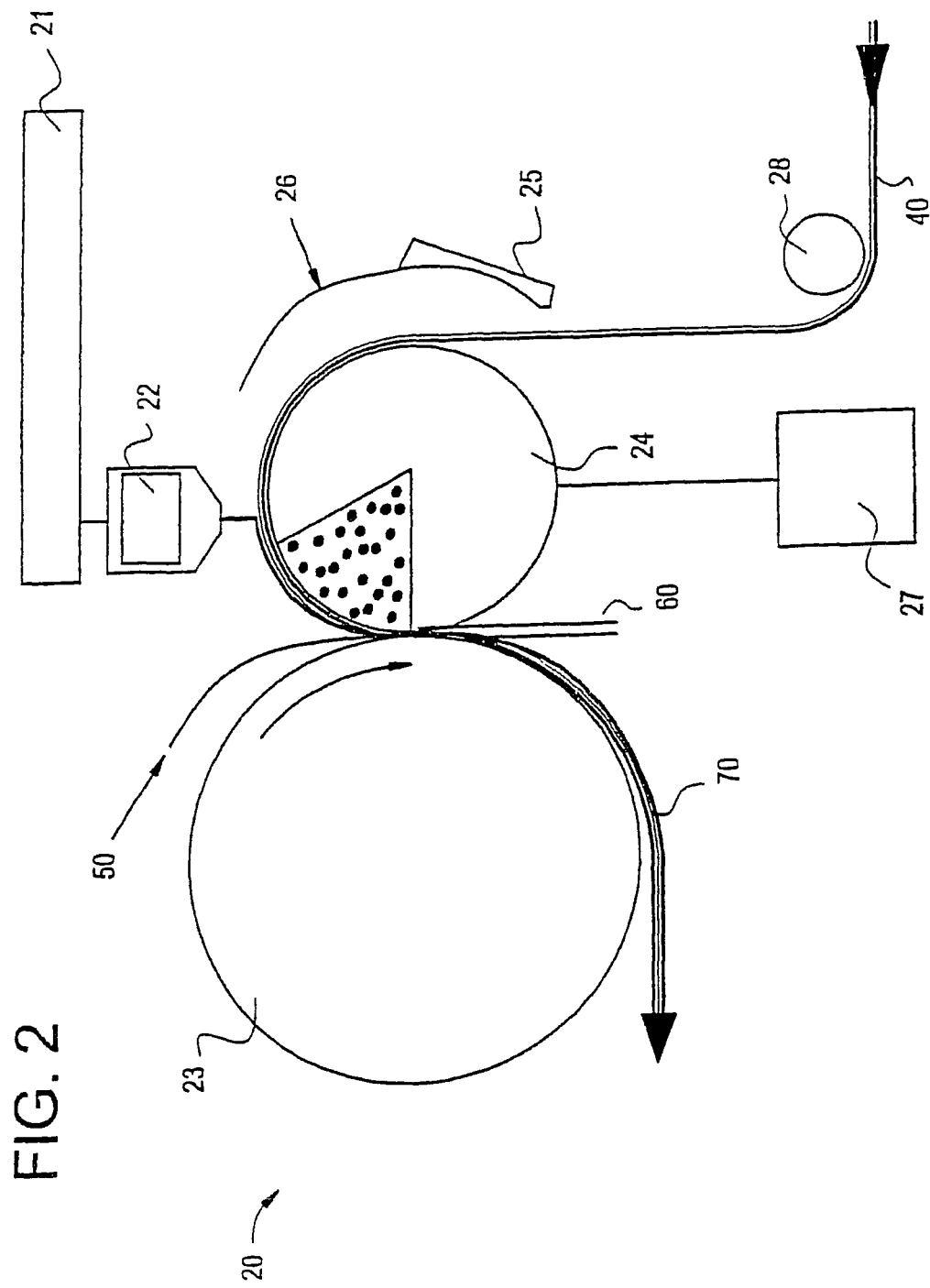
FIG. 2 is a schematic representation of an extrusion coating line 20 for making a carpet 70.

The term "extrusion coating" is used herein in its conventional sense to refer to an extrusion technique wherein a polymer composition usually in pellet-form is heated in an extruder to a temperature elevated above its melt temperature and then forced through a slot die to form a semi-molten or molten polymer web. The semi-molten or molten polymer web is continuously drawn down onto a continuously fed greige good to coat the backside of the greige good with the polymer composition. FIG. 2 illustrates an extrusion process of the present invention wherein, at the nip, the face surface of the greige good is oriented towards the chill roll and the back surface of the adhesive backing material oriented is towards the nip pressure roll. Extrusion coating is distinct from a lamination technique.

The term "lamination technique" is used herein in its conventional sense refer to applying adhesive backing materials to greige goods by first forming the adhesive backing material as a solidified or substantially solidified film or sheet and thereafter, in a separate processing step, reheating or elevating the temperature of the film or sheet before applying it to the back surface of the primary backing material.

The term "heat content" is used herein to refer to the mathematical product of the heat capacity and specific gravity of a filler. Fillers characterized as having high heat content are used in specific embodiments of the present invention to extend the solidification or molten time of adhesive backing materials. The *Handbook for Chemical Technicians*, Howard J. Strauss and Milton Kaufmann, McGraw Hill Book Company, 1976, Sections 1-4 and 2-1 provides information an the heat capacity and specific gravity of select mineral fillers. The fillers suitable for use in the present invention do not change their physical state (i.e., remain a solid material) over the extrusion coating processing temperature ranges of the present invention. Preferred high heat content fillers possess a combination of 3 high specific gravity and a high heat capacity.

The term "implosion agent" is used herein to refer to the use of conventional blowing agents or other compounds which out-gas or cause out-gassing when activated by heat, usually at some particular activation temperature. In the present invention, implosion agents are used to implode or force adhesive backing material into the free space of yarn or fiber bundles.

The term "processing material" is used herein to refer to substances such as spin finishing waxes, equipment oils, sizing agents and the like, which can interfere with the adhesive or physical interfacial interactions of adhesive backing materials. Processing materials can be removed or displaced by a scouring or washing technique of the present invention whereby improved mechanical bonding is accomplished.

The terms "polypropylene carpet" and "polypropylene greige goods" are used herein to mean a carpet or greige goods substantially comprised of polypropylene fibers, irrespective of whether the primary backing material for the carpet or greige good is comprised of polypropylene or some other material.

The terms "nylon carpet" and "nylon greige goods" are used herein to mean a carpet or greige goods substantially comprised of nylon fibers, irrespective of whether the primary backing material for the carpet or greige good is comprised of nylon or some other material.

The term "linear" as used to describe ethylene polymers is used herein to mean the polymer backbone of the ethylene polymer lacks measurable or demonstrable long chain branches, e.g., the polymer is substituted with an average of less than 0.01 long branch/1000 carbons.

The term "homogeneous ethylene polymer" as used to describe ethylene polymers is used in the conventional sense in accordance with the original disclosure by Elston in U.S. Pat. No. 3,645,992; to refer to an ethylene polymer in which the comonomer is randomly distributed within a given polymer molecule and wherein substantially all of the polymer molecules have substantially the same ethylene to comonomer molar, ratio. As defined herein, both substantially linear ethylene polymers and homogeneously branched linear ethylene are homogeneous ethylene polymers.

Homogeneously branched ethylene polymers are homogeneous ethylene polymers that possess short chain branches and that are characterized by a relatively high short chain branching distribution index (SCBDI) or relatively high composition distribution branching index (CDBI). That is, the ethylene polymer has a SCBDI or CDBI greater than or equal to 50 percent, preferably greater than or equal to 70 percent, more preferably greater than or equal to 90 percent and essentially lack a measurable high density (crystalline) polymer fraction.

The SCBDI or CDBI is defined as the weight percent of the polymer molecules having a comonomer content within 50 percent of the median total molar comonomer content and represents a comparison of the comonomer distribution in the polymer to the comonomer distribution expected for a Bernoullian distribution. The SCBDI or CDBI of polyolefins can be conveniently calculated from data obtained from techniques known in the art, such as, for example, temperature-rising elution fractionation (abbreviated herein as "TREF") as described, for example, by Wild et al., *Journal of Polymer Science. Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, October 1-2, pp. 107-119 (1985), or in U.S. Pat. Nos. 4,798,081 and 5,008,204. However, the preferred TREF technique does not include purge quantities in SCBDI or CDBI calculations. More preferably, the comonomer distribution of the polymer and SCBDI or CDBI are determined using $^{13}C$ NMR analysis in accordance with techniques described, for example, in U.S. Pat. No. 5,292,345 and by J.C. Randall in Rev. Macromol. Chem. Phys., C29, pp. 201-317.

The terms "homogeneously branched linear ethylene polymer" and "homogeneously branched linear ethylene/$^a$-olefin polymer" means that the olefin polymer has a homogeneous or narrow short branching distribution (i.e., the polymer has a relatively high SCBDI or CDBI) but does not have long chain branching. That is, the linear ethylene polymer is a homogeneous ethylene polymer characterized by an absence of long chain branching. Such polymers can be made using polymerization processes (e.g., as described by Elston in U.S. Pat. No. 3,645,992) which provide a uniform short chain branching distribution (i.e., homogeneously branched). In his polymerization process, Elston uses soluble vanadium catalyst systems to make such polymers, however others, such as Mitsui Petrochemical Industries and Exxon Chemical Company, have reportedly used so-called single site catalyst systems to make polymers having a homogeneous structure similar to polymer described by Elston. U.S. Pat. No. 4,937,299 to Ewen et al. and U.S. Pat. No. 5,218,071 to Tsutsui et al. disclose the use of metallocene catalysts, such as catalyst systems based on hafnium, for the preparation of homogeneously branched linear ethylene polymers. Homogeneously branched linear ethylene polymers are typically characterized as having a molecular weight distribution, $M_w/M_n$, of less than 3, preferably less than 2.8, more preferably less than 2.3. Commercial examples of suitable homogeneously branched linear ethylene polymers include those sold by Mitsui Petrochemical Industries as Tafmer™ resins and by Exxon Chemical Company as Exact™ resins and Exceed™ resins.

The terms "homogeneous linearly branched ethylene polymer" or "homogeneously branched linear ethylene/$\alpha$-olefin polymer" do not refer to high pressure branched polyethylene which is known to those skilled in the art to have numerous long chain branches. The term "homogeneous linear ethylene polymer" generically refers to both linear ethylene homopolymers and to linear ethylene/$\alpha$-olefin interpolymers. A linear ethylene/$\alpha$-olefin interpolymer possesses short chain branching and n the $\alpha$-olefin is typically at least one $C_3$-$C_{20}$ $\alpha$-olefin (e.g., propylene, 1-butene, 1-pentene, 4-methyl-1-pentene, 1-hexene, and 1-octene).

When used in reference to an ethylene homopolymer (i.e., a high density ethylene polymer not containing any comonomer and thus no short chain branches), the term "homogeneous ethylene polymer" or "homogeneous linear ethylene polymer" means the polymer was made using a homogeneous catalyst system such as, for example, that described Elston or Ewen or those described by Canich in U.S. Pat. Nos. 5,026,798 and 5,055,438, or by Stevens et al. in U.S. Pat. No. 5,064,802.

The term "substantially linear ethylene polymer" is used herein to refer specially to homogeneously branched ethylene polymers that have long chain branching. The term does not refer to heterogeneously or homogeneously branched ethylene polymers that have a linear polymer backbone. For substantially linear ethylene polymers, the long chain branches have the same comonomer distribution as the polymer backbone, and the long chain branches can be as long as about the same length as the length of the polymer backbone to which they are attached. The polymer backbone of substantially linear ethylene polymers is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least 6 carbons, above which the length cannot be distinguished using $^{13}C$ nuclear magnetic resonance spectroscopy. The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285-297).

Although current $^{13}C$ nuclear magnetic resonance spectroscopy cannot determine the length of a long chain branch in excess of six carbon atoms, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J. Chem. Phys. 17, 1301 (1949) and Rudin. A., *Modern Methods of Polymer Characterization*, John Wiley & Sons, New York (1991) pp. 103-112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in substantially linear ethylene polymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octane in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

DeGroot and Chum also showed that a plot of Log($I_2$, melt index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For substantially linear ethylene polymers, the long chain branch is longer than the short chain branch that results from the incorporation of the $\alpha$-olefin(s) into the polymer backbone. The empirical effect of the presence of long chain branching in the substantially linear ethylene polymers used in the invention is manifested as enhanced rheological properties which are quantified and expressed herein in terms of gas extrusion rheometry (GER) results and/or melt flow, $I_{10}/I_2$, increases.

Substantially linear ethylene polymers are homogeneously branched ethylene polymers and are disclosed in U.S. Pat. No. 5,272,236 and U.S. Pat. No. 5,278,272. Homogeneously branched substantially linear ethylene polymers are available from The Dow Chemical Company as AFFINITY™ polyolefin plastomers and from Dupont Dow Elastomers JV as ENGAGE™ polyolefin elastomers. Homogeneously branched substantially linear ethylene polymers can be prepared via the solution, slurry, or gas phase polymerization of ethylene and one or more optional $\alpha$-olefin comonomers in the presence of a constrained geometry catalyst, such as the method disclosed in European Patent Application 416,815-A. Preferably, a solution polymerization process is used to manufacture the substantially linear ethylene polymer used in the present invention.

The terms "heterogeneous" and "heterogeneously branched" mean that the ethylene polymer is characterized as a mixture of interpolymer molecules having various ethylene to comonomer molar ratios. Heterogeneously branched ethylene polymers are characterized as having a short chain branching distribution index (SCBDI) less than about 30 percent. Heterogeneously branched linear ethylene polymers are available from The Dow Chemical Company as DOWLEX™ linear low density polyethylene and as ATTANE™ ultra-low density polyethylene resins. Heterogeneously branched linear ethylene polymers can be prepared via the solution, slurry or gas phase polymerization of ethylene and one or more optional alpha-olefin comonomers in the presence of a Ziegler Natta catalyst, by processes such as are disclosed in U.S.

Pat. No. 4,076,698 to Anderson et al. Heterogeneously branched ethylene polymers are typically characterized as having molecular weight distributions, $M_w/M_n$, in the range of from 3.5 to 4.1 and, as such, are distinct from substantially linear ethylene polymers and homogeneously branched linear ethylene polymers in regards to both compositional short chain branching distribution and molecular weight distribution.

The substantially linear ethylene polymers used in the present invention are not in the same class as homogeneously branched linear ethylene polymers, nor heterogeneously branched linear ethylene polymers, nor are substantially linear ethylene polymers in the same class as traditional highly branched low density polyethylene (LDPE). The substantially linear ethylene polymers useful in this invention surprisingly have excellent processability, even though they have relatively narrow molecular weight distributions (MWDs). Even more surprising, the melt flow ratio ($I_{10}/I_2$) of the substantially linear ethylene polymers can be varied essentially independently of the polydispersity index (i.e., molecular weight distribution ($M_w/M_n$)). This is contrasted with conventional heterogeneously branched linear polyethylene resins which have rheological properties such that as the polydispersity index increases, the $I_{10}/I_2$ value also increases. The rheological properties of substantially linear ethylene polymers also differ from homogeneously branched linear ethylene polymers which have relatively low, essentially fixed $I_{10}/I_2$ ratios.

We have discovered that substantially linear ethylene polymers and homogeneously branched linear ethylene polymers (i.e., homogeneously branched ethylene polymers) offer unique advantages for extrusion coated carpet backing applications, especially for commercial and residential carpet markets. Homogeneously branched ethylene polymers (including substantially linear ethylene polymers in particular, have low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE). As such, homogeneously branched ethylene polymers are useful for making carpet fibers, primary backing materials, adhesive backing materials and optional secondary backing materials. However, homogeneously branched ethylene polymers are particularly useful as adhesive backing materials for tufted carpet and non-tufted carpet (e.g., needle-punched carpet) and are especially useful for tufted carpets.

In the present invention, during extrusion coating of the backside of carpet to apply an adhesive backing material, properly selected substantially linear ethylene polymers and homogeneously branched linear ethylene polymers show good penetration of carpet yarns (fiber bundles) and also allow good consolidation of the fibers within the yarn. When used for tufted carpets, the tuft bind strength and abrasion resistance of the carpet is increased by the penetration of substantially linear ethylene polymers and homogeneously branched linear ethylene polymers into the yarn. Preferably, a tuft bind (or tuft lock) strength of 3.25 pounds (1.5 kg) or more is achieved, more preferably 5 pounds (2.3 kg) or more and most preferably 7.5 pounds (3.4 kg) or more. In addition to improved penetration of the yarn, tuft bind strength can be also be increased by increasing the molecular weight of the polymer. However, a higher polymer molecular weight selected for improved tuft bind strength is contra to the requirement of a lower polymer molecular weight which is generally needed for good yarn penetration and good extrusion coatability. Also, higher polymer densities are desirable for improved chemical and barrier resistance, yet higher densities invariably yield stiffer carpets. As such, polymer properties must be chosen such that a balance is maintained between extrusion coatability and abrasion resistance as well as between chemical resistance and carpet flexibility.

When carpet greige goods are backed with properly selected substantially linear ethylene polymers or homogeneously branched linear ethylene polymers, the low flexural modulus of these polymers offers advantages in ease of carpet installation and general carpet handling. Substantially linear ethylene polymers, in particular, when employed as an adhesive backing material show enhanced mechanical adhesion to polypropylene which improves the consolidation and delamination resistance of the various carpet layers and components, i.e., polypropylene fibers, fiber bundles, the primary backing material, the adhesive backing material and the secondary backing material when optionally applied. Consequently, exceptionally good abrasion resistance and tuft bind strength can be obtained. Good abrasion resistance is especially important in commercial carpet cleaning operations as good abrasion resistance generally improves carpet durability.

Properly selected substantially linear ethylene polymers can allow the elimination of secondary backing materials and as such as such result in significant manufacturing cost savings. In addition, carpets adhesively backed with a substantially linear ethylene polymer or homogeneously branched linear ethylene polymer can provide a substantial fluid and particle barrier which enhances the hygienic properties of carpet.

A substantially linear ethylene polymer or homogeneously branched linear ethylene polymer adhesive backing material can allow totally recyclable carpet products particularly where the carpet comprises polypropylene fibers. In addition, the mixture of a substantially linear ethylene polymer or a homogeneously branched linear ethylene polymer with a fiber-grade polypropylene resin can result in an impact modified recycle composition which is useful for injection molding and other molding applications as well as reuse in carpet construction, for example, as the primary backing material or as a blend component of the adhesive backing material polymer composition. That is, polyolefin polymer mixtures can involve sufficiently similar polymer chemistries, compatibilities, and/or miscibilities to permit good recyclability without having sufficient similarities to permit integral fusion.

The preferred homogeneously branched ethylene polymer has a single melting peak between −30° C. and 150° C., as determined using differential scanning calorimetry. The most preferred homogeneously branched ethylene polymer for use in the invention is a substantially linear ethylene polymer characterized as having (a) a melt flow ratio, $I_{10}/I_2 \geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution and no long chain branching, and wherein the substantially linear ethylene polymer and the linear ethylene polymer are simultaneously ethylene homopolymers or interpolymers of ethylene and at least one $C_3$-$C_{20}$ $\alpha$-olefin and have the same $I_2$ and $M_w/M_n$ and wherein the respective critical shear rates of the substantially linear ethylene polymer and the linear ethylene polymer are measured at the same melt temperature using a gas extrusion rheometer.

(d) a single differential scanning calorimetry, DSC, melting peak between −30° and 150° C.

Determination of the critical shear rate in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97-99. GER experiments are performed at a temperature of 190° C., at nitrogen pressures between about 250 and about 5500 psig (about 1.7 and about 37.4 MPa) using a 0.0754 mm diameter, 20:1 L/D die with an entrance angle of about 180°. For the substantially linear ethylene polymers used herein, the PI is the apparent viscosity (in kpoise) of a material measured by GER at an apparent shear stress of $2.15 \times 10^6$ dyne/$cm^2$ ($2.19 \times 10^4$ kg/$m^2$). The substantially linear ethylene polymer for use in the invention have a PI in the range of 0.01 kpoise to 50 kpoise, preferably 15 kpoise or less. The substantially linear ethylene polymers used herein also have a PI less than or equal to 70 percent of the PI of a linear ethylene polymer (either a Ziegler polymerized polymer or a homogeneously branched linear polymer as described by Elston in U.S. Pat. No. 3,645,992) having an $I_2$ and $M_w/M_n$, each within ten percent of the substantially linear ethylene polymer.

An apparent shear stress versus apparent shear rate plot is used to identify the melt fracture phenomena and quantify the critical shear rate and critical shear stress of ethylene polymers. According to Ramamurthy in the *Journal of Rheology*, 30(2), 337-357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film glass to the more severe form of "sharkskin." Herein, as determined using the above-described GER, the onset of surface melt fracture (OSMF) is characterized at the beginning of losing extrudate gloss at which the surface roughness of the extrudate can only be detected by 40× magnification. As described in U.S. Pat. No. 5,278,272, the critical shear rate at the onset of surface melt fracture for the substantially linear ethylene interpolymers and homopolymers is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the substantially linear ethylene polymers used in the invention, especially those having a density >0.910 g/cc, is greater than $4 \times 10^6$ dynes/$cm^2$. The critical shear rate at the onset of surface melt fracture (OSMF) and the onset of gross melt fracture (OGMF) will be used herein based on the changes of surface roughness and configurations of the extrudates extruded by a GER.

The homogeneous ethylene polymers used in the present invention are characterized by a single DSC melting peak. The single melting peak is determined using a differential scanning calorimeter standardized with indium and deionized water. The method involves 5-7 mg sample sizes, a "first heat" to about 140° C. which is held for 4 minutes, a cool down at 10/min. to −30° C. which is held for 3 minutes, and heat up at 10° C./min. to 150° C. for the "second heat". The single melting peak is taken from the "second heat" heat flow vs. temperature curve. Total heat of fusion of the polymer is calculated from the area under the curve.

For polymers having a density of 0.875 g/cc to 0.910 g/cc, the single melting peak may show, depending on equipment sensitivity, a "shoulder" or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact.

Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

Whole polymer product samples and individual polymer components are analyzed by gel permeation chromatography (GPC) on a Waters 150 high temperature chromatographic unit equipped with three mixed porosity columns (Polymer Laboratories $10^3$, $10^4$, $10^5$ and $10^6$ Å), operating at a system temperature of 140° C. The solvent is 1,2,4-trichlorobenzene, from which 0.3 percent by weight solutions of the samples are prepared for injection. The flow rate is 1.0 milliliters/minute and the injection size is 100 microliters.

The molecular weight determination with is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a * (M_{polystyrene})^b.$$

In this equation, a=0.4316 and b=1.0. Weight average molecular weight, $M_w$, and number average molecular weight, $M_n$, are calculated in the usual manner according to the following formula: $M_j = (\Sigma\, w_i(M_i^j))^j$; where $w_i$ is the weight fraction of the molecules with $M_i$ eluting from the GPC column in fraction i and j=1 when calculating $M_w$ and j=−1 when calculating $M_n$.

The molecular weight distribution ($M_w/M_n$) for the substantially linear ethylene polymers and homogeneous linear ethylene polymers used in the present invention is generally from about 1.8 to about 2.8.

However, substantially linear ethylene polymers are known to have excellent processability, despite having a relatively narrow molecular weight distribution. Unlike homogeneously and heterogeneously branched linear ethylene polymers, the melt flow ratio ($I_{10}/I_2$) of substantially linear ethylene polymers can be varied essentially independently of their molecular weight distribution, $M_w/M_n$.

Suitable homogeneously branched ethylene polymers for use in the present invention include interpolymers of ethylene and at least one $\alpha$-olefin prepared by a solution, gas phase or slurry polymerization process or combinations thereof. Suitable α-olefins are represented by the following formula:

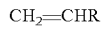

where R is a hydrocarbyl radical. Further, R may be a hydrocarbyl radical having from one to twenty carbon atoms and as such the formula includes $C_3$-$C_{20}$ α-olefins. Suitable α-olefins for use as comonomers include propylene, 1-butene, 1-isobutylene, 1-pentene, 1-hexene, 4-methyl-1-pentene, 1-heptene and 1-octene, as well as other comonomer types such as styrene, halo- or alkyl-substituted styrenes, tetrafluoro-ethylene, vinyl benzocyclobutane, 1,4-hexadiene, 1,7-octadiene, and cycloalkenes, e.g., cyclopentene, cyclohexene and cyclooctene. Preferably, the comonomer will be 1-butane, 1-pentene, 4-methyl-1-pentene, 1-hexene, 1-heptene, 1-octene, or mixtures thereof, as adhesive backing materials comprised of higher α-olefins will have especially improved toughness. However, most preferably, the comonomer will be 1-octane and the ethylene polymer will be prepared in a solution process.

The density of the substantially linear ethylene polymer or homogeneously branched linear ethylene polymer, as measured in accordance with ASTM D-792, does not exceed 0.92 g/cc, and is generally in the range from about 0.85 g/cc to about 0.92 g/cc, preferably from about 0.86 g/co to about 0.91 g/cc, and especially from about 0.86 g/cc to about 0.90 g/cc.

The molecular weight of the homogeneously branched linear ethylene polymer or substantially linear ethylene polymer is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the homogeneously branched linear ethylene polymer or substantially linear ethylene polymer is generally from about 1 grams/10 minutes (g/10 min) to about 500 g/10 min, preferably about 2 g/10 min. to about 300 g/10 min., more preferably from about 5 g/10 min to about 100 g/10 min., especially from about 10 g/10 min. to about 50 g/10 min., and most especially about 25 to about 35 g/10 min.

Another measurement useful in characterizing the molecular weight of the homogeneous linear ethylene polymer or the substantially linear ethylene polymer is conveniently indicated using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene polymer, the $I_{10}/I_2$ ratio indicates the degree of long chain branching, i.e., the higher the $I_{10}/I_2$ ratio the more long chain branching in the polymer. The $I_{10}/I_2$ ratio of the substantially linear ethylene polymer is at least 6.5, preferably at least 7, especially at least 8. The $I_{10}/I_2$ ratio of the homogeneously branched linear ethylene polymer is generally less than 6.3.

Preferred ethylene polymers for us in the present invention have a relative low modulus. That is, the ethylene polymer is characterized as having a 2% secant modulus less than 24,000 psi (163.3 MPa), especially less than 19,000 psi (129.3 MPa) and most especially less than 14,000 psi (95.2 MPa), as measured in accordance with ASTM D790.

Preferred ethylene polymers for use in the a present invention are substantially amorphous or totally amorphous. That is, the ethylene polymer is characterized as having a percent crystallinity less than 40 percent, preferably less than 30 percent, more preferably less than 20 and most preferably less than 10 percent, as measured by differential scanning calorimetry using the equation percent crystallinity=$H_f$/292*100, where $H_f$ is the heat of fusion in Joules/gram.

The homogeneously branched ethylene polymer can be used alone or can be blended or mixed with one or more synthetic or natural polymeric material. Suitable polymers for blending or mixing with homogeneously branched ethylene polymers used in the present invention include, but are not limited to, another homogeneously branched ethylene polymer, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted homogeneously branched ultra low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

The actual blending or mixing of various polymers may be conveniently accomplished by any technique known in the art including, but not limited to, melt extrusion compounding, dry blending, roll milling, melt mixing such as in a Banbury mixer and multiple reactor polymerization. Preferred blends or mixtures include a homogeneously branched ethylene polymer and a heterogeneously branched ethylene α-olefin interpolymer wherein the α-olefin is a $C_3$-$C_8$ α-olefin prepared using two reactors operated in parallel or in series with different catalyst systems employed in each reactor. Multiple reactor polymerizations are described in copending applications U.S. Ser. No. 08/544,497, filed Oct. 18, 1995 and U.S. Ser. No. 08/327,156, filed Oct. 21, 1994. However, preferred multiple reactor polymerizations comprise non-adiabatic solution loop reactors as described in provisional applications U.S. Ser. No. 60/1014696 and U.S. Ser. No. 60/014705, both filed Apr. 1, 1996.

A range of resin properties, processing conditions and equipment configurations have been discovered for extrusion coatable carpet backing systems that deliver performance similar or better than incumbent latex and polyurethane systems.

FIG. 1 is an illustration of a tufted carpet 10. The tufted carpet 10 is made of a primary backing material 11 with yarn 12 tufted therethrough; an adhesive backing material 13 which is in intimate contact with the back surface of the primary backing material 11, substantially encapsulates the yarn 12 and penetrates the yarn 12 and binds individual carpet fibers; and an optional secondary backing material 14 applied to the back surface of the adhesive backing material 13.

FIG. 2 is an illustration of an extrusion coating line 20 for making a carpet 70. The line 20 includes an extruder 21 equipped with a slot die 22, a nip roll 24, a chill roll 23, an exhaust hood 26, a greige good feeder roll 28 and a pre-heater 25. As illustrated, the nip roll is preferably equipped with a vacuum slot 29 to draw a vacuum across about 60 degrees or about 17 percent of its circumference and is equipped with a vacuum pump 27. The slot die 22 dispenses an adhesive backing material in the form of a semi-molten or molten polymer web 30 onto greige good 40 with the polymer web 30 towards the chill roll 23 and the greige good 40 towards the optional vacuum nip roll 24. As illustrated, an optional secondary backing material 50 is applied onto the polymer web 30. The point where the nip roll 24 and the chill roll 23 are closest to one another is referred to as the nip 60.

The present invention is useful in producing carpets with face yarn made from various materials including, but not limited to, polypropylene, nylon, wool, cotton, acrylic, polyester and polytrimcethylenetheraphthalate (PTT). However, again because one of the objects of the present invention is to provide a recyclable carpet such as, for example, a 100% polyolefin carpet, the most preferred yarn comprises a polyolefin, more preferably, polypropylene. Most preferably, the yarn used in the present invention is an air entangled 2750 denier polypropylene yarn such as that produced by Shaw Industries, Inc. and sold under the designation "Permacolor 2750 Type 015."

The preferred primary backing material comprises 2 polyolefin, more preferably polypropylene. Most preferably, the primary backing material is a slit film polypropylene sheet such as that sold by AMOCO or Synthetic Industries. Alternatively, other types of primary backing materials, such as non-woven webs, can also be used. Although other materials, such as polyesters or polyamides can be used for the primary backing material, it is preferred to use a polyolefin so that the objective of producing a carpet made entirely from polyolefins is achieved. In addition, polypropylene primary backing materials are typically lower in cost.

The method of tufting or needle-punching the yarn is not deemed critical to the present invention. Thus, any conventional tufting or needle-punching apparatus and stitch patterns can be used. Likewise, it does not matter whether tufted yarn loops are left uncut to produce a loop pile; cut to make cut pile; or cut, partially cut and uncut to make a face texture known as tip sheared.

After the yarn is tufted or needle-punched into the primary backing material, the greige good is typically rolled up with the back side of the primary backing material facing outward and held until it is transferred to the backing line.

In a preferred embodiment, the greige good is scoured or washed before it has an adhesive backing material extruded thereon. In particular, yarn that is tufted or needle-punched to make carpet often has varying quantities of processing materials, most commonly oily or waxy chemicals, known as spin-finish chemicals, remaining thereon from the yarn manufacturing processes. It has been found to be preferable to remove or displace all or substantially all of these processing materials prior to extruding the adhesive backing material onto the back surface of the primary backing material. A preferred scouring or washing method includes passing the greige good through a bath containing an aqueous detergent solution at about 64 to about 70° C. (e.g., 67° C.). Suitable detergents include, but are not limited to, STA which is available From American Emulsions. After the detergent washing processing step, the greige good is dried or preheated. Drying can be accomplished at a temperature of about 108° C. to about 112° C. (e.g., 110° C.) for about 1.8 to about 2.2 minutes (e.g., 2 minutes).

Another preferred scouring or washing method includes using a wet vacuum cleaner system that initially dispenses ambient temperature water or heated water (either optionally containing a detergent or cleaning solution) onto the primary backing material side of the greige good and then sequentially vacuums up the water and retained amounts of processing materials. The wet vacuum system is suitably adapted with a dispensing and vacuum wand or head such that the entire width of the greige good can be wet vacuumed at least once on a continuous extrusion coating line. After the wet vacuuming processing step, the greige good is suitably dried and/or preheated. Suitable detergents, cleaning solutions or cleaning concentrates for use in a wet vacuuming method includes, but is not limited to, aqueous alkaline solutions, for example, those consisting of ethylene diamine tetracetic acid tetrasodium salt. One suitable wet vacuum cleaner system is the Rinsevac™ carpet cleaning system and one suitable cleaning concentrate is the Rinsevac™ Professional Carpet Cleaner both supplied by Blue Lustre Products, Inc., Indianapolis, In.

Other suitable methods of the present invention for scouring or washing processing materials, adaptable to an extrusion coating line such as, for example, the one illustrated in FIG. 2, include steam cleaning, flashing at elevated temperatures and/or under vacuum, and solvent chemical washing of the greige good.

It is also contemplated that the use of polyolefin waxes (rather than conventional organic and mineral oils) as processing materials would allow improved adhesive backing material performance in itself or at least less demanding scouring or washing requirements. Nevertheless, practitioners will find that scouring or washing requirements may vary with the amount and specific type of processing materials present. That is, higher quantities of process materials and/or higher molecular processing materials may require more stringent scouring and washing techniques such as, for example, multiple washing and drying steps using concentrated washing solutions based on softened or deionized water. Practitioners will also recognize that scouring and washing requirements for effectively removing or displacing processing materials may be more extensive than ordinary washings or other cleaning procedures performed for cosmetic or decorative purposes or performed to simply remove loose fibers, primary backing material or other debris that ordinarily result from tufting, needle-punch and/or cutting operations.

In another aspect of the present invention, the greige good is coated with an aqueous pre-coat material, either as a final backing or preferably before an adhesive backing material is extruded thereon. The particles in this dispersion can be made from various polyolefin materials such as ethylene acrylic acid (EAA), ethylene vinyl acetate (EVA), polypropylene or polyethylene (e.g., low density polyethylene (LDPE), linear low density polyethylene (LLDPE) or substantially linear ethylene polymer, or mixtures thereof). Presently, polyethylene particles are preferred. Most preferably, the polyethylene particles are those sold by Quantum USI Division under the designation "Microthene FN500."

Preferably, the polyolefin particles are present in an amount between about 10 and 75 percent by weight of the dispersion, more preferably between about 20 and about 50 percent, and most preferably between about 25 and about 33 percent.

The particle size of the polyolefin particles is important both to ensure that a good dispersion is achieved and also to ensure that the polyolefin particles penetrate the yarn and primary backing so as to provide good abrasion resistance. Preferably, the average particle size of the polyolefin particles is between about 1 and about 1000 microns, and more preferably between about 5 and 40 microns. The most preferred polyethylene particles referred to above have an average particle size of about 18 to about 22 microns (e.g., 20 microns).

Preferably, the polyolefin particles have a Vicat softening point (as measured in accordance with ASTM DI 525) between about 50 and about 100° C., and more preferably between about 75 and 100° C. The most preferred polyethylene particles referred to above have a softening point of about 80° to about 85° C. (e.g., 83° C.).

When polypropylene particles are used, they preferably have a melt flow (ASTM D-1238 Condition 210/2.16) between about 1 to about 80, most preferably between about 60 and about 80. When polyethylene particles are used, they preferably have an 12 melt index (ASTM D-1238 Condition 190/2.16) between about 1 and about 100 g/10 minutes, and more preferably between about 20 and about 25 g/10 minutes. The most preferred polyethylene particles referred to above have an 12 melt index of t 22 g/10 minutes.

Ethylene acrylic acid (EAA) may be used for the polyolefin particles, preferably in combination with polyethylene or polypropylene particles. It has been found that EAA can increase the adhesion of the pre-coat to the yarn and primary backing, as well as to a thermoplastic sheet extruded thereon.

The aqueous dispersion preferably contains other ingredients. For example, a surfactant is preferably included to aid in keeping the polyolefin particles dispersed. Suitable surfactants are nonionic, anionic, cationic and fluorosurfactants. Preferably, the surfactant is present in an amount between about 0.01 and about 1 weight percent based on the total weight of the dispersion. More preferably, the surfactant is anionic. Most preferably, the surfactant is one sold by Ciba Geigy under the designation "Igepal C0430" and is present at 0.1 weight percent based on the total weight of the dispersion.

A thickener is also preferably included to provide a suitable viscosity to the dispersion. Preferably, the thickener is one selected from the group consisting of sodium and ammonium salts of polyacrylic acids and is present in an amount between about 0.1 and about 2 weight percent based on the total weight of the dispersion. Most preferably, the thickener is a salt of a polyacrylic acid such as that sold by Sun Chem International under the designation "Print Gum 600" and is present at about 0.8 weight percent based on the total weight of the dispersion.

Preferably, the viscosity of the dispersion measured on a Brookfield RVT viscometer is between about 3000 cP (centipoises) at 20 rpm with a No. 5 spindle and about 50,000 cP at 2.5 rpm with a No. 5 spindle measured at 23° C. Most preferably, the viscosity of the dispersion is between about 10,000 and 20,000 cP at 2.5 rpm with a No. 5 spindle.

In addition, the dispersion preferably includes a defoaming agent. Preferably, the defoaming agent is a non-silicone defoaming agent and is present in an amount between about 0.01 and about 1.0 weight percent based on the total weight of the dispersion. Most preferably, the defoamer is one such as that sold by LENMAR Chemical Corporation under the designation "MARFOAM N-24A" and is present at about 0.1 weight percent based on the total weight of the dispersion.

Preferably, the aqueous dispersion further includes a dispersion enhancer, such as fumed silica which has been found to act as a compatibilizer for the dispersion, thus allowing the use of larger polyolefin particles. Preferably, the fumed silica is present at between about 0.1 and about 0.2 weight percent based on the total weight of the dispersion. Most preferably, the fumed silica is one such as that sold by DeGussa under the designation "Aerosil 300."

The aqueous dispersion of polyolefin particles can be made up in various ways. Preferably, the ingredients are added to the water in the following order: surfactant, defoamer, polyolefin, thickener. The mixture is then agitated in a homogenous mixer, preferably with high shear mixing, until all lumps have dispersed, typically for about 8 to about 12 minutes (e.g., 10 minutes).

The dispersion can be applied to the carpet in various ways. For example, the dispersion can be applied directly, such as with a roll over roller applicator, or a doctor blade. Alternatively, the dispersion can be applied indirectly, such as with a pan applicator. Preferably, a roll over roller applicator is used with the top roller turning at about 22 to about 27 percent of line speed (e.g., 25 percent of line speed).

The amount of dispersion applied and the concentration of the particles can be varied depending on the desired processing and product parameters. Preferably, the amount of dispersion applied and the concentration of the particles are selected so as to apply between about 4 and about 12 ounces per square yard (OSY) (about 141.5 and about 424.4 $cm^3/m^2$) of carpet. Most preferably, this is achieved by using a dispersion containing about 50 weight percent polyolefin particles (based on the total weight of the dispersion) and applying between about 8 and about 10 OSY (about 283 and about 353.7 $cm^3/m^2$) of the dispersion.

After application of the dispersion, heat is applied to the back side of the primary backing so as to dry the dispersion and to at least partially melt the particles. As a result, the loops of yarn are fixed to the primary backing. Preferably, the heat is applied by passing the product through an oven. Such an oven is preferably set at a temperature between about 100 and about 150° C. and the product spends between about 2 and about 5 minutes passing through the oven. Also, since the object is to at least partially melt the particles, the temperature of the oven is set at between about 5 and about 75° C. above the Vicat softening point of the polyolefin particles.

After treatment with the dispersion of polyolefin particles, the carpet may be used as is or, more preferably, may have an additional backing applied thereto. Additional backings can be applied by various methods with the preferred method, as described above, involving the use of an extruded sheet of a thermoplastic material, preferably the homogeneously branched ethylene polymer described above, onto which a conventional secondary backing is laminated. In particular, a molten thermoplastic material is preferably extruded through a die so as to make a sheet which is as wide as the carpet. The molten, extruded sheet is applied to the back side of the primary carpet backing. Since the sheet is molten, the sheet will conform to the shape of the loops of yarn and further serve to fix the loops in the primary backing.

Extrusion coating configurations include a monolayer T-type die, single-lip die coextrusion coating, dual-lip die coextrusion coating, and multiple stage extrusion coating. Preferably, the extrusion coating equipment is configured to apply a total coating weight of between about 4 and about 30 ounces/$yd^2$ (OSY) (about 141.5 and about 1061.1 $cm^3$ $m^2$), with between about 18 OSY (about 636.7 $cm^3/m^2$) and about 22 OSY (about 778.1 $cm^3/m^2$), e.g., 20 OSY, (707.4 $cm^3/m^2$) being most preferred.

Measured another way, the thickness of an unexpanded, collapsed extrusion coated adhesive backing material is in the range from about 6 to about 80 mils, preferably from about 10 to about 60 mils (about 0.25 to about 1.52 mm), more preferably from about 15 to about 50 mils (about 0.38 to about 1.27 mm), and most preferably from about 20 to about 40 mils (about 0.51 to about 1.02 mm).

The line speed of the extrusion process will depend on factors such as the particular polymer being extruded, the exact equipment being used, and the weight of polymer being applied. Preferably, the line speed is between about 18 and about 250 ft./min. (about 5.5 and about 76.2 m/min.), more preferably between about 80 and about 220 ft./min. (about 24.4 and about 67.1 m/min.), most preferably between about 100 and about 200 ft./min. (about 30.5 and about 61 m/min.).

The extrusion coating melt temperature principally depends on the particular polymer being extruded. When using the most preferred substantially linear polyethylene described above, the extrusion coating melt temperature is greater than about 450° F. (232° C.), preferably greater than or equal to about 500° F. (about 260° C.), or is between about 450° (about 232° C.) and about 650° F. (about 343° C.), more preferably between about 475° (about 246° C.) and about 600° F. (about 316° C.), most preferably between about 500° and about 550° F. (about 260° and about 288° C.).

Preferably, two layers of resin, each layer comprising a different resin, are extruded with the layer applied directly onto the backside of the primary backing material (first layer) having a higher melt index than the second layer which is applied onto the backside of the first layer. Since it is the first layer which is relied on to encapsulate and penetrate the yarn, this layer should have a melt index high enough (melt viscosity low enough) to promote encapsulation and penetration of the yarn. The second layer, which is generally not relied on to encapsulate and penetrate the yarn, may be used either as the bottom surface of the carpet or to facilitate the application of an optional secondary backing material. For both of these uses, it is preferred to have a lower melt index to provide higher strength after cooling. In addition, because it is not relied on for encapsulating or penetrating the fiber bundles, a resin of lower quality and/or less tightly controlled properties may be used in the second layer. In a preferred embodiment, the second layer is a recycled feedstock.

Also, the first and second layers may consist of different polymer chemistries or compositions. For example, the first layer can be comprised of an adhesive polymer (as an additive or as the composition of the entire layer) such as, but not limited to, an ethylene vinyl acetate copolymer, an ethylene acrylic acid copolymer or a maleic anhydride/ethylene polymer graft (preferably, a substantially linear ethylene polymer/maleic anhydride extrusion graft or a high density polyethylene/maleic anhydride extrusion graft) and the second layer can be comprised of a non-polar polymer such as a homogeneously branched ethylene polymer, a low density polyethylene or ultra low density polyethylene. Alternately, the first layer can be comprised of a non-polar polymer and the second layer can be comprised of an adhesive polymer.

Preferably, the first layer has an $I_2$ melt index between about 30 and about 175g/10 min. and the second layer has an $I_2$ melt index between about 1 and about 70 g/10 min. Most preferably, the first layer has an $I_2$ melt index between about 30 and about 70 g/10 min and the second layer has an $I_2$ melt index between about 10 and about 30 g/10 min.

It is also preferred to extrude two layers of a single polymer composition so as to have greater control over the thickness or weight of the resin applied to the carpet. In alternative embodiments, three or more layers of the resin can be extruded on the back surface of the primary backing material to achieve even higher coat weights and/or to obtain a more gradual transition between the first and last layer applied. Preferably, a dual lip die is used to apply two layers. Alternatively, two or more extrusion stations or a single lip coextrusion die can be used to apply these two or more layers.

Another aspect of the present invention is the use of modified homogeneously branched ethylene polymers. In particular, in certain aspects of the invention the at least one homogeneously branched ethylene polymer that is employed as the adhesive backing material, primary backing material or yarn; preferably as the adhesive backing material, is modified by the addition of at least one adhesive polymeric additive. Suitable adhesive polymeric additives include polymer products comprised of (1) one or more ethylenically unsaturated carboxylic acids, anhydrides, alkyl esters and half esters, e.g., acrylic acid, methacrylic acid, maleic acid, maleic anhydride, itaconic acid, fumaric acid, crotonic acid and citraconic acid, citraconic anhydride, succinnic acid, succinnic anhydride, methyl hydrogen maleate, and ethyl hydrogen maleate; esters of ethylenically unsaturated carboxylic acids, e.g., ethyl acrylate, methyl methacrylate, ethyl methacrylate, methyl acrylate, isobutyl acrylate, and methyl fumarate; unsaturated esters of carboxylic acids, e.g., vinyl acetate, vinyl propionate, and vinyl benzoate; and ethylenically unsaturated amides and nitrites e.g., acrylamide, acrylonitrile, methacrylonitrile and fumaronitrile; and (2) one or more ethylenically unsaturated hydrocarbon monomers such as aliphatic $^a$-olefin monomers, e.g., ethylene, propylene, butene-1 and isobutene; conjugated dienes, e.g., butadiene and isoprene; and monovinylidene aromatic carbocyclic monomers, e.g., styrene, a-methylstyrene, toluene, and t-butylstyrene. Suitable adhesive polymeric additives can be conveniently prepared by known techniques such as, for example, by interpolymerization or by a polymerization procedure followed by a chemical or extrusion grafting procedure. Suitable grafting techniques are described in U.S. Pat. Nos. 4,762,890; 4,927,888; 4,230,830; 3,873,643; and 3,882,194.

Preferred adhesive polymeric additives for use in the present invention are maleic anhydride grafts wherein maleic anhydride is grafted onto an ethylene polymer at a concentration of about 0.1 to about 5.0 weight percent, preferably about 0.5 to about 1.5 weight percent. The use of ethylene polymer/maleic anhydride grafts as adhesive polymeric additives in the present invention significantly improves the performance and operating window of extrusion coated homogeneously branched ethylene polymers as the adhesive backing material, especially for polar polymer such as for example, but not limited to, nylon and polyester faced carpets. The improvement pertained to substantially higher comparative abrasion resistance and tuft bind strength. The improvement was surprising in that graft adhesives are generally known to require extended molten or semi-molten contact times for improved performance and function as interlayer adhesives for films and coatings where there is a continuous substrate as opposed to the discontinuous interface existent in carpet construction.

Preferred ethylene polymers for use as the grafted host polymer include low density polyethylene (LDPE), high density polyethylene (HDPE), heterogeneously branched linear low density polyethylene (LLDPE), homogeneously branched linear ethylene polymers and substantially linear ethylene polymers. Preferred host ethylene polymers have a polymer density greater than or equal to 0.915 g/cc and most preferably greater than or equal to 0.92 g/cc. Substantially linear ethylene polymers and high density polyethylene are the preferred host ethylene polymers.

In this aspect of the present invention, the adhesive polymeric additive is added to the homogeneously branched ethylene polymer at a level in the range of from about 0.5 to about 30 weight percent, preferably from about 1 to about 20 weight percent, more preferably from about 5 to about 15 weight percent based on the total weight of the polymer. For the preferred ethylene polymer maleic anhydride grafts, additions should provide a final maleic anhydride concentration in the range of from about 0.01 to about 0.5 weight percent, preferably from about 0.05 to about 0.2 weight percent based on the total weight of the polymer.

Auxiliary equipment such as a pre-heater can be used. In particular, a heater, such as a convection oven or infrared panels can be used to heat the back of the greige good before the adhesive backing material is extruded thereon. In doing so, it has been found that the encapsulation and penetration of the yarn bundles can be enhanced. Preferably, the pre-heater is an infrared unit set at between about 200 and about 1500° C. and the greige good is exposed to this heating for between about 3 and about 30 seconds. Most preferably, the heater is set at about 1000° C. and the greige good is exposed to this heating for about 5 to about 7 seconds (e.g., 6 seconds).

In addition to or as an alternative to pre-heating, the process of the invention may also employ a post-heat soaking process step to lengthen the molten time for the adhesive backing material to thereby improve the encapsulation and penetration of the yarn or fiber bundles by the adhesive backing material. Preferably, after the adhesive backing material is applied to the greige good, it is heated by a convection oven or infrared radiation at a temperature between about 200 and about 1500° C. for between about 3 and 30 seconds, most preferably at 1000° C. for about 5 to about 7 seconds (e.g., 6 seconds).

As another piece of auxiliary or optional equipment, a vacuum nip roll can be used to draw the adhesive backing material extrudate (i.e., semi-molten or molten polymer web) onto the greige good. In a properly configured extrusion coating operation, the pile face of the greige good is positioned towards the vacuum nip roll and the polymer web is draw down onto the back surface of the primary backing material of the greige good. Vacuum nip roll 24 (which is illustrated in FIG. 2 and is available from Black Clawson Corporation) is suitable for vacuum drawing the adhesive backing material web. Vacuum nip roll 24 can be adapted from a conventional nip roll wherein a portion of the hollow internal of the roll is partitioned, dedicated and coupled to a external vacuum pump 27 to provide a vacuum surface. The surface of the vacuum portion is perforated but machined flush and continuously with the remaining surface of the roll. Suitable vacuum nip rolls can have a complete 360 degree vacuum surface; however, a vacuum surface of from about 10 to about 180 degrees is preferred, most preferably about 60 degrees. To effectively draw the adhesive backing material web onto the greige good and maximize to the penetration of the yarn or fiber bundles, the vacuum is set to greater than 15 inches of $H_2O$ (3.7 Pa), preferably greater than or equal to 25 inches of $H_2O$ (6.1 Pa) and more preferably greater than or equal to 40 inches of $H_2O$ (9.8 Pa), or from between about 15 and about 50 inches of $H_2O$ (about 3.7 and about 12.3 Pa), preferably from between about 20 and about 45 (about 4.9 and about 11.1 Pa).

The length of time the greige good is actually subjected to the vacuum will primarily depend on the extrusion coating line speed and the extent of draw on the adhesive backing material web will largely depend on the level of vacuum and the porosity of the greige good. As such, higher vacuum levels will be required for higher extrusion coating line speeds and/or denser greige good to effectively the draw the adhesive backing material.

In addition to or as an alternative to a vacuum nip roll, a high pressure positive air device such as an air blade or knife can also be used to force the adhesive backing material web onto the back surface of the primary backing material. Preferably, the positive air pressure device is set to provide an air pressure greater than 20 psi (0.14 MPa), preferably greater than or equal to 40 psi (0.27 MPa), more preferably greater than or equal to 60 psi (0.41 MPa), or between about 20 and about 120 psi (about 0.14 and about 0.82 MPa), most preferably between about 30 and about 80 psi (about 0.20 and about 0.54 MPa) Preferably, the positive air pressure device is positioned at the extrusion coating nip, extends across the entire width of the polymer web and is positioned behind the polymer web towards the chill roll so to force the polymer web onto the greige good and press the polymer web into the yarn or fiber bundles.

The extruded polymer(s) can either be used neat, or can have one or more additive included. A preferred additive is an inorganic filler, more preferably, an inorganic filler with a high heat content. Examples of such fillers include, but are not limited to, calcium carbonate, aluminum trihydrate, talc, barite. High heat content fillers are believed to be advantageous in the invention because such fillers allow the extrudate to remain at elevated temperatures longer with the beneficial result of providing enhanced encapsulation and penetration. That is, normally fillers are added to carpet backing materials to merely add bulk (i.e. as extenders) or to impart insulating and sound dampening characteristics. However, we have found that inorganic mineral fillers that have high heat contents surprisingly improve yarn encapsulation and penetration which in turn improves the performance of the abrasion resistance and tuft bind strength of extrusion coated carpet samples.

Preferably, a high heat content filler is added at a level of between about 1 and about 75 weight percent of the total extrudate, more preferably between about 15 and about 60 weight percent and most preferably between about 20 weight percent and 50 weight percent. Such fillers will have a specific heat content of greater than or equal to 0.4 cal-cc/° C. (1.8 Joules-cc/° C.), preferably greater than or equal to 0.5 cal-cc/° C. (2 Joules-cm$^3$/° C.), more preferably greater than or equal to 0.6 cal-cc/C (2.5 Joules-cm$^3$/° C.), and most preferably greater than or equal to about 0.7 cal-cc/° C. (2.9 Joules-cm$^3$/° C.). Representative examples of high heat content fillers for use in the present invention include, but are not limited to, limestone (primarily $CaCO_3$), marble, quartz, silica, and barite (primarily $BaSn_4$). The high heat content fillers should be ground or precipitated to a size that can be conveniently incorporated in an extrusion coating melt stream. Suitable particle sizes range from about 1 to about 50 microns.

If a foamed backing is desired on the carpet, a blowing agent can be added to the adhesive backing material and/or the optional secondary backing material. If used, the blowing agents are preferably conventional, heat activated blowing agents such as azodicarbonamide, toluene sulfonyl semicarbazide, and oxy bis(benzene sulfonyl) hydrazide. The amount of blowing agent added depends on the degree of foaming sought. A typical level of blowing agent is between about 0.1 and about 1.0 weight percent.

Implosion in the present invention is accomplished by restricting expansion of the adhesive backing material in the direction opposite the primary backing material during activation of the implosion agent such that the molten polymer is forced into the interior and free space of the yarn or fiber bundles. An imploded adhesive backing material will have a collapsed, non-expanded matrix (relative to a foamed backing) and be of essentially the same thickness (measured from the plane of the back surface of the primary backing material) as would be the case without the use of the implosion agent. That is, the adhesive backing material layer would be characterized as not being expanded by the implosion agent.

The implosion agent is selected and formulated into the adhesive backing material and extrusion conditions are set such that the activation of the implosion agent occurs at the instant of nip while the adhesive backing material is still semi-molten or molten. With improved yarn penetration accomplished with the use of an implosion agent, the carpet will exhibit comparatively improved abrasion resistance. Thus, the use of an implosion agent can allow the use of polymer compositions having lower molecular weights to provide improved extrusion coatability yet maintain higher abrasion resistance (i.e., comparable to adhesive backing materials based on higher molecular weight polymer compositions). An effective amount of implosion agent would be between about 0.1 and about 1.0 weight percent based on the weight of the adhesive backing material.

Conventional blowing agents or any material that ordinarily functions as a blowing agent can be used as an implosion agent in the present invention providing expansion of the adhesive backing material matrix is suitably restricted or confined when the material is activated such that molten polymer is forced into the interior and free space of the yarn or fiber bundles and there is no substantial expansion of the adhesive backing material as a result of having used the implosion agent. However, preferably, an imploded adhesive backing material will be characterized as having a closed cell structure that can be conveniently identified by photomicrographs at 50× magnification.

Other additives can also be included in the adhesive backing material, to the extent that they do not interfere with the enhanced properties discovered by Applicants. For example, antioxidants such as sterically hindered phenols, sterically hindered amines and phospites may be used. Suitable antioxidants include Irganox® 1010 from Ciba-Geigy which is a hindered phenol and Irgafos® 168 from Ciba-Geigy which is a phosphite. Other possible additives include antiblock additives, pigments and colorants, anti-static agents, antimicrobial agents (such as quaternary ammonium salts) and chill roll release additives (such as fatty acid amides).

As noted above, and shown in FIG. 2, the carpet of the invention preferably also includes a secondary backing material. Preferably, the secondary backing material is laminated directly to the extruded layer(s) while the extrudate is still molten after extrusion coating. It has been found that this technique can improve the penetration of the extrusion coating into the primary backing.

Alternatively, the secondary backing material can be laminated in a later step by reheating and/or remelting at least the outermost portion of the extruded layer or by a coextrusion coating technique using at least two dedicated extruders. Also, the secondary backing material can be laminated through some other means, such as by interposing a layer of 2 polymeric adhesive material between the adhesive backing material and the secondary backing material. Suitable polymeric adhesive materials include, but are not limited to, ethylene acrylic acid (EAA) copolymers, ionomers and maleic anhydride grafted polyethylene compositions.

The material for the secondary backing material can be a conventional material such as the woven polypropylene fabric sold by AMOCO under the designation Action Bac®. This material is a leno weave with polypropylene monofilaments running in one direction and polypropylene yarn running in the other. More preferably, the secondary backing material used with the present invention is a woven polypropylene fabric with monofilaments running in both directions. A suitable example of such a material is sold by Amoco under the designation Style 3878. This material has a basis weight of 2 OSY (70.7 cm$^3$/m$^2$). This material with monofilaments running in both directions has been found beneficial in providing enhanced dimensional stability to the carpet.

In an alternatively preferred embodiment, the secondary backing material is a material known as fiber lock weave or "FLW." FLW is a fabric which includes fibers needle punched into it. Sometimes FLW is used as a primary backing material on a carpet with a low pile weight. In such carpet, the fibers protrude on the pile side so as to help keep the primary backing material from showing through the pile. However, in this alternatively preferred embodiment, FLW is used as the secondary backing material with the needle punched fibers protruding away from the carpet. Doing so has been found to enhance the adhesion of the carpet when installed with a glue-down adhesive. In particular, the surface area for contacting the glue-down adhesive is increased and the protruding fibers help to anchor the carpet backing to the glue-down adhesive.

Alternatively, the secondary backing material can be a non-woven fabric. Several types are available, including, but not limited to, spun-bond, wet-laid, melt-blown, and air-entangled. As noted above, it is preferred that the secondary backing is made from a polyolefin to facilitate recycling.

In an alternatively preferred embodiment, the non-woven fabric is spun-bond polypropylene fabric, such as that available from Don & Low Non-wovens under the name "Daltex." Typically, spun-bond fabric is made from extruded and air-drawn polymer filaments which are laid down together and then point bonded, for example by a heated calendar roll. The basis weight of such a spun-bond secondary backing can be varied, preferably between 35 and 80 grams/m$^2$ (gsm) more preferably between 60 and 80 gsm. Most preferably, the basis weight is 77-83 gsms (e.g., 80 gsm). One factor favoring a higher basis weight for the spun-bond fabric is that the higher basis weight fabric is less likely to be melted when brought into contact with the molten extruded backing.

It has been found that a spun-bond non-woven fabric is advantageous to use as a secondary backing in the present invention because the porous nature of the fabric increases the surface area of the carpet for gluing the carpet to the floor.

In still another alternatively preferred embodiment, the secondary backing is a woven polypropylene fabric such as Action Bac® from Amoco which has been enhanced by having 2 OSY (70.7 cm$^3$/m$^2$) of polypropylene fibers needle punched onto one side of it. This needle punched fabric is laminated so as to have the polypropylene fibers embedded within the adhesive backing layer. As a result, the strands of the woven polypropylene fabric exposed. This embodiment has been shown to have improved glue down properties as compared to an embodiment without the needle punched fibers because, without the needle punched fibers, the strands of the woven polypropylene fabric are at least partially embedded in the adhesive backing layer. As such, the surface area for gluing is reduced. It was also noted that the back of the carpet made in this embodiment was much less abrasive than that found with traditional latex backed carpet. The carpet is also more flexible than traditional latex backed carpet. Consequently, this embodiment is preferred for making areas rugs and the like.

Still other materials can be used for the secondary backing. For example, if an integral pad is desired, a polyurethane foam or other cushion material can be laminated to the back side of the carpet. Such backings can be used for broadloom carpet as well as for carpet tile.

Figure 6:
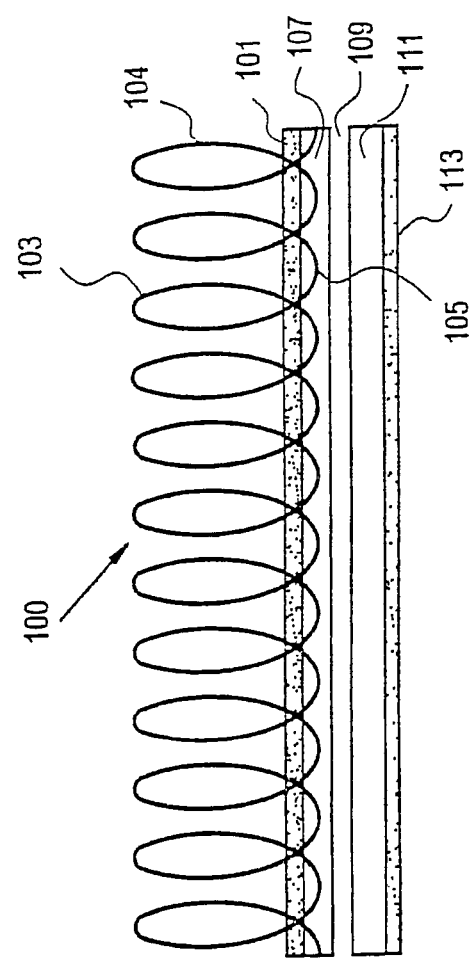
FIG. 6 is a cross-section showing the construction of a carpet tile in accordance with the present invention.

The extrusion backed carpet construction and the methods described herein are particularly suited for making carpet tile. FIG. 6 shows a cross-section of a carpet tile 100 made according to the present invention. A yarn 103, preferably made of polypropylene, is tufted into a primary backing 101, which is also preferably made of polypropylene, so as to leave a carpet pile face 104 on top of the primary backing 101 and back stitches 105 below the primary backing. Applied to the back of the primary backing 101 and the back stitches 105 is an adhesive layer 107. Preferably, this adhesive layer is made from a polyolefin. More preferably, the adhesive layer is made from the ethylene polymers described in detail above. Most preferably, this adhesive layer 107 is made from a substantially linear ethylene polymer with the additives described in Example 194 below.

In a preferred embodiment of carpet tile, the carpet included from about 5 to about 200 OSY (about 176.8 to about 7,074 cm$^3$/m$^2$) of extruded adhesive backing. More preferably, the carpet for tile includes from about 30 to about 80 OSY (about 1061 to about 2,830 cm$^3$/m$^2$) of extruded backing, most preferably, 50 OSY (1,768 cm$^3$/m$^2$).

Preferably, the carpet for carpet tile receives its extruded backing in two passes, i.e., to apply two layers of the extruded backing. The first pass applies the layer 107 in FIG. 6. Preferably this layer 107 is between about 2.5 and about 100 OSY (about 88.4 to about 3,537 cm$^3$/m$^2$) of the extruded polymer, more preferably between about 15 and about 40 OSY (about 530.5 to about 1,415 cm$^3$/m$^2$), and most preferably 25 OSY (884 cm$^3$/m$^2$). The second pass adds the layer 111. Preferably the second layer 111 is about 2.5 and about 100 OSY (about 88.4 to about 3,537 cm$^3$/m$^2$), more preferably between about 15 and 40 OSY (about 530.5 to about 1,415 cm$^3$/m$^2$), and most preferably 25 OSY (884 cm$^3$/m$^2$).

Applying the extruded backing in two passes allows the opportunity to apply a first and second layer which have different physical and/or chemical properties. As noted above, it is sometimes preferable to apply a polymer with a higher melt index adjacent the primary backing, and a polymer with a lower melt index below that. In addition, it can also be preferably to use an extrudate with a lower filler content in the layer next to the primary backing and an extrudate with a higher filler content in the layer below that. In one preferred embodiment, the layer next to the primary backing includes a filler loading of 30 percent by weight and the layer below that includes a filler loading of 60 percent by weight. The lower filler content is believed to provide better penetration of the primary backing and back stitches in the carpet by the extrudate.

When making carpet tile, it is preferable to embed a layer of reinforcing material 109 between the first and second layers of extruding backing. An important property of carpet tile is dimensional stability, i.e., the ability of the tile to maintain its size and flatness over time. The inclusion of this layer of reinforcing material has been found to enhance the dimensional stability of carpet tile made according to this preferred embodiment. Suitable reinforcing materials include dimensionally and thermally stable fabrics such as non-woven or wet-laid fiberglass scrims, as well as woven and non-woven thermoplastic fabrics (e.g. polypropylene, nylon and polyester). Most preferably, the reinforcement layer is a polypropylene non-woven fabric sold by Reemay as "Typar" with a basis weight of 3.5 OSY (124 cm$^3$/m$^2$): Alternatively, a preferred reinforcement layer is a fiberglass scrim sold by ELK Corp. as "Ultra-Mat:" with a basis weight of 1.4 OSY (49.5 cm$^3$/m$^2$).

The carpet tile may include a secondary backing fabric 113 below the second layer of extruded backing 111. Suitable materials for the secondary backing fabric include those described above. However, it is presently not preferred to include a secondary backing fabric on carpet tile.

FIG. 7 schematically shows a preferred line 120 for making carpet tile according to the present invention. A length of greige good 121, i.e. yarn tufted into a primary backing, is unrolled from the roll 123. The greige good 121 passes over the rollers 125 and 127 with the primary backing toward the roller 123. Between rollers 125 and 127 is a pre-heater 129 as described above.

An extruder 131 is mounted so as to extrude a sheet 135 of the polymeric backing through the die 133 onto the back of the greige good at a point between the roller 127 and the nip roll 141. The exact location at which the sheet 135 contacts the greige good can be varied depending on the fine speed and the time desired for the molten polymer to rest on the greige good before passing between the nip roll 141 and the chill roll 143. At present it is preferred that the sheet 135 contact the greige good so as to lie on the greige good for between about 0.5 and about 2 seconds, most preferably about 1 second, before passing between the nip roll 141 and the chill roll 143.

In this preferred depicted embodiment, a scrim of non-woven polypropylene 139 is fed from roll 137 so as to contact the chill roll 143 at a point just prior to the nip roll 141. As a result, the scrim 139 which will act as a reinforcing fabric in the finished carpet tile is laminated to the greige good through the polymer.

The pressure between the nip roll 141 and the chill roll 143 can be varied depending on the force desired to push the extruded sheet. Most preferably, there is 60 psi (0.41 MPa) of air pressure pushing the rolls together. Also, as described in connection with FIG. 2, it may be desirable to include a vacuum slot in the nip roll. In addition, a jet of pressurized air may also be used to push the extruded sheet into the carpet backing.

The size of the chill roll 143 and the length of time the carpet rolls against it can be varied depending on the level of cooling desired in the process. Preferably the chill roll 143 is cooled by simply passing ambient water through it.

After passing over the chill roll 143, the carpet is brought over rollers 145 and 147 with the carpet pile toward the rollers. A second extruder 149 extrudes a sheet or polymer 153 through its die 151 on to the back of the scrim 139. Again the point at which the extruded sheet 153 contacts the scrim 139 can be varied as described above.

At this point, if a secondary backing fabric is desired for the carpet tile, that fabric can be introduced from a roll similar to that shown at 137 so as to contact the be laminated to the carpet through the extruded sheet 153 as it passes between the nip roll 155 and the chill roll 153. Such a secondary backing fabric is not currently preferred for carpet tile construction.

The carpet passes between the nip roll 155 and the chill roll 157. Again, the pressure applied between the two rolls 155 and 157 can be varied. At present, 60 psi (0.41 MPa). of air pressure is preferably applied against the nip roll 155.

After passing around the chill roll 157, the carpet passes around roll 159 and is preferably passed over an embossing roll (not shown) to print a desired pattern on the back of the carpet.

While the apparatus shown in FIG. 7 is preferred for making a carpet tile with two layers of extruded backing and a reinforcing fabric in between, the same construction can be made with a single extrusion die, nip roll and chill roll. In particular, the first layer of extruded backing and the reinforcing fabric can be applied in a first pass through the line after which the carpet is rolled up. The second layer of extruded backing can be applied on top of the reinforcing fabric in a second pass through the same line after which the carpet is ready to be cut into carpet tiles.

Carpet tile is typically made by producing a length of backed carpet and then cutting the carpet into the appropriate sized squares. In the United States, the most common size is 18 inches (45.7 cm) square. In the rest of the world, the most common size is 50 cm square.

In still another alternative embodiment, a pressure sensitive adhesive is applied to the bottom surface of the backed carpet and a release sheet is included. In this way, a "peel and stick" carpet is produced. This is particularly beneficial when the carpet is to be cut into tiles. Examples of suitable pressure sensitive adhesives include ethylene vinyl acetate copolymers and substantially linear ethylene polymers formulated with tackifiers and polymeric waxes. The release sheet can be made from conventional polymers and/or paper products. Preferably, the release sheet is made of polyester/wax formulation.

It has been determined that the pressure sensitive adhesive is best applied directly to the adhesive backing material while the adhesive backing material is still at an elevated temperature from the extrusion coating process. A preferred technique is to extrusion laminate the pressure sensitive adhesive with the adhesive backing material; that is, to apply the pressure sensitive adhesive at nip. Alternately, the adhesive backing material can be reheated before the pressure sensitive adhesive is applied.

Another preferred embodiment of the present invention, exclusive of an optional secondary backing material, involves the combination of the various process steps described herein together with the use of at least one substantially linear ethylene polymer with an effective amount of an implosion agent formulated therein in the first layer of a two layer adhesive backing material. The a preferred combination of process steps at least includes pre-coating with an aqueous polyolefin system; removal of processing materials by washing or scouring the greige good with an aqueous detergent solution heated to at least 67° C.; drying and pre-heating the greige good by subjecting it to infra-red radiation set at about 1000° C. for about 1 to about 6 seconds; extrusion coating the adhesive backing material onto the back surface of the pre-heated, washed primary backing material by utilizing extrusion melt temperatures of greater than or equal to 615° F. (324° C.); subjecting the semi-molten or molten adhesive backing material web to a vacuum of greater than 40 inches $H_2O$ (9.8 Pa) while at the extrusion coating nip; subjecting the semi-molten or molten adhesive backing material to a positive air pressure device set at greater than about 60 psi (0.41 MPa) at the extrusion coating nip; activating an implosion agent while at the extrusion coating nip; and heat soaking of the carpet by subjecting it to infra-red radiation set at about 1000° C. for about 1 to about 6 seconds.

Various embodiments of the present invention, were evaluated and, in specific instances, compared to prior art embodiments. However, the Examples shown should in no way limit the scope of the present invention to such Examples.

EXAMPLES

Test Methods

The primary performance criteria determined for the various Examples included: tuft bind, abrasion resistance, Velcro rating, flexibility and lamination strength. Tuft bind testing was conducted in accordance with ASTM D-1335-67.

Moduli for the ethylene polymers used in the present invention were measured in accordance with ASTM-790.

Abrasion resistance was based on a qualitative Velcro fuzzing test. In this test, a 2 inch (5.1 cm) diameter, 2 pound (0.91 kg) roller coated with the loop side of standard Velcro was passed 10 times over the face side of coated carpet samples. The fuzz on the abraded carpet was then compared to a set of carpet standards and rated on a 1-10 scale wherein a rating of 10 denoted zero fuzzing.

Flexibility rating was also based on a qualitative assessment. Lamination strength was based on manual qualitative assessment in which a good delamination rating was given if the various layers of a carpet sample could not be manually-pulled apart (i.e., separation of the adhesive backing material from the primary backing material), while a poor rating was given if layers delaminated.

The Aachen test is used to determine the dimensional stability of carpet tile. The Aachen test used herein is ISO Test Method 2551. Briefly described, carpet tiles are first measured in the machine and cross-machine dimensions and then exposed to heat (140° F. (60° C.) for 2 hours) and moisture (submerged in water for 2 hours). The carpet tiles are dried for 16 hours in a drying oven. The tiles are then put into a conditioning room for 48 hours, after which each tile is measured in the machine and cross-machine directions. The results are given in terms of a percent change from the original dimensions.

Resins

Table 1 lists the various ethylene polymers used to prepare the various Examples.

TABLE 1

| Resin | Type | Melt Index (gm/10 min) | Density (gm/cc) | Modulus psi (MPa) |
|---|---|---|---|---|
| A | SLEP | 30 | 0.871 | 2.560 (17.4) |
| B | SLEP | 30 | 0.885 | 5.400 (36.7) |
| C | SLEP | 30 | 0.900 | 13.700 (93.2) |
| D | SLEP | 10 | 0.900 | ND |
| E | SLEP | 13 | 0.871 | ND |
| F | SLEP | 75 | 0.871 | ND |
| G | SLEP | 75 | 0.900 | ND |
| H | SLEP | 175 | 0.900 | ND |
| I | HBLEP | 35 | 0.882 | ND |
| J* | LLDPE | 5.4 | 0.921 | ND |
| K* | LDPE | 12 | 0.916 | 23.500 (160) |
| L* | LDPE | 120 | 0.922 | 43.000 (293) |
| M* | LDPE | 150 | 0.913 | ND |
| N* | ULDPE | 6 | 0.911 | ND |
| O* | ULDPE | 1 | 0.912 | 26.700 (182) |
| P* | LLDPE | 1 | 0.920 | 38.000 (259) |
| Q* | HDPE | 10 | 0.960 | 182.000 (1238) |
| R* | ULDPE | 30 | 0.913 | 28.400 (193) |
| S* | LDPE | 55 | 0.922 | 41.000 (279) |

SLEP denotes a substantially linear ethylene/1-octene copolymer available from The Dow Chemical Company.
HBLEP denotes a homogeneously branched linear ethylene polymer such as Exact ™ resin available from the Exxon Corporation.
LLDPE denotes a linear low density ethylene/1-octene copolymer such as a Dowlex ™ resin available from The Dow Chemical Company.
ULDPE denotes an ultra low density linear ethylene/1-octene copolymer such as an ATTANE ™ resin available from The Dow Chemical Company.
LDPE denotes a high pressure ethylene homopolymer such as available from various polymer manufacturers.
HDPE denotes a high density polyethylene resin such as available from various polymer manufacturers.
*Denotes that the listed polymer is not suitable for use in certain aspects of the present invention.
ND denotes the value was not determined.

Examples 1-12

Table 2 summarizes the polymers, extrusion conditions and carpet sample performance results for Inventive Examples 1-8 and Comparative Runs 9-12. The extrusion coating equipment consisted of a two-extruder Black Clawson coextrusion line equipped with a 3-½ inch (8.9 cm) diameter primary extruder having a 30:1 L/D and a 2-½ inch (6.4 cm) diameter secondary extruder with a 24:1 L/D. For these examples, only the large extruder was operated at 90 rpms (250 lbs./hr). A 76 cm slot die was attached to the extruder and was deckled to 69 cm with a 20-mil (0.51 mm) die gap and a 6-inch (15.2 cm) air/draw gap. The nip roll pressure was set at 85 psi (0.58 MPa) and the chill roll was controlled at 60° F. (15.6° C.). The targeted extrusion temperatures, line speed and coating thicknesses are listed in Table 2.

Greige good swatches of polypropylene (26 OSY (919.6 $cm^3/m^2$), tufted, loop pile, straight stitch greige goods available from Shaw Industries under the designation of Volunteer) were cut and slip sheeted onto Kraft paper for each Example and candidate resins were extrusion coated onto the backside of the greige goods. Secondary backing material (2.8 OSY (99 $cm^3$ $m^2$) woven polypropylene scrim known as Action Bac® available from Amoco Chemical Company, Fabrics and Fibers Division) was added to the backside of greige goods after the disposition of the extrudate at the die and before the nip pressure rollers to form a laminate structure. FIG. 2 shows the extrusion coating method and the sequence of application of an extrusion coated adhesive backing material followed by the application of an optional secondary backing material. In some instances, greige good swatches were first preheated in a convection oven at 200° F. (93° C.) for 30 min. After coated samples were aged for 24 hours at ambient room temperature and 70% relative humidity, tuft bind, abrasion resistance and delamination were determined.

TABLE 2

| Ex. | Resin | Pre-Temp ° F. (° C.) | Thick mil (mm) | Coat Wt OSY (cm³/m²) | Melt Temp ° F. (° C.) | Line Speed ft/min (m/min) | Flex | Lamination Strength | Tuft Bind lbs. (kg) |
|---|---|---|---|---|---|---|---|---|---|
| 1 | C | Ambient | 21 (0.53) | 14.5 (513) | 500 (260) | 22 (6.7) | Good | Good | 8.0 (3.6) |
| 2 | D | Ambient | 20 (0.51) | ND | 500 (260) | 22 (6.7) | Good | Good | 7.6 (3.4) |
| 3 | D | Ambient | 7 (0.18) | ND | 500 (260) | 65 (19.8) | Good | Good | 5.0 (2.3) |
| 4 | A | 140 (60) | ND | 15.5 (548) | 500 (260) | 22 (6.7) | Good | Good | 4.6 (2.1) |
| 5 | G | 140 (60) | ND | 13.1 (463) | 500 (260) | 22 (6.7) | Good | Good | 7.0 (3.2) |
| 6 | F | 150 (66) | ND | 11.9 (421) | 500 (260) | 30 (9.1) | Good | Good | 7.0 (3.2) |
| 7 | E | 160 (71) | ND | 18.9 (669) | 500 (260) | 22 (6.7) | Good | Good | 10.4 (4.7) |
| 8 | A | 160 (71) | ND | 11.8 (417) | 550 (288) | 30 (9.1) | Good | Good | 7.6 (3.4) |
| 9* | R | 140 (60) | ND | 17.6 (623) | 500 (260) | 22 (6.7) | Stiff | Poor | 7.1 (3.2) |
| 10* | J | Ambient | 20 (0.51) | ND | 500 (260) | 22 (6.7) | Stiff | Poor | ND |
| 11* | L | Ambient | 20 (0.51) | ND | 500 (260) | 22 (6.7) | Stiff | Poor | ND |
| 12* | S | Ambient | 20 (0.51) | ND | 500 (260) | 22 (6.7) | Stiff | Poor | ND |

*Denotes Comparative Run Example; the example is not an example of the present invention.
ND denotes the value was not determined.

Inventive Examples 1-8 show that homogeneously branched ethylene polymers result in carpet samples with good flexibility and good cohesion of the carpet components and that tuft bind and abrasion resistance are dependent on processing conditions. Two high pressure LDPE, a heterogeneously branched LLDPE, and a heterogeneously branched ULDPE extrusion coating (Comparative Runs 9-12) resulted in relatively stiff carpet samples and relatively poor carpet component cohesiveness.

One indication of poor component cohesiveness was relatively low adhesiveness of the backing material to the primary backing material. Another indication was relatively low penetration of the yarn or fiber bundles with the LDPE, LLDPE and ULDPE extrusion coating resins.

Examples 13-22

Table 3 summarizes the polymers, extrusion conditions, and carpet performance results for Inventive Examples 13-22. These examples used the same extrusion equipment, extrusion conditions and greige goods listed for Examples 1-12.

TABLE 3

| Ex. | Resin | Pre-Temp ° F. (° C.) | Thick mil (mm) | Melt Temp ° F. (° C.) | Line Speed ft/min (m/min) | Flex | Lamination Strength | Tuft Bind lbs. (kg) |
|---|---|---|---|---|---|---|---|---|
| 13 | C | 175 (79) | 7 (0.18) | 425 (218) | 65 (19.8) | Good | Good | 3.6 (1.6) |
| 14 | C | 175 (79) | 7 (0.18) | 500 (260) | 65 (19.8) | Good | Good | 5.4 (2.4) |
| 15 | C | 175 (79) | 7 (0.18) | 550 (288) | 65 (19.8) | Good | Good | 6.3 (2.9) |

TABLE 3-continued

| Ex. | Resin | Pre-Temp ° F. (° C.) | Thick mil (mm) | Melt Temp ° F. (° C.) | Line Speed ft/min (m/min) | Flex | Lamination Strength | Tuft Bind lbs. (kg) |
|---|---|---|---|---|---|---|---|---|
| 16 | C | 175 (79) | 7 (0.18) | 575 (302) | 65 (19.8) | Good | Good | 6.6 (3.0) |
| 17 | C | 175 (79) | 7 (0.18) | 600 (316) | 65 (19.8) | Good | Good | 5.3 (2.4) |
| 18 | C | 175 (79) | 15 (0.38) | 425 (218) | 30 (9.1) | Good | Good | 6.9 (3.1) |
| 19 | C | 175 (79) | 15 (0.38) | 500 (260) | 30 (9.1) | Good | Good | 6.8 (3.1) |
| 20 | C | 175 (79) | 15 (0.38) | 550 (288) | 30 (9.1) | Good | Good | 8.3 (3.8) |
| 21 | C | 175 (79) | 15 (0.38) | 575 (302) | 30 (9.1) | Good | Good | 6.2 (2.8) |
| 22 | C | 175 (79) | 15 (0.38) | 600 (316) | 30 (9.1) | Good | Good | 6.2 (2.8) |

Inventive Examples 13-22 show the effect of coating thickness and extrusion temperature on carpet backing performance. In certain aspects of the present invention, coating thicknesses greater than 7 mils (0.18 mm), preferably greater than or equal to 11 mils (0.38 mm), more preferably greater than or equal to about 15, and most preferably greater than or equal to 22 mils (0.56 mm) are preferred for extrusion melt temperatures greater than 550° F. (288° C.), preferably greater than or equal to 575° F. (302° C.), more preferably greater than or equal to 600° F. (316° C.) and most preferably greater than or equal to 61-5° F. (324° C.). Practitioners will appreciate that extrusion melt temperature and extrusion line speed are inversely related. That is, lower extrusion temperatures will generally require slower extrusion line speeds to achieve good penetration of the yarn. Practitioners will also appreciate that at elevated temperatures, thermal stabilization additives such as Irganox® 1010 and Irgafos® 168 (both supplied by Ciba-Geigy) may be required to achieve the full benefit of the present invention such as, for example, adhesive backing material penetration of the yarn or fiber bundles greater than 40 percent. Practitioners will also appreciate that excessive chemical stabilization may adversely effect draw down performance, thus additive selection and concentration must be balanced against draw down requirements and penetration requirements. However, in general, higher additive concentrations will be required at higher extrusion melt temperatures.

Examples 23-54

Table 4 summarizes the polymers, extrusion conditions and carpet performance results for Examples 23-54. In this evaluation, the extrusion coating equipment consisted of a 3-½ inch (8.9 cm) diameter Black Clawson Model 435 extruder equipped with a 30:1 L/D screw, a 150 hp (311 Joules/hr) Electro Flight drive system, a Cloreren 3-layer feedblock, and a Black Clawson Model 300 XLHL 30" coat hanger die externally deckled to 24 inches (61 cm) using a 20 mil (0.51 mm) die gap and a 6 inch (15.2 cm) air/draw gap. The targeted extrusion temperatures, screw speed, line speed and coating thicknesses are listed in Table 4.

Samples of polypropylene greige goods (26 OSY (920 cm$^3$/m$^2$), tufted, loop pile, straight stitch greige goods supplied by Shaw Industries under the designation of Volunteer) were used. Candidate ethylene polymers were extrusion coated onto the backside of greige goods that were run continuously through the extrusion coater rather than slip sheeted as individual greige good swatches. Electric and gas-fired infrared heaters were installed prior to the coating station to preheat the greige goods. A partitioned vacuum pressure roll with a 45° vacuum section was installed and attached to a variable vacuum pump. The vacuum section was positioned at the contact point of extrudate and greige goods. The nip roll pressure was set at 80 psi and the chill roll was controlled at 120° F. (49° C.). Secondary backing material (2.8 OSY 99 cm$^3$/m$^2$) woven polypropylene scrim or Action Bac® available from Amoco Chemical Company, Fabrics and Fibers Division) was added to the backside of the carpet samples after disposition of the extrudate at the die and before the nip pressure rollers to form a laminate structure. After coated samples were aged for 24 hours at ambient and 70% relative humidity, tuft bind, abrasion resistance and delamination resistance were determined.

TABLE 4

| Ex. | Resin | Pre-Temp ° F. (° C.) | Thick mil | Coat Weight OSY (cm$^3$/m$^2$) | Melt Temp ° F. (° C.) | Screw Speed rpm | Line Speed ft/min (m/min) | Vac in H$_2$O (Pa) | Flex | Lamination Strength | Tuft Bind lbs. (kg) |
|---|---|---|---|---|---|---|---|---|---|---|---|
| 23 | C | Ambient | ND | 11.6 (410) | 500 (260) | 20 | 18 (5.5) | 0 | Good | Good | 86 (3.9) |
| 24 | C | Ambient | ND | 14.2 (502) | 500 (260) | 25 | 18 (5.5) | 0 | Good | Good | 7.9 (3.6) |
| 25 | C | Ambient | ND | 17.8 (630) | 500 (260) | 30 | 18 (5.5) | 0 | Good | Good | 10.1 (4.6) |
| 26 | B | Ambient | ND | 9.7 (343) | 500 (260) | 20 | 18 (5.5) | 0 | Good | Good | 9.0 (4.1) |
| 27 | B | Ambient | ND | 13.0 (460) | 500 (260) | 25 | 18 (5.5) | 0 | Good | Good | 7.0 (3.2) |
| 28 | B | Ambient | ND | 14.2 (502) | 500 (260) | 30 | 18 (5.5) | 0 | Good | Good | 9.1 (4.1) |
| 29 | G | 200 (93) | ND | 6.9 (244) | 400 (204) | ND | 18 (5.5) | 0 | Good | Good | 6.6 (3.0) |
| 30 | G | 200 (93) | ND | 11.8 (417) | 400 (204) | ND | 18 (5.5) | 0 | Good | Good | 8.4 (3.8) |
| 31 | H | 200 (93) | ND | 10.2 (361) | 400 (204) | ND | 18 (5.5) | 0 | Good | Good | 7.3 (3.3) |
| 32 | B | 150 (66) | ND | 8.0 (283) | 500 (260) | 24 | 26 (7.9) | 20 (4.9) | Good | Good | ND |
| 33 | B | 150 (66) | ND | 7.7 (272) | 500 (260) | 24 | 26 (7.9) | 10 (2.5) | Good | Good | ND |
| 34 | B | 150 (66) | ND | 7.8 (276) | 500 (260) | 24 | 26 (7.9) | 0 | Good | Good | ND |
| 35 | B | 150 (66) | ND | (3.9) (138) | 500 (260) | 48 | 26 (7.9) | 0 | Good | Good | ND |
| 36 | B | 150 (66) | ND | 15.8 (559) | 500 (260) | 48 | 26 (7.9) | 10 (2.5) | Good | Good | 8.7 (3.9) |
| 37 | B | 150 (66) | ND | 15.4 (545) | 500 (260) | 48 | 26 (7.9) | 25 (6.1) | Good | Good | 9.6 (4.4) |
| 38 | B | 150 (66) | ND | 14.8 (523) | 550 (288) | 48 | 26 (7.9) | 25 (6.1) | Good | Good | 7.6 (3.4) |
| 39 | B | 150 (66) | ND | 18.0 (637) | 550 (288) | 48 | 26 (7.9) | 20 (4.9) | Good | Good | 8.2 (3.7) |
| 40 | G | 175 (79) | ND | 10.7 (378) | 400 (204) | 26 | 26 (7.9) | 25 (6.1) | Good | Good | ND |
| 41 | G | 175 (79) | ND | 9.2 (325) | 400 (204) | 26 | 26 (7.9) | 10 (2.5) | Good | Good | ND |

TABLE 4-continued

| Ex. | Resin | Pre-Temp °F. (°C.) | Thick mil | Coat Weight OSY (cm³/m²) | Melt Temp °F. (°C.) | Screw Speed rpm | Line Speed ft/min (m/min) | Vac in H₂O (Pa) | Flex | Lamination Strength | Tuft Bind lbs. (kg) |
|---|---|---|---|---|---|---|---|---|---|---|---|
| 42 | G | 175 (79) | ND | 9.5 (336) | 400 (204) | 26 | 26 (7.9) | 2.5 (0.6) | Good | Good | ND |
| 43 | G | 175 (79) | ND | 27.2 (962) | 400 (204) | 55 | 26 (7.9) | 2.5 (0.6) | Good | Good | 10.9 (4.9) |
| 44 | G | 175 (79) | ND | 26.0 (920) | 400 (204) | 55 | 26 (7.9) | 10 (2.5) | Good | Good | 8.8 (4.0) |
| 45 | G | 175 (79) | ND | 17.8 (630) | 400 (204) | 55 | 26 (7.9) | 25 (6.1) | Good | Good | 10.2 (4.6) |
| 46 | C | 250 (121) | ND | 9.8 (347) | 500 (260) | 24 | 26 (7.9) | 25 (6.1) | Good | Good | 10.9 (4.9) |
| 47 | C | 250 (121) | ND | 9.6 (340) | 500 (260) | 24 | 26 (7.9) | 10 (2.5) | Good | Good | 9.9 (4.5) |
| 48 | C | 250 (121) | ND | 9.3 (329) | 500 (260) | 24 | 26 (7.9) | 2.5 (0.6) | Good | Good | ND |
| 49 | C | 250 (121) | ND | 16.6 (587) | 500 (260) | 51 | 26 (7.9) | 2.5 (0.6) | Good | Good | 6.8 (3.1) |
| 50 | C | 250 (121) | ND | 17.5 (619) | 500 (260) | 51 | 26 (7.9) | 10 (2.5) | Good | Good | 7.0 (3.2) |
| 51 | C | 250 (121) | ND | 16.6 (587) | 500 (260) | 51 | 26 (7.9) | 25 (6.1) | Good | Good | 7.6 (3.4) |
| 52 | C | 245 (118) | ND | 10.2 (361) | 500 (260) | 50 | 26 (7.9) | 50 (12.3) | Good | Good | 7.8 (3.5) |
| 53 | C | 245 (118) | ND | 19.8 (700) | 500 (260) | 50 | 26 (7.9) | 50 (12.3) | Good | Good | 10.8 (4.9) |
| 54* | L | 200 (93) | 15 (0.38) | ND | 400 (204) | ND | 18 (5.5) | 0 | Stiff | Poor | ND |

*Denotes Comparative Run Example; the example is not an example of the preferred embodiment of the present invention. ND = value was not determined.

These Examples show that homogeneously branched ethylene polymers result in carpet samples with good flexibility and good cohesion of carpet components, and that tuft bind strength and abrasion resistance are dependent on processing conditions. These Examples also show the improvement in carpet backing performance is attainable by the utilization of a carpet preheating process step, optimized coating thickness, and/or a vacuum nip pressure process step.

The high pressure LDPE extrusion coating resin resulted in stiff carpet with poor component cohesiveness.

Examples 55-77

Table 5 summarizes the polymers, extrusion conditions and carpet performance results for Examples 55-77. These examples employed the same extrusion equipment and extrusion conditions listed for Examples 23-54, with the exception that nylon greige goods (26 OSY (920 cm³/m²), tufted, loop pile, straight stitch greige goods available from Shaw Industries under the designation of Vocation™) were used instead of polypropylene greige goods.

TABLE 5

| Ex. | Resin | Pre-Temp °F. (°C.) | Coat Weight OSY (cm³/m²) | Melt Temp °F. (°C.) | Screw Speed RPM | Line Speed ft/min (m/min) | Vacuum in H₂O (Pa) | Flex | Lamination Strength |
|---|---|---|---|---|---|---|---|---|---|
| 55 | C | Ambient | 18.4 (651) | 500 | 25 | 18 (5.5) | 0 | Good | Good |
| 56 | C | Ambient | 18.9 (668) | 500 | 30 | 18 (5.5) | 0 | Good | Good |
| 57 | C | Ambient | 20.2 (714) | 500 | 35 | 18 (5.5) | 0 | Good | Good |
| 58 | B | Ambient | 12.1 (428) | 500 | 25 | 18 (5.5) | 0 | Good | Good |
| 59 | B | Ambient | 17.2 (608) | 500 | 30 | 18 (5.5) | 0 | Good | Good |
| 60 | B | Ambient | 18.1 (640) | 500 | 35 | 18 (5.5) | 0 | Good | Good |
| 61 | G | 200 (93) | 8.4 (297) | 400 | ND | 18 (5.5) | 0 | Good | Good |
| 62* | L | 200 (93) | 13.6 (481) | 400 | ND | 18 (5.5) | 0 | Poor | Poor |
| 63 | B | 150 (66) | 17.6 (623) | 550 | 48 | 26 (7.9) | 22 (5.4) | Good | Good |
| 64 | B | 150 (66) | 15.1 (534) | 550 | 48 | 26 (7.9) | 11 (2.7) | Good | Good |
| 65 | B | 150 (66) | 16.4 (580) | 550 | 48 | 26 (7.9) | 2.5 (0.6) | Good | Good |
| 66 | G | 175 (79) | 16.9 (598) | 400 | 26 | 26 (7.9) | 25 (6.1) | Good | Good |

TABLE 5-continued

| Ex. | Resin | Pre-Temp °F. (°C.) | Coat Weight OSY (cm³/m²) | Melt Temp °F. (°C.) | Screw Speed RPM | Line Speed ft/min (m/min) | Vacuum in H₂O (Pa) | Flex | Lamination Strength |
|---|---|---|---|---|---|---|---|---|---|
| 67 | G | 175 (79) | 16.6 (587) | 400 | 26 | 26 (7.9) | 10 (2.5) | Good | Good |
| 68 | G | 175 (79) | 17.3 (612) | 400 | 26 | 26 (7.9) | 2.5 (0.6) | Good | Good |
| 69 | G | 175 (79) | 8.0 (283) | 400 | 55 | 26 (7.9) | 2.5 (0.6) | Good | Good |
| 70 | G | 175 (79) | 8.4 (297) | 400 | 55 | 26 (7.9) | 10 (2.5) | Good | Good |
| 71 | G | 175 (79) | 8.3 (294) | 400 | 55 | 26 (7.9) | 25 (6.1) | Good | Good |
| 72 | C | 260 (127) | 18.8 (665) | 500 | 24 | 26 (7.9) | 25 (6.1) | Good | Good |
| 73 | C | 260 (127) | 16.6 (587) | 500 | 24 | 26 (7.9) | 10 (2.5) | Good | Good |
| 74 | C | 260 (127) | 16.6 (587) | 500 | 24 | 26 (7.9) | 2.5 (0.6) | Good | Good |
| 75 | C | 260 (127) | 8.1 (286) | 500 | 51 | 26 (7.9) | 2.5 (0.6) | Good | Good |
| 76 | C | 260 (127) | 8.1 (286) | 500 | 51 | 26 (7.9) | 10 (2.5) | Good | Good |
| 77 | C | 280 (127) | 7.9 (279) | 500 | 51 | 26 (7.9) | 25 (6.1) | Good | Good |

ND denotes the value was not determined.

Inventive Examples 55-77 show also that homogeneously branched ethylene polymers result in carpet samples with good flexibility and good cohesion of the carpet components, and that tuft bind strength and abrasion resistance are dependent on processing conditions. Like Examples 23-53, these examples also show that improvements in carpet backing performance are attainable by employing a preheat process step, optimum coating thickness and/or a vacuum nip pressure process step.

Examples 78-86

Table 6 summarizes the polymers, extrusion conditions and carpet performance results for Examples 78-86. These examples used the same extrusion equipment and extrusion conditions listed for Examples 1-12, with the exceptions that cross stitch polypropylene greige goods (20 OSY (707 cm³/m²), tufted, loop pile available from Shaw Industries under the style name of "Proton") was used instead of straight stitch goods

TABLE 6

| Ex. | Resin | Pre-Temp °F. (°C.) | Coat Weight OSY (cm³/m²) | Melt Temp °F. (°C.) | Line Speed ft/min (m/min) | Flex | Lamination Strength | Tuft Bind lbs. (kg) | Abrasion Resistance | Velcro Test |
|---|---|---|---|---|---|---|---|---|---|---|
| 78 | C | Ambient | 7.7 (272) | 500 (260) | 48 (14.6) | Good | Good | 8.5 (3.9) | Good | 8 |
| 79 | C | 175 (79) | 16.9 (598) | 500 (260) | 22 (6.7) | Good | Good | 14.3 (6.5) | Good | 9 |
| 80 | E | 175 (79) | 9.9 (350) | 500 (260) | 48 (14.6) | Good | Good | 10.2 (4.6) | Good | 9 |
| 81 | E | 175 (79) | 17.3 (612) | 500 (250) | 22 (6.7) | Good | Good | 13.2 (6.0) | Good | 9 |
| 82 | D | 175 (79) | 17.8 (630) | 500 (260) | 22 (6.7) | Good | Good | 12.9 (5.9) | Good | 9 |
| 83 | D | 175 (79) | 9.2 (325) | 500 (260) | 48 (14.6) | Good | Good | 7.6 (3.4) | Good | 9 |
| 84* | J | 175 (79) | 9.7 (343) | 500 (260) | 48 (14.6) | Stiff | Poor | 8.7 (3.9) | Good | 9 |
| 85* | J | 175 (79) | 16.3 (577) | 500 (260) | 22 (6.7) | Stiff | Poor | 10.4 (4.7) | Good | 9 |
| 85* | J | Ambient | 18.6 (658) | 500 (250) | 22 (6.7) | Stiff | Poor | 9.1 (4.1) | Good | 9 |

*Denotes Comparative Run Example; the example is not an example of the present invention. ND denotes the value was not determined.

Inventive Examples 78-83 show that homogeneously branched ethylene polymers result in cross-stitched carpet samples with good flexibility and good cohesion of the carpet components. The LLDPE extrusion coating resin used for Comparative Runs 84-86 resulted in stiff cross-stitched carpet samples.

Examples 87-90

Table 7 summarizes the polymers, extrusion conditions and carpet performance results for Inventive Examples 87-90. These examples used the same extrusion equipment and extrusion conditions as listed for Examples 23-54, with the exceptions that polypropylene greige goods, namely a 2750 denier polypropylene yarn tufted at 16 OSY (566 cm$^3$/m$^2$) in a loop pile, straight stitch, and available from Shaw Industries under the style name "Quadratic," were used instead of polypropylene greige goods. In addition, for Examples 88-90, the greige goods were coated with an olefinic suspension or emulsion, known as a pre-coat, prior to extrusion coating.

In particular, an aqueous dispersion of polyethylene particles was prepared by weighing out 200 parts water. Next, 0.4 parts of a surfactant from Ciba-Geigy under the designation "Igepal CO-430" was dispersed in the water using a high speed homogenizer at low speed. Then, 100 parts "FN500" from Quantum Chemical was added to the mixture using medium to high mixing speeds for approximately 5 minutes. After the FN500 began agitating, 0.4 parts of a defoamer from Lenmar under the designation "Marfoam" were added to reduce the foaming of the mixture. Finally, 2.4 parts of a thickener sold by Sun Chemical International under the designation "Printgum 600M" was added to the mixture. A minimum of 10 minutes of mixing was needed after adding this thickener.

This dispersion was applied to the back of the primary backing by conventional means. In particular, 38 OSY (1,344 cm$^3$/m$^2$), based on the wet dispersion, were applied to the non-pile side of the primary backing by a roll over roller applicator running at 10 feet per minute (3.05 m/min).

After the dispersion was applied, the carpet passed directly into a conventional high velocity drying oven. The total dwell time in the oven was 5 minutes and the carpet reached a final temperature of about 290° F. (143° C.).

Observations made before after the pre-coat was applied, but before application of an extruded adhesive backing material showed that the carpet thus produced had good bundle penetration and wrap. Measurements showed that 4 and 8 OSY (283 cm$^3$/m$^2$) of the FN500, based on dry weight, were added to the carpet backing.

Before application of an extruded adhesive backing, the carpet of Examples 88-90 was also tested according to test method ASTM D1335 to measure the tuft bind strength of the carpet (See, 1991 *Annual Book of ASTM Standards*, Volume 07.01). This test measures the force required to pull one or both legs of a loop in a loop pile carpet free from the backing. The carpet made in Example 88-90 showed an average tuft bind strength of 9.0 pounds (4.1 kg) before application of the extruded adhesive backing.

Example 87 included a pre-coat of Adcote™ 50T4990, an ethylene acrylic acid copolymer dispersion available from Morton International, Woodstock, Ill. applied at 4 OSY (141.5 cm$^3$/m$^2$).

No vacuum was applied for these Examples.

TABLE 7

| Ex. | Resin | Pre-Temp °F. (°C.) | Pre-Coat Type/OSY | Coat Weight OSY (cm$^3$/m$^2$) | Melt Temp °F. (°C.) | Flex | Lamination Strength | Tuft bind lbs. (kg) | Abrasion Resistance | Velcro Test |
|---|---|---|---|---|---|---|---|---|---|---|
| 23 | C | Ambient | None | 11.6 (410) | 500 (260) | Good | Good | 8.6 (3.9) | Poor | 2 |
| 87 | C | Ambient | Adcote/4 | 3.9 (138) | 500 (260) | Good | Good | 10.7 (4.9) | Good | 8 |
| 88 | C | 175 (79) | LDPE/8 | 8.8 (311) | 500 (260) | Good | Good | 8.2 (3.7) | Good | 9 |
| 89 | E | 175 (79) | LDPE/4 | ND | 500 (260) | Good | Good | 10.0 (4.5) | Good | 8 |
| 90 | E | 175 (79) | LDPE/8 | 5.5 (195) | 500 (260) | Good | Good | 11.3 (5.1) | Good | 9 |

Inventive Examples 87-90 show that homogeneously branched ethylene polymers result in carpet samples with good flexibility and good cohesion of the carpet components, and that carpet performance can be enhanced by the application of a pre-coat.

Examples 91-96

Table 8 summarizes the polymers, extrusion conditions, and results for Examples 91-96. These Examples used the same extrusion equipment and extrusion conditions as listed for Examples 23-54 with the exceptions that nylon greige goods, namely a 3050 denier nylon 6, tufted at 20 OSY (707 cm$^3$/m$^2$), in a loop pile, straight stitch and available from Shaw Industries under the style name "Vanguard™," were used instead of straight stitch goods and the greige goods were coated with an olefinic suspension or emulsion (i.e., a pre-coat) prior to the extrusion coating step. No vacuum was applied for these Examples. The pre-coats evaluated included Adcote™ 50T4990, an ethylene acrylic acid copolymer dispersion available from Morton International, Woodstock, Ill. and a LDPE suspension wherein for the latter the pre-coated greige goods was available from Shaw Industries under the designation of Vanguard™. These pre-coats were applied at 4 (141.5 cm$^3$/m$^2$) and 8 OSY (283 cm$^3$/m$^2$) weights.

TABLE 8

| Ex. | Resin | Pre-Temp °F. (°C.) | Pre-Coat OSY | Coat Weight OSY (cm³/m²) | Melt Temp °F. (°C.) | Flex | Lamination Strength | Tuft Bind lbs. (kg) | Abrasion Resistance | Velcro Test |
|---|---|---|---|---|---|---|---|---|---|---|
| 91 | G | 150 (66) | Adcote/4 | 8.7 (308) | 500 (260) | Good | Good | 10.7 (4.9) | Good | 9 |
| 92 | G | 150 (66) | LDPE/8 | 10.0 (354) | 500 (260) | Good | Good | 7.0 (3.2) | Fair | 5 |
| 93 | G | 150 (66) | LDPE/8 | 9.3 (329) | 500 (260) | Good | Good | 5.0 (2.3) | Fair | 6 |
| 94 | G | 150 (66) | Adcote/4 | 6.3 (223) | 500 (260) | Good | Good | 12.1 (5.5) | Good | 8 |
| 95 | G | 150 (66) | LDPE/8 | 6.1 (216) | 500 (260) | Good | Good | 6.3 (2.9) | Good | 7 |
| 96 | G | 150 (66) | LDPE/4 | 3.2 (113) | 500 (260) | Good | Good | 9.2 (4.2) | Good | 9 |

These examples show that homogeneously branched ethylene polymers result in carpet samples with good flexibility and good cohesion of the carpet components, and that carpet performance can be enhanced by the application of an aqueous pre-coat.

Examples 97-109

Table 9 summarizes the polymers, extrusion conditions and carpet performance results for Inventive Examples 97-109. These Examples used the same extrusion equipment, extrusion conditions and greige goods listed for Examples 1-12, with the exception that 2 dual lip or two station extrusion coating technique was evaluated. In this evaluation, greige goods were first extrusion coated with a layer next to the backside of the carpet. This layer was identified as the bottom layer. Once coated, samples were then extrusion coated again with another layer, identified as the top layer.

TABLE 9

| Ex. | Top Resin | Bottom Resin | Thick Top mil (mm) | Thick Bottom mil (mm) | Melt Temp Top °F. (°C.) | Line Speed ft/min (m/min) | Flex | Lamination Strength | Tuft bind lbs. (kg) |
|---|---|---|---|---|---|---|---|---|---|
| 97 | C | A | 15 (0.38) | 5 (0.13) | 575 (302) | 60 | Good | Good | 5.2 (2.4) |
| 98 | C | C | 15 (0.38) | 5 (0.13) | 575 (302) | 60 | Good | Good | 4.5 (2.0) |
| 99 | C | G | 15 (0.38) | 5 (0.13) | 575 (302) | 60 | Good | Good | 5.5 (2.5) |
| 100 | C | F | 15 (0.38) | 5 (0.13) | 575 (302) | 60 | Good | Good | 5.0 (2.3) |
| 101 | D | A | 15 (0.38) | 5 (0.13) | 625 (329) | 60 | Good | Good | 7.1 (3.2) |
| 102 | D | C | 15 (0.38) | 5 (0.13) | 625 | 60 | Good | Good | 4.9 (2.2) |
| 103 | D | G | 15 (0.38) | 5 (0.13) | 625 (329) | 60 | Good | Good | 6.2 (2.8) |
| 104 | D | F | 15 (0.38) | 5 (0.13) | 625 (329) | 60 | Good | Good | 7.5 (3.4) |
| 105 | C | A | 15 (0.38) | 5 (0.13) | 625 (329) | 60 | Good | Good | 8.4 (3.8) |
| 106 | C | C | 15 (0.38) | 5 (0.13) | 625 (329) | 60 | Good | Good | 5.7 (2.6) |
| 107 | D | A | 15 (0.38) | 5 (0.13) | 625 (329) | 60 | Good | Good | ND |
| 108 | D | C | 15 (0.38) | 5 (0.13) | 625 (329) | 60 | Good | Good | 7.0 (3.2) |
| 109 | C | F | 15 (0.38) | 5 (0.13) | 600 (316) | 90 | Good | Good | 6.8 (3.1) |

ND denotes the value was not determined.

Inventive Examples 97-109 show that two station extrusion of homogeneously branched ethylene polymers results in carpet samples with good flexibility and good cohesion of the carpet components. The top layer can also contain fillers or recycled polymeric materials to modify properties or for cost savings.

Examples 110-117

Table 10 summarizes the polymers, extrusion conditions and carpet performance results for Inventive Examples 110-117. These Examples used the same extrusion equipment, greige goods and extrusion conditions as listed for Examples 1-12, with the exception that a single die coextrusion technique was used. Different candidate ethylene polymers were introduced into both extruders, respectively. The ethylene polymers were then fed simultaneously into a single die and coextruded onto the backside of the greige goods. The layer extruded onto the backside of the carpet (i.e., adjacent to the primary backing material) was identified as the bottom layer, while the outer layer was identified as the top layer. Different thicknesses were evaluated and different melt temperatures were used.

platens sufficiently to allow for heating of the polymer sample without compressing it). After 30 seconds, the platens were completely closed and the Tetrahedron program was started. The program provided 2 tons (1,814 kg) compression at 374° F. (190° C.) for 1.5 minute and 50 tons (4.5×10$^4$ kg) compression at 100° F. (38° C.) cooling for 5 minutes. Once the program had ended, the sample was removed and further cooled. Samples were then stored for later use in a compression lamination step with greige good squares.

Greige goods were cut into squares (slightly larger than the size used to mold the ethylene polymer samples as described above) and taped onto an insulation board. The sample squares were then preheated for 15 minutes in a Hot Pack oven set at 110° C.

Ethylene polymer plaques as prepared above were placed on Mylar brand polyester film and set into the preheated press (374° F.) (190° C.) for 5 minutes. The press platens were closed sufficiently to pre-heat the plaques without compressing them. The greige good squares, which had been preheated for about 5 minutes at about 374° F. (190° C.), were then taken from the Hot Pack oven and introduced to the press (i.e., inverted onto preheated polymer plaques). At the instant the

TABLE 10

| Ex. | Top Resin | Bottom Resin | Thick Top mil (mm) | Thick Bottom mil (mm) | Melt Temp Top ° F. (° C.) | Melt Temp Bottom ° F. (° C.) | Line Speed ft/min (m/min) | Flex | Lamination Strength | Tuft Bind lbs. (kg) |
|---|---|---|---|---|---|---|---|---|---|---|
| 110 | C | A | 15 (0.38) | 5 (0.13) | 525 (274) | 475 (246) | 22 (6.7) | Good | Good | 8.2 (3.7) |
| 111 | C | G | 15 (0.38) | 5 (0.13) | 525 (274) | 475 (246) | 22 (6.7) | Good | Good | 7.8 (3.5) |
| 112 | C | F | 15 (0.38) | 5 (0.13) | 525 (274) | 475 (246) | 22 (6.7) | Good | Good | 8.1 (3.7) |
| 113 | D | F | 15 (0.38) | 5 (0.13) | 525 (274) | 475 (246) | 22 (6.7) | Good | Good | 5.6 (2.5) |
| 114 | C | A | 10 (0.25) | 5 (0.13) | 525 (274) | 475 (246) | 30 (9.1) | Good | Good | 7.9 (3.6) |
| 115 | C | G | 10 (0.25) | 5 (0.13) | 525 (274) | 475 (246) | 30 (9.1) | Good | Good | 5.9 (2.7) |
| 116 | C | F | 10 (0.25) | 5 (0.13) | 525 (274) | 475 (246) | 30 (9.1) | Good | Good | 8.1 (3.7) |
| 117 | C | F | 15 (0.38) | 5 (0.13) | 550 (288) | 500 (260) | 22 (6.7) | Good | Good | 7.5 (3.4) |

Inventive Examples 110-117 show that single die coextrusion of homogeneously branched ethylene polymers results in carpet samples with good flexibility and good cohesion of the carpet components. The top layer can also contain fillers or recycled polymeric material to modify properties or provide for cost savings.

Examples 118-122

As a simulation of extrusion coating, a compression molding method was developed to melt plaques of candidate resins on to the backside of greige goods. This method employs a programmable press. The following lists the procedure.

Ethylene polymer pellets granules or powder were pressed into plaques weighing approximately 16 grams and having a thickness of 0.025 inches (0.64 mm). The press used was a pneumatic Tetrahedron programmable press. The polymer pellets, granules or powder were placed between Mylar brand polyester film in the desired plaque mold and preheated for 30 seconds at 374° F. (190° C.) (this was accomplished by inserting the samples into the pre-heated press and closing the polymer plaques and greige good squares were married, approximately 0.1 ton (90.7 kg) of force was applied and then the press was immediately opened. The laminated samples were then taken out of the press and allowed to cool to ambient room temperature. The amount of time required to compression laminate the greige good squares and the polymer plaques was about 3-7 seconds.

Table 12 gives molding conditions and performance results for various homogeneously branched substantially linear ethylene polymers.

TABLE 12

| Example | Resin | Tuft bind lbs. (kg) |
|---|---|---|
| 118 | C | 17.7 (8.0) |
| 119 | B | 14.3 (6.5) |
| 120 | A | 11.2 (5.1) |
| 121 | G | 17.5 (7.9) |
| 122 | H | 12.8 (5.8) |

Examples 123-131

To measure the adhesion of candidate ethylene polymers to greige good squares, the compression lamination method described for Examples 118-122 was used. Peel strengths were then measured using an Instron set at a 25 mm/minute cross-head speed.

Table 13 gives adhesion results for various homogeneously branched ethylene polymers, high pressure LDPE, heterogeneously branched ULDPE, heterogeneously branched LLDPE, and HDPE laminated to squares made from polypropylene carpet greige goods.

TABLE 13

| Example | Resin | Adhesion Strength, lbs. (kg) |
|---|---|---|
| 123 | E | 7.83 (3.6) |
| 124 | B | 4.82 (2.2) |
| 125 | C | 1.77 (0.8) |
| 126 | G | 3.19 (1.4) |
| 127 | I | 4.73 (2.1) |
| 128* | P | 0.40 (0.2) |
| 129* | N | 1.60 (0.7) |
| 130* | O | 1.41 (0.6) |
| 131* | M | 1.79 (0.8) |
| 132* | Q | 0.49 (0.2) |

**Denotes Comparative Run Example; the example is not an example of the preferred embodiment of the present invention.

These Examples show that homogeneously branched substantially linear ethylene polymers and homogeneously branched linear ethylene polymers provide superior adhesion relative to ordinary polyolefin resins and as such result in enhanced performance when used as adhesive backing materials.

Figure 3A:
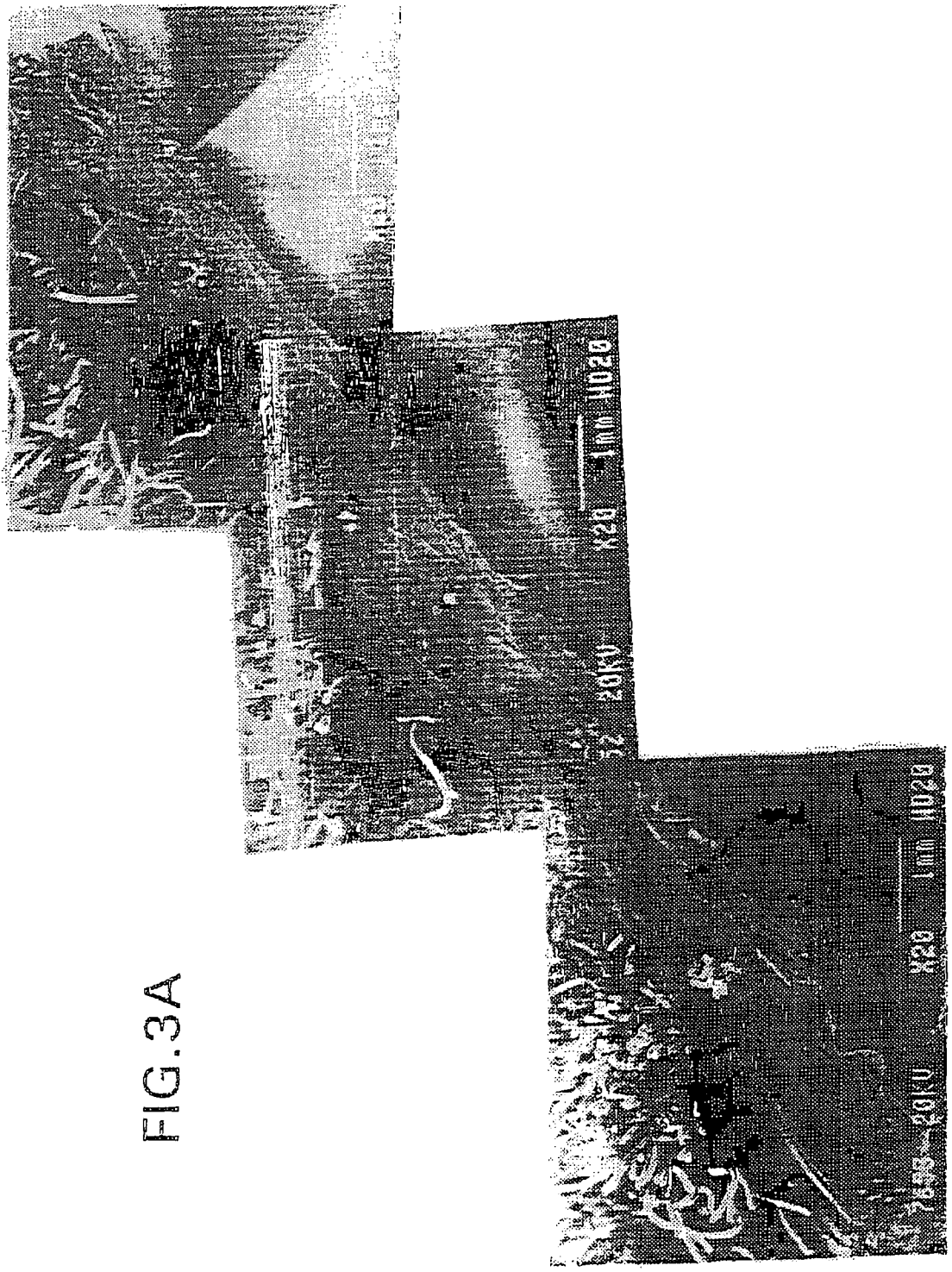
FIG. 3 consists of scanning electron microscopy photomicrographs at 20× magnification (3a) and 50× magnification (3b) illustrating the interfaces of the various carpet components of Example 14.
Figure 3B:
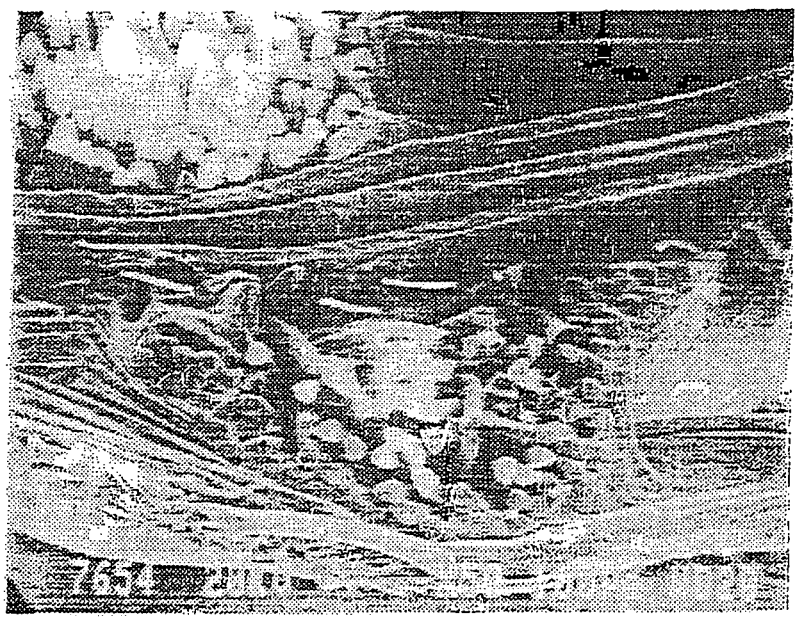
Figure 4A:
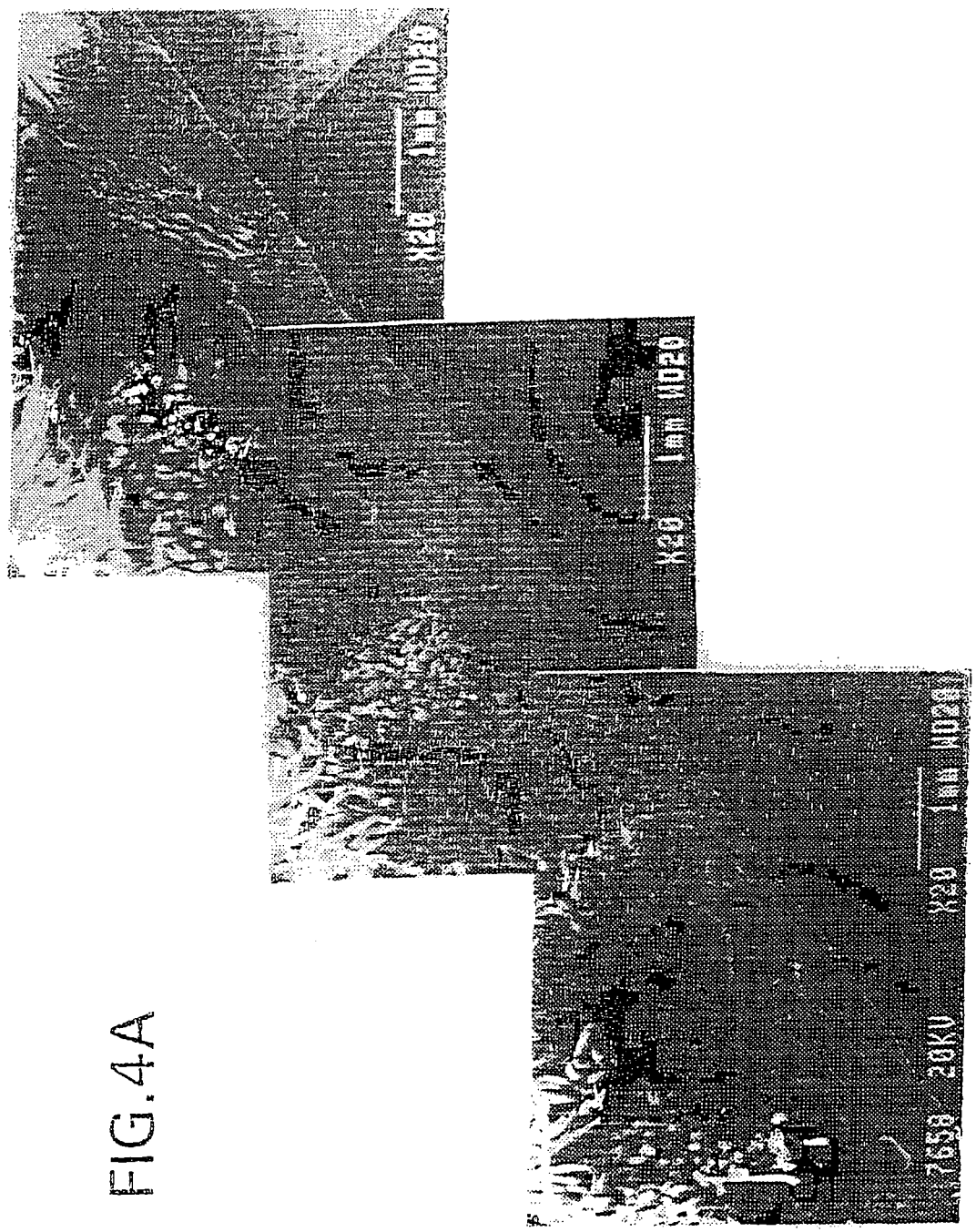
FIG. 4 consists of scanning electron microscopy photomicrographs at 20× magnification (4a) and 50× magnification (4b) illustrating the interfaces of the various carpet components of Example 22.
Figure 4B:
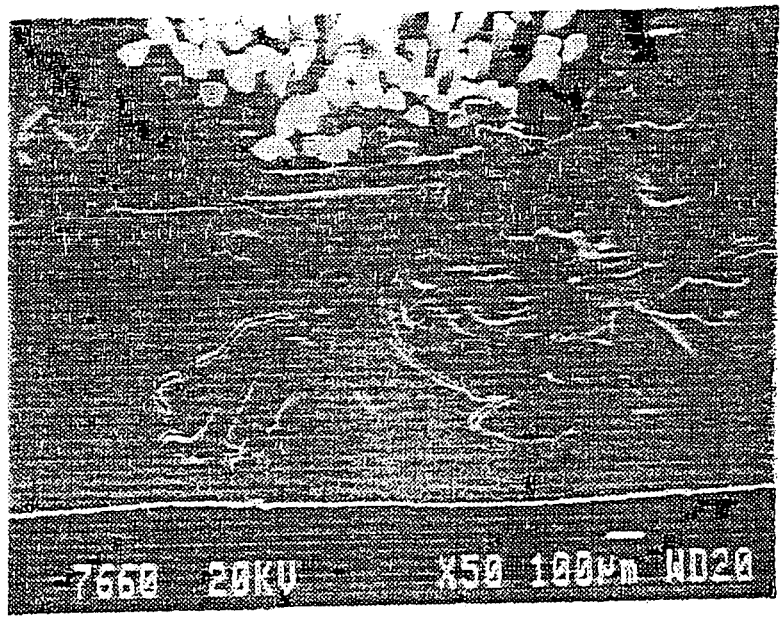

The interface of carpet sample cross-section were captured in photomicrographs using a scanning electron microscope to assess the adhesive interaction between various carpet components. FIG. 3 is a photomicrograph of the interface cross-section of Example 18 at 20× and 50× magnifications. FIG. 4 is a photomicrograph of the interface cross-section of Example 22 at 20× and 50× magnifications. Whereas Example 18 was found to possess only fair carpet performance, Example 22 was found to possess relatively good carpet performance. The improved performance of Example 22 is attributed to the enhanced intimate contact between the adhesive backing material and the primary backing material and to the substantial encapsulation of fiber bundles due to enhanced bundle penetration. The enhanced bundle penetration of Example 22 relative to Example 18 is clearly evident when comparing FIG. 3 and FIG. 4.

To quantify bundle penetration, digital image analysis was performed using a Quantimet 570 imager available from Leica, Inc. Deerfield, Ill. and running Version 2.0 QUIC software. Digital images were obtained from a scanning electron microscope through a Sanyo VDC 3860 CCD video camera equipped with a Javelin 12.5-75 mm zoom lens.

The total cross-section area of a fiber bundle was defined by tracing over the digital image using the binary edit feature of the QUIC software. The void cross-section area (i.e., area of no backing material penetration) of the bundle was determined in the same manner as for the total cross-section area. Bundle penetration was then calculated as one minus the ratio of void to bundle areas.

Figure 5:
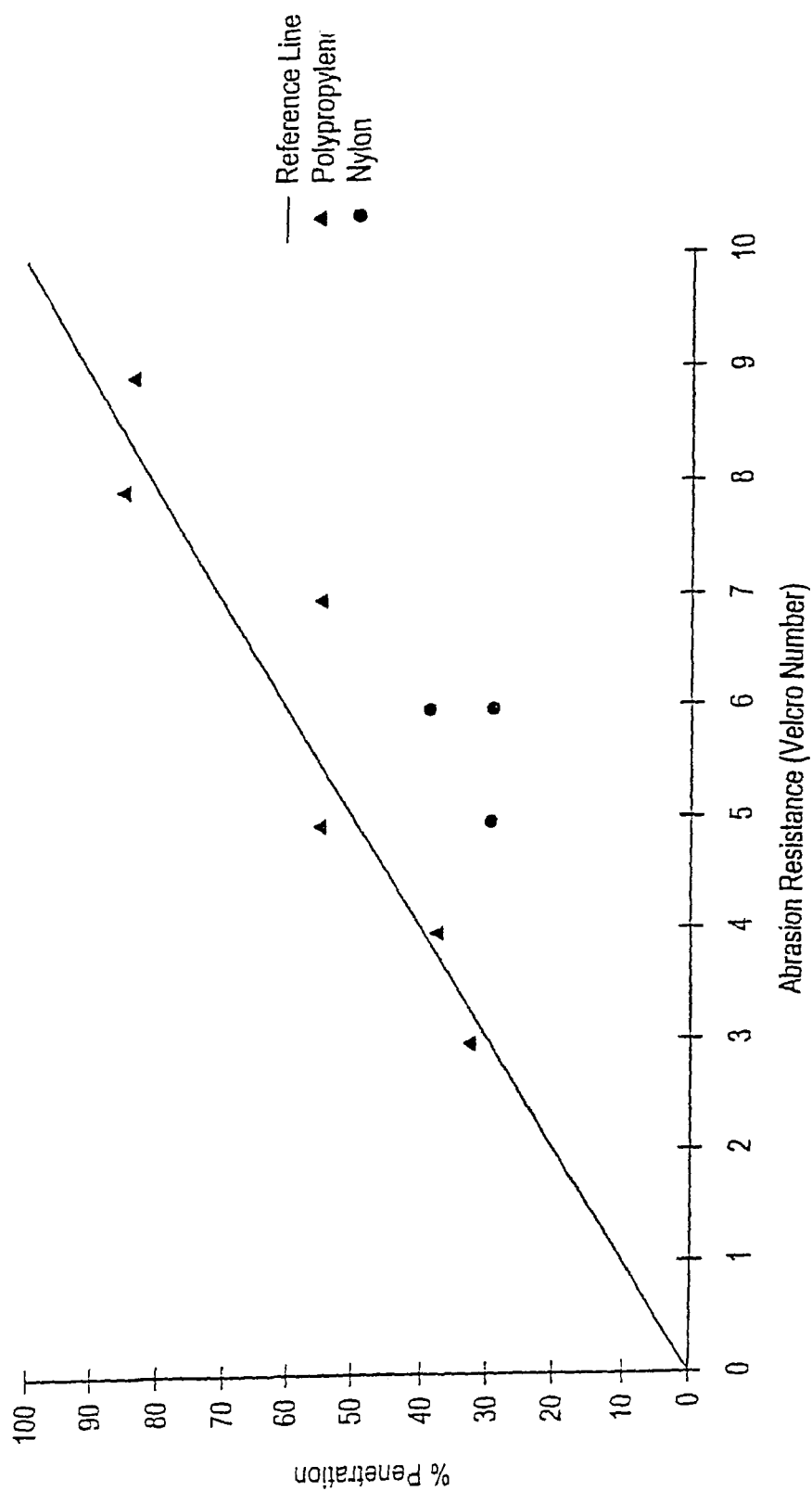
FIG. 5 is a X-Y plot of the effect of fiber bundle penetration by the adhesive backing material on the abrasion resistance performance of polypropylene and nylon carpet samples.

FIG. 5 shows the relationship of between bundle penetration and tuft bind strength for nylon and polypropylene carpets. Extrusion coated ethylene polymer bundle penetrations greater than 40 percent, preferably greater than or equal to 60 percent, more preferably greater than or equal to 80 percent and most preferably greater than or equal to 90 percent are required for good carpet performance.

Also, FIG. 5 indicates that lower fiber bundle penetration levels are required for nylon carpet to achieve the same level of abrasion resistance as for polypropylene carpet. Here, the nylon carpet has two important differences relative to the polypropylene-carpet. For one, the nylon carpet was washed with a mild aqueous detergent solution as part of the dyeing operation. Secondly, the nylon carpet fibers are polar while the polypropylene carpet fibers are nonpolar. However, the result in FIG. 5 of a lower fiber bundle penetration requirement for the nylon carpet is unexpected and surprising in that although a nonpolar adhesive backing material is employed, high abrasion performance appears to be obtained easier with a washed or scoured polar carpet (i.e., nylon) relative to the nonpolar carpet (i.e., polypropylene). Ordinarily, one skilled in the art would expect like materials to better attract one another and thereby require less penetration of the adhesive backing material into the fiber bundles for a given level of abrasion resistance. This result it is also surprising in that homogeneously branched ethylene polymers have been shown in U.S. Pat. No. 5,395,471 to exhibit improved adhesion to polypropylene substrates yet here better results are obtained for nylon fibers over polypropylene fibers. These results indicated that selection of the adhesive backing material for mechanical bonding and a scouring or washing process step can compensate for the lack of or reduced chemical interactions between the various carpet components.

Examples 133-141

To indicate the relative ability of candidate ethylene polymers to penetrate carpet yarn or fiber bundles at reasonable processing temperatures and thereby provide good carpet performance, solidification temperature testing was performed. In this test, candidate ethylene polymers were tested in the Temperature Sweep mode on a Rheometrics Mechanical Spectrometer 800E (S/N 035-014) fitted with a cone/cylinder fixture. The dimensions of the fixture were 52 mm (cup inside diameter)×50 mm (bob outside diameter)×17 mm (bob height)×0.04 (cone angle). The gap between the bob and cup was calibrated to 50 μm±2 μm at room temperature and zero gap at 220° C. Samples were loaded into the cup and heated until molten. The gap was set to 50 μm±2 μm as soon as the bob was pushed in. Any excess amount of samples or overflow was cleaned away. The solidification measurement was initiated when the tool temperature reached 220° C. The cup was oscillated at 1 Hz and 20% dynamic strain. The experiment proceeded by a first slow cool rate from 220° C. to 110° C. at a 10° C./step. Samples were treated to a second slow cool rate of 5° C./step from 110° C. to 40° C. To prevent any contraction of the fixture, auto-tension was applied to keep the normal force slightly above zero. The auto-tension was set as: 5 gram(pre-tension), 1 gram sensitivity and 100 dyne/cm$^2$ (1.02 kg/m$^2$) low limit. When samples solidified, high torque was suddenly generated. An auto-strain was applied to prevent transducer from overloading before the sample was completely solidified. The auto-strain was set as: 100% maximum applied strain, 100 g-cm maximum allowed torque, 10 g-cm minimum allowed torque and 50% strain adjustment. The entire experiment was conducted in a dried nitrogen environment to minimize sample degradation.

Table 14 gives solidification temperatures for homogeneously branched ethylene polymers and a high pressure LDPE extrusion coating resin.

TABLE 14

| Example | Resin | Solidification Temp, ° C. |
|---------|-------|---------------------------|
| 133     | B     | 83                        |
| 134     | C     | 91                        |
| 136     | G     | 94                        |
| 135     | E     | 76                        |
| 137     | H     | 95                        |
| 138     | A     | 70                        |
| 139     | F     | 71                        |
| 140     | I     | 77                        |
| 141*    | S     | 106                       |

*Denotes LDPE resin.

These Examples show that homogeneously branched ethylene polymers have relative low solidification temperatures and, as such, a better ability to penetrate carpet yarns or fiber bundle compared to ordinary low density polyethylenes. Olefin polymers suitable for use in the present invention are thought to have solidification temperatures less than 100° C., preferably less than or equal to 90° C., more preferably less than or equal to 85° C., and most preferably less than or equal to 80° C. In certain embodiments of the present invention, the solidification temperature of the olefin extrusion coating resin, wherein homogeneously branched ethylene polymers are preferred, is in the range of from about 65 to about 100° C., preferably from about 70 to about 90° C. and more preferably from about 70 to about 85° C.

Examples 142-152

In another evaluation, a wet vacuum scouring and washing technique was investigated to determine its effect on the performance of adhesive backing materials of the present invention.

The evaluation consisted of two different wet vacuuming procedures. The first wet vacuuming procedure (denoted Vac #1 in the table below) consisted of cleaning the backside of greige good samples (i.e., the primary backing material side as opposed to the fiber face side) using a commercial wet vacuum carpet cleaner equipped with a dispensing/fill tank, Rinsenvac™ Carpet Cleaning System supplied by Blue Lustre Products, Inc., Indianapolis, Ind., filled to dispense ambient temperature tap water as the cleaning solution. When the first wet vacuuming procedure was used, the greige good samples were subjected to two separate wet vacuum cleanings and were completely air dried after each cleaning. The second wet vacuuming procedure (denoted Vac#2 in the table below) consisted of cleaning the backside of greige good samples using the Rinsenvac™ Carpet Cleaning System filled to dispense a hot (90° C.) aqueous solution of dilute Rinsenvac™ Professional Carpet Cleaner as the cleaning solution mixture. The concentration of the cleaning solution for the second wet vacuuming procedure was 10 parts tap water to 1 part Rinsenvac™ detergent. When the second wet vacuuming procedure was used, the greige good samples were subjected to one wet vacuum cleaning followed by complete air drying, a rinse using ambient temperature water and then a final complete air drying step. For each washing procedure, 0.5 gallons (1.9 liters) of cleaning solution was dispensed per 5 yd² (4.2 m²) of greige goods.

In this evaluation, unwashed (control samples) and washed tufted greige good samples were extrusion coated using a monolayer die configuration, although a single die coextrusion and dual lip coextrusion can also be used. Auxiliary equipment included: pre-heaters and heat soak ovens.

The extrusion coating equipment consisted of a two-extruder Black Clawson coextrusion line with a 3-½ inch (8.9 cm) diameter primary extruder with a 30:1 L/D and a 2-½ inch (6.4 cm) diameter secondary extruder with a 24:1 L/D. For these examples, only the large extruder was operated at variable rates. A 76 cm slot die is attached and deckled to 69 cm with a 20 mil (0.51 mm) die gap and a 6 inch (15.2 cm) air/draw gap. The nip roll pressure was set at 30 psi (0.2 MPa) and the chill roll temperature was varied.

The greige good were swatches of Volunteer™ carpet supplied by Shaw Industries. Volunteer™ carpet consists of polypropylene fibers at 26 oz/yd² (920 cm³/m²) and is characterized as a tufted, loop pile, single stitch carpet. Both control unwashed and washed greige good samples were slip sheeted onto Kraft paper during extrusion coating to apply the adhesive backing material. Both unwashed control samples and washed samples were first preheated in a convection oven prior to applying the extrusion coated adhesive backing material.

A substantially linear ethylene polymer, designated XU-59100.00 as supplied by The Dow Chemical Company, was used as the adhesive backing material in this evaluation. XU-59100:00 is characterized as having a 30 g/10 min. melt index and a 0.900 g/cc polymer density. The pre-heat measured temperature was set at 160° F. (71° C.), extrusion coating melt temperature was set at 500° F. (260° C.), the chill roll temperature was set at 80° F. (27° C.) and the extrusion coating line speed was set at 85 ft/min (26 m/min).

After the extrusion coated samples were allowed to age for at least 24 hours at ambient room temperature, tuft bind, abrasion resistance and delamination performance were measured. Tuft bind testing was conducted according to ASTM D-1335-67. Abrasion resistance results were obtained using a Velcro test procedure wherein a 2 inch (51 mm) diameter, 2 pound (0.91 kg) roller coated with the loop side of standard Velcro was passed 10 times over the face side of coated carpet samples. The fuzz on the abraded carpet was then compared to a set of carpet standards and rated on a 1-10 scale (10 denoting zero fuzz). Abrasion resistance was also quantified using the Fiber Lock Test which is described hereinbelow. In general, if the Velcro Number was below 6 or the abrasion resistance of the carpet sample was rated poor, tuft binds were not measured. The following Table 15 summarizes the results of this evaluation.

TABLE 15

| Example | Wet Vacuuming | Resin Coating Wt. - oz/yo² (cm³/m²) | Tuft Bind lbs. (kg) | Velcro Rating Number. | Fiber Lock Fuzz No. |
|---------|---------------|-------------------------------------|---------------------|----------------------|---------------------|
| 142     | None          | 5.0 (177)                           | ND                  | 0.5                  | 385                 |
| 143     | None          | 7.2 (255)                           | ND                  | 4.3                  | 220                 |
| 144     | None          | 11.3 (400)                          | 7.4 (3.4)           | 7.5                  | 78                  |
| 145     | None          | 10.4 (358)                          | 8.5 (3.9)           | 7.4                  | 81                  |
| 146     | Vac #1        | 5.5 (195)                           | 7.4 (3.4)           | 8                    | 60                  |

TABLE 15-continued

| Example | Wet Vacuuming | Resin Coating Wt. - oz/yo² (cm³/m²) | Tuft Bind lbs. (kg) | Velcro Rating Number. | Fiber Lock Fuzz No. |
|---|---|---|---|---|---|
| 147 | Vac #1 | 8.0 (283) | 7.4 (3.4) | 8 | 61 |
| 148 | Vac #1 | 10.6 (375) | 7.7 (3.5) | 9 | 25 |
| 149 | Vac #1 | 11.0 (389) | 6.7 (3.0) | 8 | 40 |
| 150 | Vac #2 | 7.1 (251) | 8.3 (3.8) | 8 | 76 |
| 151 | Vac #2 | 7.9 (279) | 8.8 (4.0) | 8 | 52 |
| 152 | Vac #2 | 10.2 (361) | 8.4 (3.8) | 8 | 42 |

The results in Table 15 show that, at equivalent adhesive backing material coating weights, the use of a wet vacuuming process step prior to the application of the adhesive backing material can significantly improve carpet performance relative to unwashed samples. The improvement is so dramatic that substantially reduced adhesive backing material coating weights can be used while maintaining excellent tuft bind and abrasion resistance.

Examples 153-163

In another evaluation, tufted greige good samples were extrusion coated to evaluate the effect of calcium carbonate as a high heat content filler and a conventional blowing agent (i.e., azodicarbonamide) when employed as an implosion agent. The calcium carbonate and the azodicarbonamide were dry-blended with a substantially linear ethylene polymer according the weight percentage shown in the table immediately below. The substantially linear ethylene polymer had 30 g/10 min. Melt index and a 0.885 g/cc density and was supplied by The Dow Chemical Company under the designation XU-59400.00. The azodicarbonamide implosion agent was Epicell #301 which was supplied as a 30 weight percent concentrate in low density polyethylene by EPI Chemical Company. The calcium carbonate which had a specific heat capacity of about 0.548 cal-cc/° C. (2.3 Joules-cm³/° C. was supplied as a 75 percent weight concentrate in low polyethylene by Heritage Bag Company.

Volunteer™ greige goods supplied by Shaw Industries was used in this evaluation. The greige goods were polypropylene fibers, 26 oz/yd² (920 cm³/m²), tufted, loop pile, single stitch carpet swatches which were cut and slip sheeted onto Kraft paper for each sample such that each example adhesive backing material was extrusion coated onto the back side of the carpet (i.e., onto the primary backing material of the carpet swatches). For each sample, prior to extrusion coating on the adhesive backing material, the greige goods were first pre-heated in a convection oven.

In this evaluation, the extrusion coating die configuration was monolayer and auxiliary equipment included pre-heaters and heat soak ovens. Specifically, the extrusion coating equipment consisted of a two-extruder Black Clawson coextrusion line with a 3-½ inch (8.9 cm) diameter primary extruder with a 30:1 L/D and a 2-½ inch (6.4 cm) diameter secondary extruder with a 24:1 LID. However, in this evaluation, only the large extruder was operated at variable rates. A 76 cm slot die was attached to the extruder and deckled to 69 cm with a 20-mil (0.51 mm) die gap and a 6-inch (15.2 cm) air/draw gap. The nip roll pressure was set at 30 psi (0.2 MPa) and the chill roll temperature was varied. The greige goods pre-heat temperature was set at 160° F. (71° C.), the extrusion melt temperature was set at 550° F. (288) and the line speed was 75 ft/min (23 m/min). The chill roll temperature was set at 100° F. (38° C.) for the sample that contained no implosion agent and was set at 70° F. for samples containing the implosion agent.

After the extrusion coated samples were aged for at least 24 hours, they were tested for tuft bind, abrasion resistance, Velcro rating, fuzz rating, flexibility and delamination resistance. Tuft bind testing was conducted using ASTM D-1335-67. Abrasion resistance and Velcro testing were based on qualitative tests wherein a 2 inch (51 mm) diameter, 2 pound (0.91 kg) roller coated with the loop side of standard Velcro was passed 10 times over the face side of each extrusion coated samples to abrade the sample. The fuzz on the abraded carpet was then compared to a set of standards and rated on a 1-10 scale (10 denoting zero fuzz).

To provide quantitative abrasion results, a Fiber Lock Test was used. In this test, the abrasion resistance value is taken as the "Fiber Lock Fuzz Number." The test involves cutting away abraded fibers with a pair of Fiskars 6" spring-loaded scissors and comparing sample weights before and after abraded fibers are removed. Specifically, the Fiber Lock Fuzz test is performed by providing 8 inches (203 mm) cross direction×10 inches (254 mm) machine direction extrusion coated samples, clamping the samples such that they remain flat during double rolling; double rolling the samples in the machine direction 15 times at a constant speed and at about a 45° angle using the Velcro roller discussed above in this evaluation; using a 2 inches×2 inches (51 mm×51 mm) sample cutter attached to a press punch certified by National Analytical Equipment Federation (NAEF) to provide two test specimens for each sample; weighing and recording the sample weights for each sample to 0.1 mg using a calibrated AE200 balance; carefully removing all abraded fiber using a pair Fiskars 6" spring-loaded scissors while avoiding cutting any part of a fiber loop; reweighing and recording the two test samples; and taking the difference in weight before and after removal of the abraded fiber as the Fiber Lock Fuzz Number (FLFN). Note that Fiber Lock Fuzz numbers relate inversely to Velcro Numbers; that is, whereas higher Velcro numbers are desirable as indicative of improved abrasion resistance, lower Fuzz numbers indicate improved abrasion resistance. Table 16 provides the weight percentage of additive and the carpet performance results.

TABLE 16

| Example | Implosion Agent % active | Filler Amount % | Resin Coating Wt. - oz/yd² (cm³/m²) | Filler Wt. oz/yd² (cm³/m²) | Tuft Bind lbs. (kg) | Velcro Rating No. | Fiber Lock Fuzz No. |
|---|---|---|---|---|---|---|---|
| 153 | 0 | 0 | 9.3 (329) | NA | 7.1 (3.2) | 5 | 157 |
| 154 | 0.5 | 0 | 10.0 (354) | NA | 7.6 (3.4) | 7 | 91 |

TABLE 16-continued

| Example | Implosion Agent % active | Filler Amount % | Resin Coating Wt. - oz/yd² (cm³/m²) | Filler Wt. oz/yd² (cm³/m²) | Tuft Bind lbs. (kg) | Velcro Rating No. | Fiber Lock Fuzz No. |
|---|---|---|---|---|---|---|---|
| 155 | 1.0 | 0 | 9.4 (332) | NA | 6.2 (2.8) | 8 | 52 |
| 156 | 1.5 | 0 | 9.7 (343) | NA | 6.7 (3.0) | 7 | 80 |
| 157 | 0 | 0 | 7.4 (262) | NA | 8.1 (3.7) | 3 | 261 |
| 158 | 0 | 45 | 8.1 (286) | 6.6 (233) | 7.8 (3.5) | 7 | 99 |
| 159 | 0 | 60 | 6.4 (226) | 9.6 (340) | 8.1 (3.7) | 6 | 125 |
| 160 | 0 | 0 | 9.3 (329) | NA | 7.1 (3.2) | 3 | 1 |
| 161 | 0.5 | 15 | 9.6 (340) | 1.7 (60) | 9.0 (4.1) | 7 | 90 |
| 162 | 0.5 | 30 | 8.9 (315) | 3.9 (138) | 8.7 (3.9) | 7 | 108 |
| 163 | 0.5 | 45 | 8.0 (283) | 6.6 (233) | 7.5 (3.4) | 8 | 73 |

All examples in this evaluation exhibited good flexibility and examples with a Velcro number of at least 6 all exhibited good delamination resistance. The examples wherein the implosion agent was used all had closed cells and a collapsed adhesive backing material matrix i.e., the thickness of the adhesive backing material layer was about same with and without the implosion agent. Table 16 shows that the use an implosion agent and a high heat content filler either separately or in combination significantly improves both the tuft bind and abrasion resistance of extrusion coated carpet compared to an equivalent coating weight of resin without these additives. Also, Table 16 surprisingly indicates that the use of these additives allow improved performance at reduced adhesive backing material coat weights.

Examples 164-175

In another evaluation, an unmodified control adhesive backing material sample and two adhesive backing material samples modified by the addition of maleic anhydride grafted ethylene polymer were extrusion coated onto tufted greige goods using a monolayer die-configuration, although a single die coextrusion and dual lip coextrusion can also be used. Auxiliary equipment included: pre-heaters and heat soak ovens.

The extrusion coating equipment consisted of a two-extruder Black Clawson coextrusion line with a 3-½ inch (8.9 cm) diameter primary extruder with a 30:1 L/D and a 2-½ inch (6.4 cm) diameter secondary extruder with a 24:1 L/D. For these examples, only the large extruder was operated at variable rates. A 76 cm slot die was attached and deckled to 69 cm with a 20 mil ((0.51 mm) die gap and a 6 inch (15.2 cm) air/draw gap. The nip roll pressure was set at 30 psi, the chill roll temperature was set at 75-80° F. (24-27° C.) and the extrusion line speed was at 75 ft/min (23 m/min). Prior to application of the adhesive backing material, the greige goods were pre-heated to about 210° F. (99° C.) in a convection oven and the extrusion melt temperature was 595-610° F. (313-321° C.).

The unmodified control adhesive backing material was a substantially linear ethylene polymer having 30 g/10 min. melt index and a 0.885 g/cc density as supplied by The Dow Chemical Company under the designation XU-59400.00. To prepare two modified adhesive backing materials, XU-59400.00 was dry-blended with 10 weight percent of two different maleic anhydride/ethylene polymer grafts, each containing 1.0 weight percent maleic anhydride, to provide a final concentration of 0.1 weight percent maleic anhydride for the two blends. The grafts themselves were prepared following procedures described in U.S. Pat. No. 4,762,890. One graft designated MAH-1 in Table 17, utilized 2 high density polyethylene as the host ethylene polymer. The other graft, designated MAH-2 in Table 17, utilized a substantially linear ethylene polymer as the host ethylene polymer.

The greige goods were swatches of Vocation 26™ carpet supplied by Shaw Industries. Vocation 26™ carpet consists of nylon fibers at 26 oz/yd² (907 cm³/m²) and is characterized as a tufted, loop pile, single stitch carpet. The greige good samples were slip sheeted onto Kraft paper during extrusion coating to apply the control adhesive backing material and the two modified adhesive backing materials. No secondary backing material was added to the backside of the samples after application of the adhesive backing materials, although such can also be used.

After the extrusion coated samples were allowed to age for at least 24 hours at ambient room temperature, tuft bind, abrasion resistance and delamination performance were measured. Tuft bind testing was conducted according to ASTM D-1335-67. Abrasion resistance results were obtained using the Velcro test procedure described above wherein a 2 inch (51 mm) diameter, 2 pound (0.91 kg) roller coated with the loop side of standard Velcro was passed 10 times over the face side of coated carpet samples. The fuzz on the abraded carpet was then compared to a set of carpet standards and rated on a 1-10 scale (10 denoting zero fuzz). Abrasion resistance was also quantified using the Fiber Lock Test described above. In general, if the Velcro Number was below 6 or the abrasion resistance of the carpet sample was rated poor, tuft binds were not measured. The following Table 17 summarizes the results of this evaluation.

TABLE 17

| Example | MAH Type | Resin Coating Wt. - oz/yd² (cm³/m²) | Tuft Bind lbs. | Velcro Rating Number. | Fiber Lock Fuzz No. |
|---|---|---|---|---|---|
| 164 | None | 3.7 (131) | 5.3 | 6 | 148 |
| 165 | None | 4.9 (173) | 5.2 | 6 | 161 |
| 166 | None | 6.0 (212) | 5.6 | 4 | 218 |
| 167 | None | 8.7 (308) | 7.3 | 6 | 136 |

TABLE 17-continued

| Example | MAH Type | Resin Coating Wt. - oz/yd² (cm³/m²) | Tuft Bind lbs. | Velcro Rating Number. | Fiber Lock Fuzz No. |
|---|---|---|---|---|---|
| 168 | MAH-1 | 3.4 (120) | 5.2 | 5 | 197 |
| 169 | MAH-1 | 4.9 (173) | 7.0 | 5 | 131 |
| 170 | MAH-1 | 6.4 (226) | 8.4 | 7 | 102 |
| 171 | MAH-1 | 8.7 (308) | 9.0 | 7 | 93 |
| 172 | MAH-2 | 3.6 (127) | 5.7 | 5 | 200 |
| 173 | MAH-2 | 5.2 (184) | 5.5 | 6 | 128 |
| 174 | MAH-2 | 7.9 (279) | 9.1 | 7 | 81 |
| 175 | MAH-2 | 8.6 (304) | 8.2 | 7 | 110 |

The results in Table 17 show that the incorporation of maleic anhydride ethylene polymer grafts, wherein either a high density polyethylene (HDPE) or a substantially linear ethylene polymer is employed as the host resin, permit significant improvements in comparative tuft bind strength and abrasion resistance. One advantage of these improvements is now practitioners can employ reduced thermoplastic adhesive backing material coat weights for purposes of cost-savings and still maintain desired levels of high performance.

Examples 176-181

Example 176 was the same as example 88 above except that there was no adhesive backing extruded onto the carpet. The carpet thus produced had good bundle penetration and wrap. Measurements showed that about 12 OSY (424 cm³/m²) of the FN500, based on dry weight, were added to the carpet backing. The carpet was also tested according to test method ASTM D1335 to measure the tuft bind strength of the carpet (See, 1991 *Annual Book of ASTM Standards*, Volume 07.01). This test measures the force required to pull one or both legs of a loop in a loop pile carpet free from the backing. The carpet made in Example 176 showed an average tuft bind strength of 9.0 pounds (4.1 kg).

Example 177 was the same as example 176 except for the following changes: First, a defoamer was not used in the dispersion. Second Aerosil A300 from Degussa was added to the dispersion at 0.5 parts. Third, an HDPE from Dow Chemical Co. under the designation DOW 12065 HDPE was used in the place of FN500. Fourth, a surfactant under the designation DA-6 from Sun Chemical International was used in place of the CO-430. Finally, the carpet was dried in a Blue M forced air convection oven at 270° F. (132° C.) for 30 minutes. The add-on for the HDPE was 8.6 OSY (304 cm³/m²). The average tuft bind strength was measured at 4.0 pounds (1.8 kg).

Example 178 was the same as example 177 except that the Aerosil A-300 was removed and that, instead of the HDPE, an ethylene vinyl acetate (EVA) polymer from Quantum under the designation FE-532. The add-on for the E/A was 10 OSY (354 cm³/m²). The average tuft bind strength for the resulting carpet was measured at 8.2 pounds (3.7 kg).

Example 179 was the same as example 17.8 except that, instead of the EVA, a polyethylene from Quantum under the designation MRL-0414 was used. The add-on for the polyethylene was 3 OSY (106 cm³/m²) and the average tuft bind strength was measured at 2.3 pounds (1.04 kg).

Example 180 was the same as example 177 except that add-on for the FN500 was 5.4 OSY (191 cm³/m²). The tuft bind strength was measured at 5.2 pounds (2.4 kg).

Example 181 was the same as example 180 except that, instead of the Igepal CO-430, a surfactant under the designation OT-75 from Sun Chemical International was used. The add-on for the FN500 was 10.5 OSY (371 cm³/m²) and the average tuft bind strength was 4.3 pounds (1.95 kg).

Examples 182-193

Examples 182-193 were performed to demonstrate different secondary backings applied to the carpet made in Example 176.

In Example 182, a piece of carpet made in Example 176 received a secondary backing by placing a coextruded sheet of ethylene vinyl acetate/polyethylene from Quantum Chemical Co. under the designation NA202 UE635 on top of the non-pile side of the carpet. The pre-extruded sheet was 23 mil (0.58 mm) thick. The carpet was then placed in a gravity convection oven set at 300° F. (149° C.) for 30 minutes so as to cause the sheet to melt and bond to the back of the pre-coated carpet. The carpet was then allowed to cool to ambient temperatures.

Examples 183-185 were performed the same as Example 182 with the exception that the sheet of Quantum NA202 UE635 was 35, 37 and 50 mil (0.89, 0.94 and 1.3 mm) thick, respectively.

Example 186 was performed by taking the carpet from Example 176 and applying a calcium carbonate filled VAE latex over the back of the carpet. The carpet was then placed in a gravity convection oven at 300° F. (149° C.) for 30 minutes to dry the VAE. The coating weight was about 25 OSY (884 cm³/m²), based on dry weight.

Example 187 was performed the same as Example 186 except that the latex was an unfilled VAE latex. In particular, this latex was purchased from Reichold Chemical Co. under the designation Elvace 97808.

Example 188 was performed the same as Example 186 with the exception that a calcium carbonate filed Styrene Butadiene Rubber (SBR) latex was used in place of the VAE latex. The SBR latex was applied so as to a coating weight of about 25 OSY (884 cm³/m²).

Example 189 was performed by taking carpet from Example 176 and spreading an EVA powder on the back of the carpet. In particular, the EVA powder was from DuPont under the designation Elvax 410 and was applied at 10 OSY (354 cm³/m²).

Example 190 was performed the same as Example 189 with the exception that the powder was a polyolefin wax supplied by Hercules under the designation Polywax 2000.

Example 191 was performed by taking the carpet from Example 176 and applying a compounded hot melt adhesive to the back of the carpet. In particular, the hot melt consisted of filled EVA and Piccovar CB-20 from Hercules, Inc. and was applied to the carpet at 30 OSY (1,061 cm³/m²) and at a temperature of about 300° F. (149° C.).

Example 192 was performed the same as Example 191 with the exception that a urethane foam pad was laminated to the carpet backing through the hot melt. In particular, a polyurethane foam pad, available from Shaw Industries under the designation Duratech 100, was laminated with the hot melt.

Example 193 was performed in accordance with the preferred embodiment of the aqueous pre-coat aspect of the present invention. A sample of carpet from Example 176 had a sheet of a polymer extruded directly onto the back. The polymer used was the polyethylene elastomer provided designated "G" in Table 1 above. The density of this particular polymer was about 0.90 g/cc. The melt index was 75.

A Marsden propane fired infrared heater was used to preheat the substrate. The heater was set at temperatures between about 200° F. (93° C.) and about 230° F. (110° C.). The temperature of the carpet was measured at about 145° F. (63° C.) at the point just prior to receiving the extruded sheet. The polymer was extruded at a 7 mil (0.18 mm) thickness using a typical extrusion coating setup used for paper coating. In particular, a typical polyethylene type extruder was used with temperatures of 350° F. (177° C.) for the first barrel, 375° F. (191° C.) for the second barrel and 400° F. (204° C.) for the remaining barrels, the manifold and the extrusion die. The die was a slot type that extruded a curtain of hot polymer onto the back of the carpet. The carpet was then placed around a chill roll with the back against the chill roll and with a temperature of 120° F. (49° C.). The line speed was set to 23 feet per minute (7 m/min). The carpet was pressed at the chill roll with a nip pressure of 45 psi (0.31 MPa). Although not done in this specific example, a fabric, such as a typical polypropylene secondary backing fabric from Amoco Fabrics & Fibers as "ActionBaco®," can be laminated through the extruded sheet just prior to or at this chill roll.

Examples 194-197

Examples 194-197 were conducted to make carpet tile according to the present invention.

Example 194 was carried out in accordance with the most preferred method of making carpet tile. A 6 ft. (1.8 m) wide greige good was provided in a roll. The greige good comprised polypropylene yarn tufted into a non-woven primary backing obtained from Akzo under the name "Colback" (a blend of polyamide and polyester polymers) as cut pile at a face yarn weight of about 45 OSY (1,592 cm$^3$/m$^2$). This greige good was passed below the extruder at 17 feet per minute (5.2 m/min). The extruder contained a molten polymer mix having the following composition:

|  | % by wt. |
|---|---|
| Substantially linear ethylene polymer (XU-59400.00 from Dow) | 24 |
| Maleic Anhydride Grafted Polyethylene (XU-60769.07 from Dow) | 4 |
| Calcium Carbonate Filler (Georgia Marble #9) | 59 |
| Tackifier (Hercatac 1148 from Hercules) | 12 |
| Black Concentrate | 1 |
|  | 100 |

The temperature at the die was about 500° F. About 25 OSY (884 cm$^3$/m$^2$) was applied in a first pass, after which a sheet of a reinforcement fabric was laid on top of this first layer of polymer. The reinforcement fabric in this example was a 3.5 OSY (124 cm$^3$/m$^2$) sheet of Typar (a non-woven polypropylene fabric available from Reemay as "3351"). After passing over a chill roll, the carpet was rolled up for a subsequent pass through the line to apply a second layer.

In a second pass through the same line, a second layer of the same extrudate was applied on top of the reinforcement sheet. The total add-on, not including the Typar was 49.2 OSY (1,740 cm$^3$/m$^2$).

After cooling, the carpet was cut into 18 inches (45.7 cm) square tiles and tested for Tuft bind, and Aachen dimensional stability. The results are shown in the Table 18 below.

Example 195 was performed the same as Example 194 except that a loop pile nylon yarn was used for the face yarn at 20 OSY (707 cm$^3$/m$^2$) with a straight stitch and the total add-on was 54.0 OSY (1,910 cm$^3$/m$^2$);

Example 196 was performed the same as Example 195 except that the loop pile nylon yarn was tufted at 30 OSY (1,061 cm$^2$/m$^2$) with a shifted stitch and the total add-on was 52.6 OSY (1,860 cm$^3$/m$^2$).

Example 197 was performed the same as Example 196 except that the primary backing used was a non-woven polyester fabric sold by Freudenberg as "Lutradur." The total add-on was 52.3 OSY (1,850 cm$^3$/m$^2$).

TABLE 18

| Ex. # | Face Fiber | Add-On OSY (cm$^3$/m$^2$) | Tuft bind* lbs. (kg) | Aachen M (% change) | Aachen XM (% change) |
|---|---|---|---|---|---|
| 194 | PP | 49.2 (1,740) | 2.9 (1.3) | −0.023 | 0.105 |
| 195 | Nylon | 54.0 (1,910) | 4.6 (2.1) | −0.062 | 0.144 |
| 196 | Nylon | 52.6 (1,860) | 4.2 (1.9) | −0.054 | −0.054 |
| 197 | Nylon | 52.3 (1,850) | 4.7 (2.1) | 0.063 | 0.091 |

*Yarn broke on Tuft bind test

Examples 198-208

Examples 198-208 were conducted to make carpet tile with different add-on weights for the second pass. In addition, two different reinforcement materials were tests.

Example 198 was performed the same as Example 194 above with the exception that the extrudate applied in the first pass had the following composition:

|  | % by wt. |
|---|---|
| Substantially linear ethylene polymer (XU-59400.00 from Dow) | 69 |
| Calcium Carbonate Filler (Georgia Marble #9) | 30 |
| Black Concentrate | 1 |
|  | 100 |

11 OSY (389 cm$^3$/m$^2$) of this extrudate was applied to the back of a greige good that consisted of a polypropylene yarn tufted into a woven polypropylene primary backing at about 26 OSY (920 cm$^3$/m$^2$) in a loop pattern.

In Examples 198-203, a 3.5 OSY (124 cm$^3$/m$^2$) Typar fabric was embedded between the first layer of extrudate and the second. In Examples 204-208, a 1.4 OSY (49.5 cm$^3$/m$^2$) fiberglass scrim from ELK Corp. was used as the reinforcement layer.

In all of Examples 198-208, the second layer of extrudate, which was put on in a second pass through the same line, had the following composition:

|  | % by wt. |
| --- | --- |
| Substantially linear ethylene polymer (XU-59400.00 from Dow) | 24 |
| Maleic Anhydride Grafted Polyethylene (XU-60769.07 from Dow) | 4 |
| Calcium Carbonate Filler (Georgia Marble #9) | 59 |
| Tackifier (Hercatac 114876 from Hercules) | 12 |
| Black Concentrate | 1 |
|  | 100 |

The add-on weight from the second pass was varied as shown below in Table 19. The carpet was cut into tiles and subjected to the Aachen dimensional stability test with the results noted below.

TABLE 19

| Ex. # | Reinforce-ment OSY ($cm^3/m^2$) | $2^{nd}$ Pass Add-On, OSY ($cm^3/m^2$) | Total Add-On, OSY ($cm^3/m^2$) | Aachen M (% change) | Aachen XM (% Change) |
| --- | --- | --- | --- | --- | --- |
| 198 | Typar 3.5 (124) | 29.7 (1,050) | 40.7 (1,440) | .059 | .061 |
| 199 | Typar 3.5 (124) | 30.5 (1,079) | 41.5 (1,468) | .044 | .100 |
| 200 | Typar 3.5 (124) | 39.3 (1,390) | 50.3 (1,779) | −.064 | .075 |
| 201 | Typar 3.5 (124) | 44.0 (1,556) | 55.0 (1,945) | −.106 | .014 |
| 202 | Typar 3.5 (124) | 47.5 (1,680) | 58.5 (2,069) | 0 | .044 |
| 203 | Typar 3.5 (124) | 56.0 (1,981) | 67.0 (2,370) | .003 | .067 |
| 204 | f.g. 1.4 (50) | 41.6 (1,471) | 52.6 (1,860) | .083 | .070 |
| 205 | f.g. 1.4 (50) | 47.3 (1,673) | 58.3 (2,062) | .086 | .014 |
| 206 | f.g. 1.4 (50) | 52.3 (1,850) | 63.3 (2,239) | .003 | .086 |
| 207 | f.g. 1.4 (50) | 54.1 (1,914) | 65.1 (2,303) | .044 | .014 |
| 208 | f.g. 1.4 (50) | 58.4 (2,066) | 69.4 (2,455) | .025 | .019 |

While particular preferred and alternative embodiments have been described herein, it should be noted that various other embodiments and modifications can be made without departing from the scope of the inventions described herein. It is the appended claims which define the scope of the patent issuing from the present application.

What is claimed is:

1. A method of making a carpet or carpet tile having a foamed secondary backing comprising the steps of:
   a. providing a griege good having an adhesive applied to a back surface thereof;
   b. applying a polymer composition to the adhesive side of the greige good, wherein the polymer composition comprises:
      i. a polymer component comprising at least one homogenously branched ethylene polymer characterized as having a short chain branching distribution index (SCDBI) of greater than or equal to 50 percent; and
      ii. a blowing agent; and
   c. activating the blowing agent, thereby providing a foamed secondary backing.

2. The method of claim 1, wherein the at least one homogeneously branched ethylene polymer is a substantially linear ethylene polymer characterized as having:
   a. a melt flow ratio, $I_{10}/I_2 > 5.63$;
   b. a molecular weight distribution, $M_w/M_n$ as determined by gel permeation chromatography and defined by the equation:

$$(M_w/M_n) \leq (I_{10}/I_2) - 4.63; \text{ and}$$

c. a gas extrusion rheology such that the critical shear rate at onset of surface melt fracture for the substantially linear ethylene polymer is at least 50 percent greater than the critical shear rate at the onset of surface melt fracture for the linear ethylene polymer, wherein the linear ethylene polymer has a homogeneously branched short chain branching distribution and no long chain branching, and wherein the substantially linear ethylene polymer and the linear ethylene polymer are simultaneously ethylene homopolymers or interpolymers of ethylene and at least one $C_3$-$C_{20}$ a-olefin and have the same $I_2$ and $M_w/M_n$ and wherein the respective critical shear rates for the substantially linear ethylene polymer and the linear ethylene polymer are measured at the same melt temperature using a gas extrusion rheometer.

3. The method of claim 1, wherein a reinforcing material is present between the griege good and the foamed secondary backing.

4. The method of claim 3, wherein the reinforcing material is applied a surface of the polymer composition prior to activation of the blowing agent.

5. The method of claim 3, wherein the reinforcement material comprises one or more of non-woven or wet laid fiberglass scrims or woven or non-woven thermoplastic fabrics.

6. The method of claim 1, wherein the blowing agent comprises one or more of: azodicabonamide, toluene sulfonyl semicarbazide and oxy bis(benzene sulfonyl) hydrazide.

7. The method of claim 1, wherein the blowing agent is present at from about 0.1 to about 1.0 weight percent of the polymer composition.

8. The method of claim 1, wherein the polymer composition comprises a filler.

9. The method of claim 8, wherein the filler is present in the polymer composition from between about 1 and about 75 weight percent of the polymer composition.

10. The method of claim 8, wherein the polymer composition comprises a modified homogenously branched ethylene polymer, wherein the polymer is modified by the addition of at least one adhesive polymeric additive.

11. The method of claim 10, wherein the at least one adhesive polymeric additive is maleic anhydride in an amount to provide an adhesive polymeric additive concentration in the polymer composition at from about 0.01 to about 0.05 weight percent.

12. The method of claim 8, wherein a woven or a non-woven fabric is affixed to a back surface of the foamed secondary backing.

* * * * *